United States Patent
Park et al.

(10) Patent No.: US 10,820,007 B2
(45) Date of Patent: Oct. 27, 2020

(54) METHOD AND APPARATUS FOR DECODING INTER-LAYER VIDEO, AND METHOD AND APPARATUS FOR ENCODING INTER-LAYER VIDEO

(71) Applicant: SAMSUNG ELECTRONICS CO., LTD., Suwon-si (KR)

(72) Inventors: Min-woo Park, Yongin-si (KR); Jin-young Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/545,432

(22) PCT Filed: Jan. 20, 2016

(86) PCT No.: PCT/KR2016/000597
§ 371 (c)(1),
(2) Date: Jul. 21, 2017

(87) PCT Pub. No.: WO2016/117930
PCT Pub. Date: Jul. 28, 2016

(65) Prior Publication Data
US 2018/0007379 A1    Jan. 4, 2018

Related U.S. Application Data

(60) Provisional application No. 62/106,154, filed on Jan. 21, 2015.

(51) Int. Cl.
*H04N 19/51* (2014.01)
*H04N 19/159* (2014.01)
(Continued)

(52) U.S. Cl.
CPC .......... *H04N 19/51* (2014.11); *H04N 19/139* (2014.11); *H04N 19/159* (2014.11);
(Continued)

(58) Field of Classification Search
None
See application file for complete search history.

(56) References Cited

U.S. PATENT DOCUMENTS 8,917,775 B2    12/2014  Park et al.
8,963,995 B2     2/2015  Tsukagoshi
(Continued)

FOREIGN PATENT DOCUMENTS

CN    102055963 A    5/2011
CN    102342112 A    2/2012
(Continued)

OTHER PUBLICATIONS

Min Woo Park et al., "Position Derivation for Shifted-IVMC", Joint Collaborative Team on 3D Video Coding Extensions of ITU-T SG 16 WP 3 and ISO/IEC JTC 1/SC 29/WG 11, 11th Meeting: Geneva, CH, Feb. 12-18, 2015 Document: JCT3V-K0036, ( 4 Pages Total).
(Continued)

*Primary Examiner* — Mohammad J Rahman
(74) *Attorney, Agent, or Firm* — Sughrue Mion, PLLC

(57) ABSTRACT

Provided is an inter-layer video decoding method including obtaining a disparity vector of a current block included in a first layer image; determining a block of a second layer image corresponding to the current block by using the obtained disparity vector; determining a reference block including a sample that contacts a boundary of the block; obtaining a motion vector of the reference block; and determining a motion vector of the current block included in the first layer image by using the obtained motion vector.

12 Claims, 30 Drawing Sheets

(51) Int. Cl.

| | |
|---|---|
| H04N 19/176 | (2014.01) |
| H04N 19/139 | (2014.01) |
| H04N 19/187 | (2014.01) |
| H04N 19/30 | (2014.01) |
| H04N 19/597 | (2014.01) |
| H04N 19/52 | (2014.01) |
| H04N 19/50 | (2014.01) |

(52) U.S. Cl.
CPC ......... *H04N 19/176* (2014.11); *H04N 19/187* (2014.11); *H04N 19/30* (2014.11); *H04N 19/50* (2014.11); *H04N 19/52* (2014.11); *H04N 19/597* (2014.11)

(56) References Cited

U.S. PATENT DOCUMENTS

| | | | | |
|---|---|---|---|---|
| 10,021,367 | B2* | 7/2018 | Lin | H04N 19/597 |
| 10,554,967 | B2* | 2/2020 | Gu | H04N 19/182 |
| 2008/0219348 | A1* | 9/2008 | Sugimoto | G06T 1/0035 |
| | | | | 375/240.12 |
| 2009/0116558 | A1* | 5/2009 | Chen | H04N 19/597 |
| | | | | 375/240.16 |
| 2009/0207238 | A1* | 8/2009 | Kim | H04N 13/398 |
| | | | | 348/51 |
| 2011/0149035 | A1* | 6/2011 | Tsukagoshi | H04N 13/156 |
| | | | | 348/43 |
| 2011/0216833 | A1* | 9/2011 | Chen | H04N 19/597 |
| | | | | 375/240.16 |
| 2012/0177125 | A1 | 7/2012 | Sugio et al. | |
| 2012/0224634 | A1* | 9/2012 | Yamori | H04N 19/597 |
| | | | | 375/240.16 |
| 2014/0092968 | A1* | 4/2014 | Guillemot | H04N 19/52 |
| | | | | 375/240.14 |
| 2014/0161186 | A1 | 6/2014 | Zhang et al. | |
| 2014/0161189 | A1* | 6/2014 | Zhang | H04N 19/597 |
| | | | | 375/240.16 |
| 2014/0218473 | A1* | 8/2014 | Hannuksela | H04N 19/597 |
| | | | | 348/43 |
| 2014/0247883 | A1* | 9/2014 | Lee | H04N 19/513 |
| | | | | 375/240.16 |
| 2014/0294097 | A1* | 10/2014 | Seregin | H04N 19/00424 |
| | | | | 375/240.26 |
| 2014/0301463 | A1* | 10/2014 | Rusanovskyy | H04N 19/52 |
| | | | | 375/240.14 |
| 2014/0301467 | A1* | 10/2014 | Thirumalai | H04N 19/597 |
| | | | | 375/240.16 |
| 2014/0314147 | A1* | 10/2014 | Rusanovskyy | H04N 19/597 |
| | | | | 375/240.12 |
| 2015/0189323 | A1* | 7/2015 | An | H04N 19/597 |
| | | | | 375/240.16 |
| 2015/0350632 | A1* | 12/2015 | Chang | H04N 13/128 |
| | | | | 348/54 |
| 2015/0358600 | A1* | 12/2015 | Lin | H04N 19/597 |
| | | | | 348/43 |
| 2016/0073115 | A1 | 3/2016 | Yoon et al. | |
| 2016/0134869 | A1* | 5/2016 | Ikai | H04N 19/176 |
| | | | | 382/166 |
| 2016/0295240 | A1* | 10/2016 | Kim | H04N 19/597 |
| 2016/0323573 | A1* | 11/2016 | Ikai | H04N 19/597 |
| 2016/0381374 | A1* | 12/2016 | Bang | H04N 19/597 |
| | | | | 375/240.16 |
| 2017/0150167 | A1 | 5/2017 | Nakamura et al. | |

FOREIGN PATENT DOCUMENTS

| | | |
|---|---|---|
| JP | 2012-253460 A | 12/2012 |
| KR | 10-2008-0036910 A | 4/2008 |
| KR | 10-1431546 B1 | 8/2014 |
| KR | 10-2014-0122195 A | 10/2014 |

OTHER PUBLICATIONS

Vijayaraghavan Thirumalai et al., "CE3.h: Merge candidates derivation from vector shifting", Joint Collaborative Team on 3D Video Coding Extensions of ITU-T SG 16 WP 3 and ISO/IEC JTC 1/SC 29/WG 11, 5th Meeting: Vienna, AU, Jul. 27- Aug. 2, 2013 Document: JCT3V-E0126, ( 5 Pages Total).

Li Zhang et al., "Test Model 7 of 3D-HEVC and MV-HEVC", Joint Collaborative Team on 3D Video Coding Extension Development of ITU-T SG 16 WP 3 and ISO/IEC JTC 1/SC 29/WG 11, 7th Meeting: San Jose, US, Jan. 11-17, 2014 Document: JCT3V-G1005, ( 53 Pages Total).

Li Zhang et al., "3D-CE5.h: Merge candidates derivation from disparity vector shifting", Joint Collaborative Team on 3D Video Coding Extension Development of ITU-T SG 16 WP 3 and ISO/IEC JTC 1/SC 29/WG 11, 3rd Meeting: Geneva, CH, Jan. 17-23, 2013 Document: JCT3V-00045, ( 4 Pages Total).

Christine Guillemot et al., "3D-CE5.h: Additional merge candidates derived from shifted disparity candidate predictors", Joint Collaborative Team on 3D Video Coding Extension Development of ITU-T SG 16 WP 3 and ISO/IEC JTC 1/SC 29/WG 11, 3rd Meeting: Geneva, CH, Jan. 17-23, 2013 Document: JCT3V-00148, ( 5 Pages Total).

Communication dated Dec. 20, 2017, from the European Patent Office in counterpart European Application No. 16740403.7.

Tech, et al., "3D-HEVC Draft Text 3" Jan. 2014, Joint Collaborative Team on 3D Video Coding Extension Development of ITU-T SG 16 WP 3 and ISO/IEC JTC 1/SC 29/WG 11, 7th Meeting, JCT3V-G1001-v1, 100 pages total.

Search Report dated May 23, 2016, issued by the International Searching Authority in counterpart International Patent Application No. PCT/KR2016/000597 (PCT/ISA/210).

Written Opinion dated May 23, 2016, issued by the International Searching Authority in counterpart International Patent Application No. PCT/KR2016/000597 (PCT/ISA/237).

Communication dated Oct. 25, 2018 issued by the European Intellectual Property Office in counterpart European Application No. 16 740 403.7.

Communication dated Jul. 15, 2019, from the State Intellectual Property Office of People's Republic of China in counterpart Application No. 201680017423.1.

Communication dated Nov. 25, 2019 issued by the Korean Intellectual Property Office in counterpart Korean Application No. 10-2017-7019874.

Communication dated Jan. 9, 2020 issued by the State Intellectual Property Office of P.R. China in counterpart Chinese Application No. 201680017423.1.

Tech et al., "3D-HEVC Draft Text 6", Joint Collaborative Team on 3D Video Coding Extensions of ITU-T SG 16 WP 3 and ISO/IEC JTC 1/SC 29/WG 11, Document: JCT3V-J1001-v6, Oct. 2014, 99 pages total.

Gerhard Tech et al. "3D—HEVC Draft Text 1" Joint Collaborative Team on 3D Video Coding Extension Development of ITU-T SG 16 WP 3 and ISO/IEC JTC 1/SC 29/WG 11, JCT3V-E1001-v3, Sep. 11, 2013, XP030131378.

Communication dated Jun. 26, 2020, from the European Patent Office in counterpart European Application No. 16740403.7.

* cited by examiner

CODING UNIT (1010)

TRANSFORMATION UNIT (1070)

METHOD AND APPARATUS FOR DECODING INTER-LAYER VIDEO, AND METHOD AND APPARATUS FOR ENCODING INTER-LAYER VIDEO

This application is a National stage entry of International Application No. PCT/KR2016/000597, filed on Jan. 20, 2016, which claims priority from U.S. Provisional Application No. 62/106,154 filed Jan. 21, 2015, in the United States Patent and Trademark Office. The disclosures of each of the applications are herein incorporated by reference in their entirety.

TECHNICAL FIELD

The present disclosure relates to an inter-layer video encoding method and an inter-layer video decoding method. More particularly, the present disclosure relates to inter-layer video encoding and decoding methods that involve performing inter-layer prediction by determining a reference block having motion information.

BACKGROUND ART

As hardware for reproducing and storing high resolution or high quality video content is being developed and supplied, a need for a video codec for effectively encoding or decoding the high resolution or high quality video content is increasing. According to a conventional video codec, a video is encoded according to a limited encoding method based on coding units having a tree structure.

Image data of a spatial region is transformed into coefficients of a frequency region via frequency transformation. According to a video codec, an image is split into blocks having a predetermined size, discrete cosine transformation (DCT) is performed on each block, and frequency coefficients are encoded in block units, for rapid calculation of frequency transformation. Compared with image data of a spatial region, coefficients of a frequency region are easily compressed. In particular, since an image pixel value of a spatial region is expressed according to a prediction error via inter prediction or intra prediction of a video codec, when frequency transformation is performed on the prediction error, a large amount of data may be transformed to 0. According to a video codec, an amount of data may be reduced by replacing data that is consecutively and repeatedly generated with small-sized data.

A multilayer video codec encodes and decodes a first layer video and at least one second layer video. Amounts of data of the first layer video and the second layer video may be reduced by removing temporal/spatial redundancy and layer redundancy of the first layer video and the second layer video.

DETAILED DESCRIPTION OF THE INVENTION

Technical Problem

According to various embodiments, inter-layer prediction is performed in a manner that a block of a second layer image which is indicated by a disparity vector of a current block included in a first layer image is determined, and a block including a sample adjacent to the block of the second layer image is determined to be a reference block having motion information, and by doing so, complexity of a memory is decreased, and motion information of a current block is determined by using the motion information of the reference block which is similar to the motion information of the current block, so that efficiency in encoding and decoding is increased.

The technical problems of various embodiments are not limited to the aforementioned features, and other unstated technical problems will be clearly understood by one of ordinary skill in the art in view of descriptions below.

Technical Solution

The technical problems of the present disclosure are not limited to the aforementioned features, and other unstated technical problems will be clearly understood by one of ordinary skill in the art in view of descriptions below.

According to an aspect of the present disclosure, there is provided an inter-layer video decoding method including obtaining a disparity vector of a current block included in a first layer image; determining a block of a second layer image corresponding to the current block by using the obtained disparity vector; determining a reference block including a sample that contacts a boundary of the block; obtaining a motion vector of the reference block; and determining a motion vector of the current block included in the first layer image by using the obtained motion vector.

The sample may contact a right-bottom corner of the block in the second layer image.

A current coding unit may be one of one or more coding units determined from the first layer image by using split information regarding the current coding unit obtained from a bitstream, and the current block may be one of one or more prediction units determined from the current coding unit.

When the second layer image is split into a plurality of blocks each having a predetermined size, the reference block including the sample may be a block including the sample from among the plurality of blocks.

A first sample may be the sample that contacts the boundary of the block of the second layer image, and the determining of the reference block including the sample that contacts the boundary of the block by using the obtained disparity vector may include, if the first sample deviates from a boundary of the second layer image, determining a second sample adjacent to an inner side of the boundary of the second layer image; and determining the reference block including the determined second sample adjacent to the inner side of the boundary of the second layer image.

The disparity vector may be a vector having a ¼ sample accuracy, and the determining of the reference block including the sample that contacts the boundary of the block of the second layer image by using the obtained disparity vector may include performing rounding-off operation on the disparity vector to generate a disparity vector having an integer sample accuracy; and determining the reference block including the sample contacting the boundary of the block by using the disparity vector having the integer sample accuracy, a location of the block, and a size (a width and a height) of the block.

The first layer image may be an image indicating a first view, the second layer image may be an image indicating a second view, the inter-layer video decoding method may further include determining a prediction block of the current block by using a block that is in a reference image indicating the first view and is indicated by the obtained motion vector, and the reference image may be an image of which a time is different from a time of the first layer image.

According to another aspect of the present disclosure, there is provided an inter-layer video encoding method including obtaining a disparity vector of a current block included in a first layer image; determining a block of a second layer image corresponding to the current block by using the obtained disparity vector; determining a reference block including a sample that contacts a boundary of the block; obtaining a motion vector of the reference block; determining a motion vector of the current block included in the first layer image by using the obtained motion vector; determining a prediction block of the current block by using the determined motion vector; and encoding a residual block with respect to the current block by using the prediction block of the current block.

The sample may be a right-bottom corner of the block in the second layer image.

When the second layer image is split into a plurality of blocks each having a predetermined size, the reference block including the sample may be a block including the sample from among the plurality of blocks. A first sample may be the sample that contacts the boundary of the block of the second layer image, and the determining of the reference block including the sample that contacts the boundary of the block of the second layer image by using the obtained disparity vector may include, if the first sample deviates from a boundary of the second layer image, determining a second sample adjacent to an inner side of the boundary of the second layer image; and determining a block to be the reference block, the block including the determined second sample adjacent to the inner side of the boundary of the second layer image.

The disparity vector may be a vector having a ¼ sample accuracy, and the determining of the reference block including the sample that contacts the boundary of the block of the second layer image by using the obtained disparity vector may include performing rounding-off operation on the disparity vector to generate a disparity vector having an integer sample accuracy; and determining the reference block including the sample contacting the boundary of the block by using the disparity vector having the integer sample accuracy, a location of the block, and a size (a width and a height) of the block.

According to another aspect of the present disclosure, there is provided an inter-layer video decoding apparatus including a disparity vector obtainer configured to obtain a disparity vector indicating a corresponding block of a second layer image decoded from a current block of a first layer image; and a decoder configured to determine a reference block including a sample contacting a boundary of the corresponding block of the second layer image by using the obtained disparity vector, to obtain a motion vector of the reference block, and to obtain a prediction block of the current block of the first layer image by using the obtained motion vector.

According to another aspect of the present disclosure, there is provided an inter-layer video encoding apparatus including a disparity vector obtainer configured to obtain a disparity vector indicating a corresponding block of a second layer image encoded from a current block of a first layer image; and an encoder configured to determine a reference block including a sample contacting a boundary of the corresponding block of the second layer image by using the obtained disparity vector, to obtain a motion vector of the reference block, to obtain a prediction block of the current block by using the obtained motion vector, and to encode the first layer image including the current block by using the prediction block of the current block.

According to another aspect of the present disclosure, there is provided a non-transitory computer-readable recording medium having recorded thereon a program for implementing the method according to various embodiments.

Advantageous Effects

According to various embodiments, a block of a different layer image which corresponds to a current block is determined by using a disparity vector of the current block, a reference block including a sample contacting a boundary is determined, and a motion vector of the reference block is obtained. By doing so, complexity of a memory is decreased, and motion information of the current block is determined by using motion information of the reference block which is similar to the motion information of the current block so that efficiency in encoding and decoding may be increased.

MODE OF THE INVENTION

Hereinafter, with reference to FIGS. 1A through 7, an inter-layer video encoding method and an inter-layer video decoding method are provided. Also, with reference to FIGS. 8 through 20, a video encoding technique and a video decoding technique, which are based on coding units having a tree structure, according to various embodiments applicable to the inter-layer video encoding and decoding techniques will be described. Also, with reference to FIGS. 21 through 27, embodiments to which the video encoding method and the video decoding method are applicable will be described.

Hereinafter, an 'image' may indicate a still image of a video or a moving picture, i.e., the video itself.

Hereinafter, a 'sample' denotes data that is assigned to a sampling location of an image and is to be processed. For example, pixels of an image in a spatial domain may be samples.

Hereinafter, a 'current block' may refer to a block of an image to be encoded or decoded.

Hereinafter, a 'neighboring block' refers to at least one encoded or decoded block adjacent to the current block. For example, a neighboring block may be located at the top, upper right, left, or upper left of a current block. Also, a neighboring block may be a spatially-neighboring block or a temporally-neighboring block. For example, a temporally-neighboring block may include a block of a reference picture, which is co-located as a current block, or a neighboring block of the co-located block.

First, with reference to FIGS. 1A through 7, inter-layer video decoding and encoding apparatuses and methods according to various embodiments are provided.

Figure 1A:
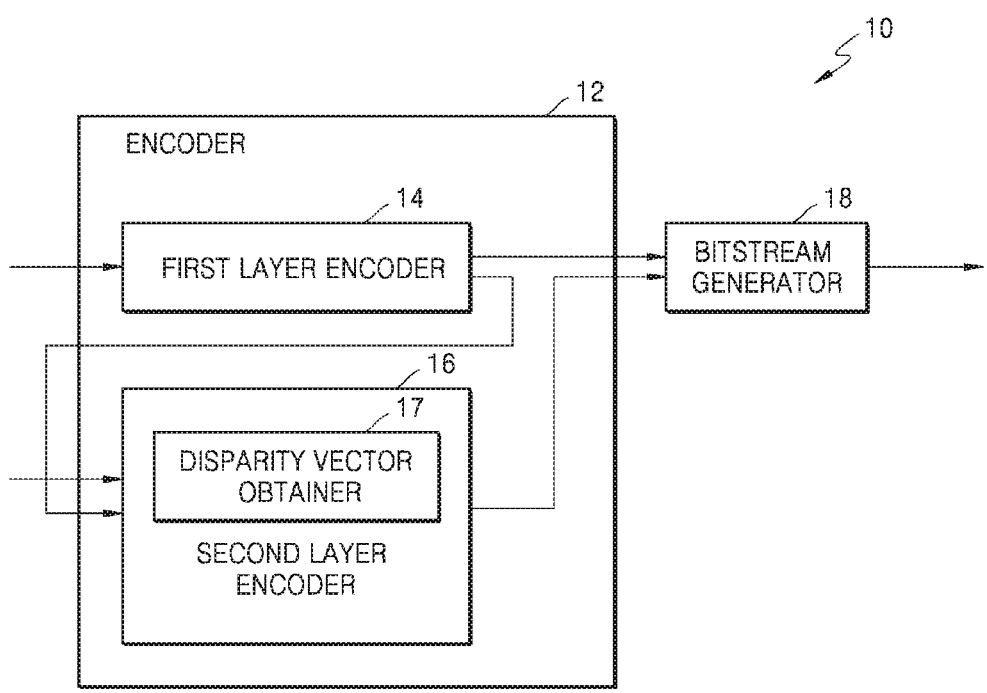
FIG. 1A is a block diagram of an inter-layer video encoding apparatus, according to various embodiments.

FIG. 1A is a block diagram of an inter-layer video encoding apparatus, according to various embodiments.

An inter-layer video encoding apparatus 10 according to various embodiments includes an encoder 12 and a bitstream generator 18. The encoder 12 may include a first layer encoder 14 and a second layer encoder 16. The second layer encoder 16 may include a disparity vector obtainer 17. The inter-layer video encoding apparatus 10 according to various embodiments may divide and encode a plurality of image sequences according to layers by using a scalable video coding scheme, and may output respective separate streams including encoded data according to the respective layers. The first layer encoder 14 may encode first layer images and may output a first layer stream including encoded data of the first layer images.

The second layer encoder 16 may encode second layer images and may output a second layer stream including encoded data of the second layer images.

The inter-layer video encoding apparatus 10 may express and encode the first layer stream and the second layer stream as one bitstream by using a multiplexer.

The inter-layer video encoding apparatus 10 may encode a first layer image sequence and a second layer image sequence to different layers.

For example, according to the scalable video coding scheme based on spatial scalability, low-resolution images may be encoded as the first layer images, and high-resolution images may be encoded as the second layer images. A result of encoding the first layer images may be output as the first layer stream, and a result of encoding the second layer images may be output as the second layer stream.

As another example, a multiview video may be encoded according to the scalable video coding scheme. Left-view images may be encoded as the first layer images, and right-view images may be encoded as the second layer images. Alternatively, center-view images, left-view images, and right-view images may be respectively encoded, and among these images, the center-view images may be encoded as the first layer images, the left-view images may be encoded as the second layer images, and the right-view images may be encoded as third layer images. Alternatively, a center-view color image, a center-view depth image, a left-view color image, a left-view depth image, a right-view color image, and a right-view depth image may be respectively encoded to a first layer image, a second layer image, a third layer image, a fourth layer image, a fifth layer image, and a sixth layer image. As another example, the center-view color image, the center-view depth image, the left-view depth image, the left-view color image, the right-view depth image, and the right-view color image may be respectively encoded to a first layer image, a second layer image, a third layer image, a fourth layer image, a fifth layer image, and a sixth layer image.

As another example, the scalable video coding scheme may be performed according to temporal hierarchical prediction based on temporal scalability. A first layer stream including encoding information generated by encoding images of a base frame rate may be output. Temporal levels may be divided according to frame rates, and may be encoded to layers, respectively. Images of a higher frame rate may be further encoded by referring to the images of the base frame rate, so that a second layer stream including encoding information of the high frame rate may be output.

As another example, a texture image may be encoded as first layer images, and a depth image may be encoded as second layer images. A result of encoding the first layer images may be output as a first layer stream, and the second layer images are encoded by referring to the first layer image and then may be output as a second layer stream.

In addition, scalable video coding may be performed on a first layer and a plurality of extension layers (a second layer, a third layer, . . . , a $K_{th}$ layer). When at least three extension layers are present, the first layer images and $K_{th}$ layer images may be encoded. Accordingly, a result of encoding the first layer images may be output as a first layer stream, and results of encoding the first layer images, the second layer images, . . . , and the $K_{th}$ layer images may be respectively output as the first layer stream, a second layer stream, . . . , and a $K_{th}$ layer stream.

The inter-layer video encoding apparatus 10 according to various embodiments may perform inter prediction by which a current image is predicted by referring to images of one layer. Due to the inter prediction, a motion vector included in motion information between the current image and a reference image, and a residual component between the current image and the reference image may be predicted from a corresponding area of the first layer (a base layer). In this regard, the motion information may include the motion vector, a reference image index, and prediction direction information.

Due to inter-layer prediction, a displacement component between the current image and a reference image of a different layer, and a residual component between the current image and the reference image of the different layer may be generated. In this regard, the displacement component between the current image and the reference image of the different layer may be expressed as a disparity vector.

In addition, the inter-layer video encoding apparatus 10 may predict prediction information of the second layer images by referring to prediction information of the first layer images or may perform the inter-layer prediction to generate a prediction image. In this regard, the prediction information may include a motion vector, a disparity vector, a reference image index, and prediction direction information.

For example, during the inter-layer prediction, the inter-layer video encoding apparatus 10 may derive the disparity vector between the current image and the reference image of the different layer, may generate the prediction image by using the reference image of the different layer according to the derived disparity vector, and may generate the residual component that is a difference component between the prediction image and the current image.

In addition, during the inter-layer prediction, a motion vector may be derived from an image of a layer different from a layer of the current image, a prediction image may be generated by using a reference image that is an image of a layer equal to a layer of the current image, and a residual component that is a difference component between the prediction image and the current image may be generated.

When the inter-layer video encoding apparatus 10 according to an embodiment allows at least three layers including a first layer, a second layer, a third layer, etc., the inter-layer video encoding apparatus 10 may perform inter-layer prediction between a first layer image and a third layer image, and inter-layer prediction between a second layer image and the third layer image, according to a multilayer prediction structure.

An inter-layer prediction structure will be described in detail below with reference to FIG. 3A.

The inter-layer video encoding apparatus 10 according to various embodiments may perform encoding according to blocks of each image of a video, according to layers. A block may have a square shape, a rectangular shape, or an arbitrary geometrical shape, and is not limited to a data unit having a predetermined size. The block may be a largest coding unit, a coding unit, a prediction unit, or a transformation unit, among coding units according to a tree structure. The largest coding unit including the coding units of a tree structure may be called differently, such as a coding tree unit, a coding block tree, a block tree, a root block tree, a coding tree, a coding root, or a tree trunk. Video encoding and decoding schemes based on the coding units according to a tree structure will be described below with reference to FIGS. 8 through 20.

Inter prediction and inter-layer prediction may be performed based on a data unit such as a coding unit, a prediction unit, or a transformation unit.

The first layer encoder 14 according to various embodiments may generate symbol data by performing source coding operations including inter prediction or intra prediction on first layer images. The symbol data may indicate a value of each encoding parameter and a sample value of a residual.

For example, the first layer encoder 14 may generate symbol data by performing inter prediction or intra prediction, transformation, and quantization on samples of a data unit of first layer images, and may generate a first layer stream by performing entropy encoding on the symbol data.

The second layer encoder 16 may encode second layer images based on coding units of a tree structure. The second layer encoder 16 may generate symbol data by performing inter/intra prediction, transformation, and quantization on samples of a coding unit of second layer images, and may generate a second layer stream by performing entropy encoding on the symbol data.

The second layer encoder 16 according to various embodiments may perform inter-layer prediction in which a second layer image is predicted by using prediction information of a first layer image. In order to encode a second layer original image from a second layer image sequence through the inter-layer prediction structure, the second layer encoder 16 may determine prediction information of a second layer current image by using prediction information of a reconstructed first layer image corresponding to the second layer current image, and may generate a second layer prediction image based on the determined prediction information, thereby encoding a prediction error between the second layer original image and the second layer prediction image.

The second layer encoder 16 may determine a block of a first layer image to be referred to by a block of a second layer image by performing inter-layer prediction on the second layer image according to coding units or prediction units. For example, a reconstructed block of the first layer image, which is located correspondingly to a location of a current block in the second layer image, may be determined. The second layer encoder 16 may determine a second layer prediction block by using the reconstructed first layer block corresponding to a second layer block. In this regard, the second layer encoder 16 may determine the second layer prediction block by using the reconstructed first layer block that is co-located with the second layer block. In addition, when the second layer image indicates a view different from the first layer image, the second layer encoder 16 may determine the second layer prediction block by using the reconstructed first layer block that is located correspondingly to disparity information of the second layer block. The disparity information may include a disparity vector, a reference view image index, a reference image index, and prediction direction information.

The second layer encoder 16 may use the second layer prediction block determined by using the reconstructed first layer block according to the inter-layer prediction structure, as a reference image for inter-layer prediction with respect to a second layer original block. The second layer encoder 16 may perform transformation and quantization on an error between a sample value of the second layer prediction block and a sample value of the second layer original block, i.e., a residual component according to inter-layer prediction, by using the reconstructed first layer block, and may perform entropy encoding.

When the aforementioned inter-layer video encoding apparatus 10 encodes the multiview video, the first layer image to be encoded may be a first-view video, and the second layer image may be a second-view video. Since the multiview image is obtained at a same time, a similarity between images indicating views is very large.

However, because an image-capturing angle, lighting, or a characteristic of an image-capturing device (a camera, a lens, etc.) varies according to the views of the multiview image, a disparity may occur. Thus, when disparity-compensated prediction is performed in a manner that the disparity is indicated as a disparity vector, and an area of an image indicating a different view, the area being most similar to a block to be currently encoded, is found by using the disparity vector and then is encoded, encoding efficiency may be increased.

When the inter-layer video encoding apparatus 10 encodes texture-depth images, a first layer image to be encoded may be a texture image, and a second layer image may be a depth image. Because the texture-depth images are obtained at a same time, a similarity between prediction techniques with respect to the images is very large.

Thus, when motion-compensated prediction or disparity-compensated prediction is performed in a manner that a block of the texture image which is co-located with a block of the depth image is found and then the depth image is encoded by using motion information or disparity information of the texture image, encoding efficiency may be increased.

Hereinafter, a process in which the second layer encoder 16 determines a reference block having motion information and then performs prediction on a current block included in a second layer will now be described in detail.

The second layer encoder 16 may perform encoding on the current block of the second layer. For example, the second layer encoder 16 may determine one or more coding units in a second layer image, and may perform encoding on the one or more coding units. In this regard, a coding unit to be currently encoded from among the one or more coding units is referred to as a current coding unit. The current block may be one of one or more prediction units determined from the current coding unit.

When the second layer encoder 16 determines to perform inter-layer prediction on the current block of the second layer image, the disparity vector obtainer 17 may obtain a disparity vector of the current block.

In this regard, the disparity vector may be a vector having a ¼ sample accuracy. The vector having a ¼ sample accuracy may mean that a minimum unit of a vector value is ¼ value of a sample. For example, when a height and width of one sample is each 1, a minimum unit of a value of each component of a disparity vector may be ¼. However, the vector having ¼-sample accuracy may not be an integer. When the vector value is not an integer, the vector value may be adjusted to make a value of a vector component be an integer. For example, when the vector value is (0.25,0.75), 4 may be multiplied (scaling) thereto and thus the vector value may be expressed as (1,3), and an adjusted value of the vector component may be stored in a buffer (not shown).

The second layer encoder 16 may determine, by using the obtained disparity vector, a block of a first layer image which corresponds to the current block. When the value of the vector component is adjusted (scaling), the second layer encoder 16 may determine (inverse-scaling) a value of the vector component before the adjustment, and may determine the block of the first layer image which corresponds to the current block, by using the value of the vector component before the adjustment. Alternatively, an integer value of the vector component may be determined from the adjusted value of the vector component. For example, when the adjusted value of the vector component is (1,3), the adjusted value is divided by 4 (in inverse-scaling, only the quotient is adopted from a division result, and the remainder is discarded), and thus (0,0) may be determined to be a value of the vector component. As another example, when the adjusted value of the vector component is (1,3) and is divided by 4, (0,1) may be determined to be the value of the vector component by considering rounding off (in inverse-scaling, only the quotient is adopted and the remainder is discarded from a result obtained by adding 2 to each component and dividing the value).

The second layer encoder 16 may determine a predetermined location of the block of the first layer image by adding the value of the disparity vector component to a component indicating a predetermined location of the current block, and may determine the block of the first layer image, based on the predetermined location of the block of the first layer image.

The second layer encoder 16 may determine a reference block including a sample that contacts the block of the first layer image. In this regard, the reference block may be a block used in referring to motion information when the current block is inter-layer predicted. The second layer encoder 16 may determine the reference block including the sample that contacts a corner of the block of the first layer image. The second layer encoder 16 may determine the reference block including the sample that contacts a right-bottom corner of the block of the first layer image.

The second layer encoder 16 may determine one or more blocks of the first layer image, based on a block unit for storing motion information. In this regard, the block including the sample may be one of the determined one or more blocks. For example, the first layer image may be split into a plurality of blocks each having a predetermined size, and the reference block including the sample may be a block including the sample from among the plurality of blocks.

When it is assumed that a first sample is a sample that contacts a boundary of a block of the second layer image, if the first sample deviates from the boundary of the second layer image, the second layer encoder 16 may determine a second sample adjacent to an inner side of the boundary of the second layer image, and may determine a block to be a reference block, the block including the determined second sample adjacent to the inner side of the boundary of the second layer image.

The second layer encoder 16 may obtain a motion vector of the reference block. The second layer encoder 16 may obtain prediction direction information and a reference direction index with the motion vector of the reference block from the reference block.

The second layer encoder 16 may determine a motion vector of the current block with respect to the second layer image by using the obtained motion vector. The second layer encoder 16 may determine prediction direction information and a reference direction index with respect to the current block by using the obtained prediction direction information and the obtained reference direction index.

The second layer encoder 16 may determine a block in a reference image by using the motion vector of the current block, and may determine a prediction block of the current block by using the determined block in the reference image. In this regard, the reference image may indicate an image that is of a same layer as the second layer image and corresponds to a time different from a time of the second layer image. The first layer image may be a first-view image, and the second layer image may be a second-view image.

The second layer encoder 16 may determine a residual block regarding the current block by using the prediction block of the current block. The second layer encoder 16 may determine the residual block indicating a difference between an original sample value of the current block and a sample value of the prediction block. The second layer encoder 16 may perform transformation on the residual block, and may entropy-encode the transformed residual block.

The bitstream generator 18 may generate a bitstream including an encoded video and inter-layer prediction information determined in association with the inter-layer prediction. For example, the bitstream generator 18 may generate the bitstream including the entropy-encoded residual block regarding the current block. That is, the bitstream generator 18 may include, as the encoded video, information regarding the entropy-encoded residual block. The generated bitstream may be transmitted to a decoding apparatus. In the above descriptions, it is described how the second layer encoder 16 performs the inter-layer motion prediction based on a block. The second layer encoder 16 is not limited thereto, and may perform inter-layer motion prediction based on a sub-block. For example, the second layer encoder 16 may determine at least one sub-block from the current block of the second layer image, may determine a candidate sub-block of the first layer image by using the determined sub-block, and may determine a motion vector of (the sub-block) of the current block by using motion information of a block including a sample that contacts the candidate sub-block.

Hereinafter, an inter-layer video encoding method performed by the inter-layer video encoding apparatus 10 according to various embodiments will be described in detail below with reference to FIGS. 4A through 7.

The inter-layer video encoding apparatus 10 may perform, by using a reconstructed first layer image, transformation and quantization on an error between a sample value of a second layer prediction block and a sample value of a second layer original block, i.e., a residual component according to inter-layer prediction, thereby entropy-encoding the error. In addition, an error between a plurality of pieces of prediction information may also be entropy-encoded.

As described above, the inter-layer video encoding apparatus 10 may encode a current layer image sequence by referring to reconstructed first layer images according to an inter-layer prediction structure.

However, the inter-layer video encoding apparatus 10 according to various embodiments may encode a second layer image sequence according to a single layer prediction structure without referring to different-layer samples. Thus, the inter-layer video encoding apparatus 10 should not be construed as being limited to performing only inter prediction to the inter-layer prediction structure so as to encode the second layer image sequence.

Hereinafter, an operation by the inter-layer video encoding apparatus 10 to perform inter-layer prediction will now be described in detail with reference to FIG. 1B.

The terms "first" and "second" described with reference to FIG. 1A are added to emphasize a difference therebetween, it should not be limitedly construed that "first layer image" is previously encoded and of which motion information is referred to, and "second layer image, third layer image, $K_{th}$ layer image . . . " are images to refer to the motion information of the first layer image.

Hereinafter, in the descriptions described with reference to FIG. 1B, the second layer image means a previously-encoded image of which motion information is referred to, and the first layer image means an image to be currently encoded and to refer to the motion information.

Figure 1B:
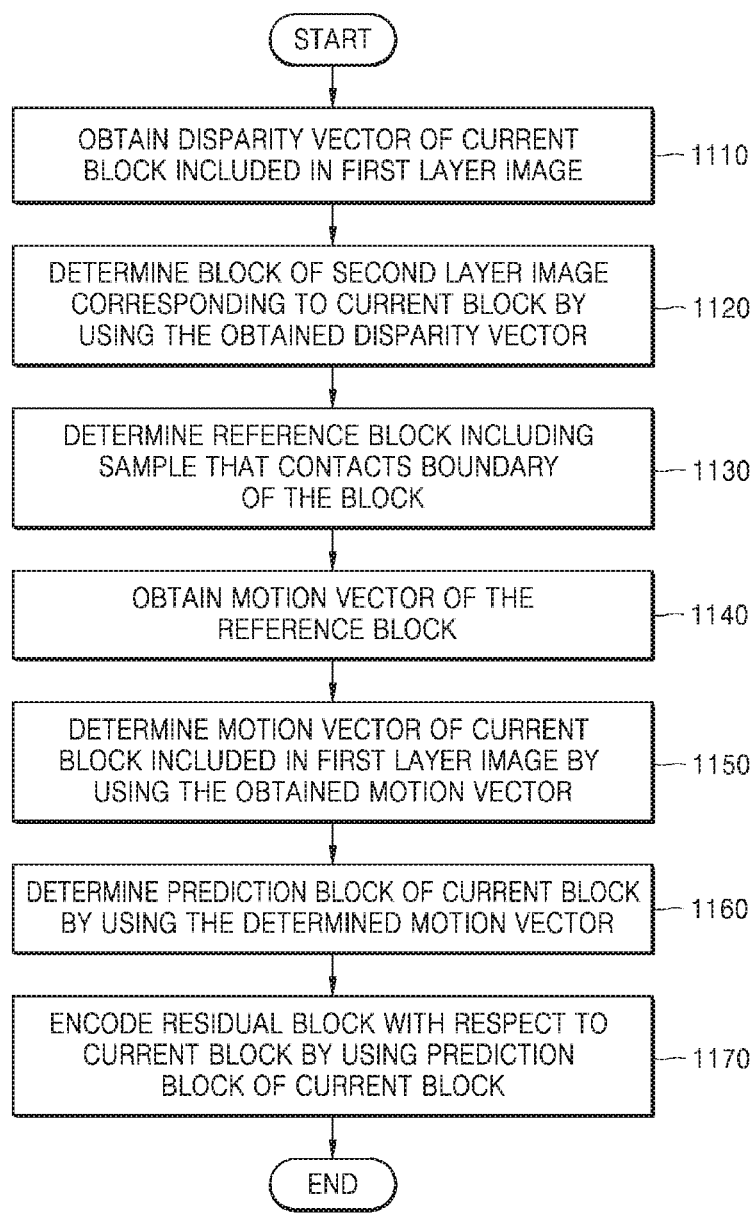
FIG. 1B illustrates a flowchart of an inter-layer video encoding method, according to various embodiments.

FIG. 1B illustrates a flowchart of an inter-layer video encoding method, according to various embodiments.

In operation 1110, the inter-layer video encoding apparatus 10 may obtain a disparity vector of a current block included in a first layer image. In this regard, the disparity vector of the current block may be determined by obtaining, from a bitstream, information about the disparity vector of the current block. Alternatively, the disparity vector of the current block may be derived from a disparity vector of a neighboring block of the current block. In operation 1120, the inter-layer video encoding apparatus 10 may determine a block of a second layer image corresponding to the current block by using the obtained disparity vector. The inter-layer video encoding apparatus 10 may determine, from the current block, the block of the second layer image indicated by the obtained disparity vector. In operation 1130, the inter-layer video encoding apparatus 10 may determine a reference block including a sample that contacts a boundary of the block. The inter-layer video encoding apparatus 10 may determine the reference block including the sample that contacts a corner of the block.

In operation 1140, the inter-layer video encoding apparatus 10 may obtain a motion vector of the reference block. The inter-layer video encoding apparatus 10 may obtain motion information including the motion vector. In this regard, the motion information may include the motion vector, a reference image index, and prediction direction information.

In operation 1150, the inter-layer video encoding apparatus 10 may determine a motion vector of the current block with respect to the first layer image by using the obtained motion vector. The inter-layer video encoding apparatus 10 may determine motion information of the current block with respect to the first layer image by using the motion information including the motion vector.

In operation 1160, the inter-layer video encoding apparatus 10 may determine a prediction block of the current block with respect to the first layer image by using the determined motion vector of the current block. The inter-layer video encoding apparatus 10 may determine the prediction block of the current block with respect to the first layer image by using the motion information of the current block including the motion vector of the current block. In more detail, the inter-layer video encoding apparatus 10 may determine at least one of an L0 prediction list and a L1 prediction list by using the prediction direction information, may determine an image of a different time which belongs to a same layer as the first layer image, from the at least one prediction list by using the reference image index, may determine, by using the motion vector, a block that corresponds to the current block and is in the image belonging to the same layer as the first layer image, and may determine a sample value of the prediction block of the current block by using a sample value of the determined block.

In operation 1170, the inter-layer video encoding apparatus 10 may determine a residual block with respect to the current block by using the prediction block of the current block, and may encode the residual block. The inter-layer video encoding apparatus 10 may generate a bitstream including the residual block.

The inter-layer video encoding apparatus 10 may include a central processor (not shown) that generally controls the first layer encoder 14, the second layer encoder 16, and the bitstream generator 18. Alternatively, the first layer encoder 14, the second layer encoder 16, and the bitstream generator 18 may operate due to individual processors (not shown), and the inter-layer video encoding apparatus 10 may operate as the individual processors systematically operate. Alternatively, the first layer encoder 14, the second layer encoder 16, and the bitstream generator 18 may be controlled by the control of an external processor (not shown) of the inter-layer video encoding apparatus 10.

The inter-layer video encoding apparatus 10 may include at least one data storage unit (not shown) in which input and output data of the first layer encoder 14, the second layer encoder 16, and the bitstream generator 18 is stored. The inter-layer video encoding apparatus 10 may include a memory controller (not shown) that manages data input and output of the data storage unit (not shown).

In order to output a video encoding result, the inter-layer video encoding apparatus 10 may operate in cooperation with an internal video encoding processor installed therein or an external video encoding processor so as to perform video encoding operations including transformation. The internal video encoding processor of the inter-layer video encoding apparatus 10 may perform the video encoding operations as a separate processor. Also, basic video encoding operations may be realized as the inter-layer video encoding apparatus 10, a central processing apparatus, or a graphic processing apparatus includes a video encoding processing module.

Figure 2A:
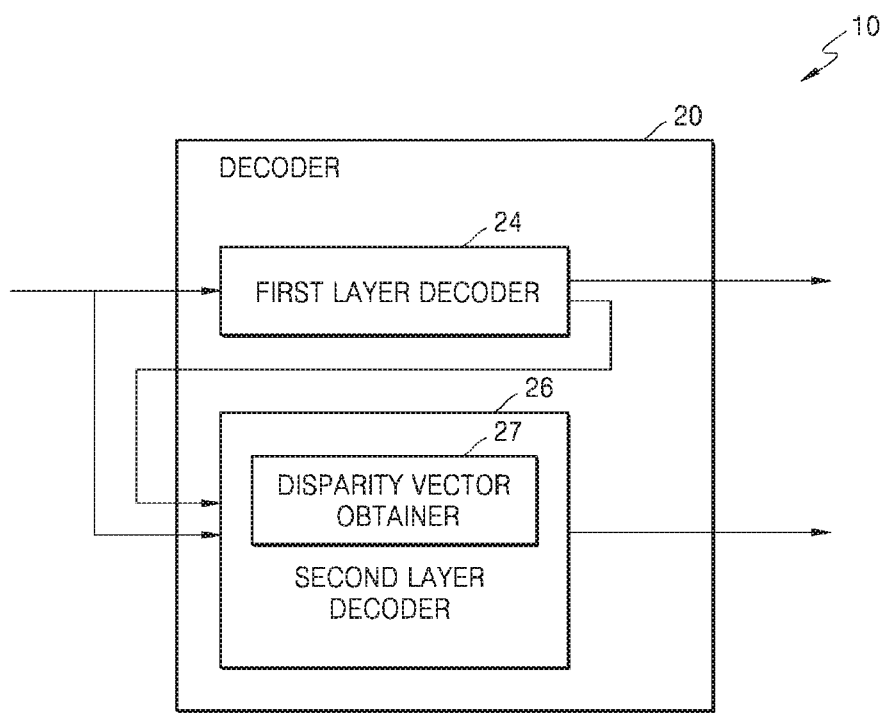
FIG. 2A is a block diagram of an inter-layer video decoding apparatus, according to various embodiments.

FIG. 2A is a block diagram of an inter-layer video decoding apparatus, according to various embodiments.

An inter-layer video decoding apparatus 20 according to various embodiments may include a decoder 22. The decoder 22 may include a first layer decoder 24 and a second layer decoder 26. The second layer decoder 26 may include a disparity vector obtainer 27.

The inter-layer video decoding apparatus 20 according to various embodiments may receive a bitstream of an encoded video. The inter-layer video decoding apparatus 20 according to various embodiments may receive the bitstream of the encoded video according to layers.

The inter-layer video decoding apparatus 20 may receive bitstreams according to layers, via a scalable encoding scheme. The number of layers of bitstreams received by the inter-layer video decoding apparatus 20 is not limited. However, for convenience of description, an embodiment in which the first layer decoder 24 of the inter-layer video decoding apparatus 20 receives and decodes a first layer stream and the second layer decoder 26 receives and decodes a second layer stream will be described.

For example, the inter-layer video decoding apparatus 20 based on spatial scalability may receive a stream in which image sequences having different resolutions are encoded in different layers. A first layer stream may be decoded to reconstruct an image sequence having low resolution and a second layer stream may be decoded to reconstruct an image sequence having high resolution.

As another example, a multiview video may be decoded according to a scalable video coding scheme. When a stereoscopic video stream is received in a plurality of layers, a first layer stream may be decoded to reconstruct left-view images. A second layer stream in addition to the first layer stream may be further decoded to reconstruct right-view images.

Alternatively, when a multiview video stream is received in a plurality of layers, a first layer stream may be decoded to reconstruct central-view images. A second layer stream in addition to the first layer stream may be further decoded to reconstruct left-view images. A third layer stream in addition to the first layer stream may be further decoded to reconstruct right-view images.

Alternatively, when a texture-depth video stream is received in a plurality of layers, a first layer stream may be decoded to reconstruct a texture image. A second layer stream may be further decoded by using the reconstructed texture image so as to reconstruct a depth image.

As another example, a scalable video coding method based on temporal scalability may be performed. A first layer stream may be decoded to reconstruct base frame rate images. A second layer stream may be further decoded to reconstruct high frame rate images.

Also, when there are at least three second layers, first layer images may be reconstructed from a first layer stream, and when a second layer stream is further decoded by referring to reconstructed first layer images, second layer images may be further reconstructed. When $K_{th}$ layer stream is further decoded by referring to reconstructed second layer images, $K_{th}$ layer images may be further reconstructed.

The inter-layer video decoding apparatus 20 may obtain encoded data of first layer images and second layer images from a first layer stream and a second layer stream, and in addition, may further obtain a motion vector generated via inter prediction and prediction information generated via inter-layer prediction.

For example, the inter-layer video decoding apparatus 20 may decode inter-predicted data per layer, and may decode inter-layer predicted data between a plurality of layers. Reconstruction may be performed through motion compensation and inter-layer video decoding based on a coding unit or a prediction unit.

Images may be reconstructed by performing motion compensation for a current image by referencing reconstructed images predicted via inter prediction of a same layer, with respect to each layer stream. Motion compensation is an operation in which a reconstructed image of a current image is reconstructed by synthesizing a reference image determined by using a motion vector of the current image and a residual component of the current image.

In addition, the inter-layer video decoding apparatus 20 may perform inter-layer video decoding by referring to prediction information of first layer images so as to decode a second layer image predicted via inter-layer prediction. Inter-layer video decoding is an operation in which prediction information of a current image is reconstructed by using prediction information of a reference block of a different layer so as to determine the prediction information of the current image.

The inter-layer video decoding apparatus 20 according to various embodiments may perform inter-layer video decoding for reconstructing third layer images predicted by using second layer images. An inter-layer prediction structure will be described below with reference to FIG. 3A.

However, the second layer decoder 26 according to various embodiments may decode a second layer stream without having to reference a first layer image sequence. Accordingly, it should not be limitedly construed that the second layer decoder 26 performs inter-layer prediction to decode a second layer image sequence.

The inter-layer video decoding apparatus 20 performs decoding according to blocks of each image of a video. A block may be, from among coding units according to a tree structure, a largest coding unit, a coding unit, a prediction unit, or a transformation unit.

The first layer decoder 24 may decode a first layer image by using parsed encoding symbols of the first layer image. When the inter-layer video decoding apparatus 20 receives streams encoded based on coding units of a tree structure, the first layer decoder 24 may perform decoding based on the coding units of the tree structure, per a largest coding unit of a first layer stream.

The first layer decoder 24 may obtain encoding information and encoded data by performing entropy decoding per largest coding unit. The first layer decoder 24 may reconstruct a residual component by performing inverse quantization and inverse transformation on encoded data obtained from a stream. The first layer decoder 24 according to another embodiment may directly receive a bitstream of quantized transformation coefficients. The residual component of images may be reconstructed by performing inverse quantization and inverse transformation on quantized transformation coefficients.

The first layer decoder 24 may determine a prediction image via motion compensation between same layer images, and may reconstruct first layer images by combining the prediction image and the residual component.

According to an inter-layer prediction structure, the second layer decoder 26 may generate a second layer prediction image by using samples of a reconstructed first layer image. The second layer decoder 26 may obtain a prediction error according to inter-layer prediction by decoding a second layer stream. The second layer decoder 26 may generate a reconstructed second layer image by combining a second layer prediction image and the prediction error.

The second layer decoder 26 may determine a second layer prediction image by using a reconstructed first layer image decoded by the first layer decoder 24. According to an inter-layer prediction structure, the second layer decoder 26 may determine a block of a first layer image, which is to be referenced by a coding unit or a prediction unit, of a second layer image. For example, a reconstructed block of a first layer image, which is located correspondingly to a location of a current block in a second layer image, may be determined.

The second layer decoder 26 may determine a second layer prediction block by using a reconstructed first layer block corresponding to a second layer block. The second layer decoder 26 may determine the second layer prediction block by using the reconstructed first layer block co-located with the second layer block.

The second layer decoder 26 may use a second layer prediction block determined by using a reconstructed first layer block according to an inter-layer prediction structure, as a reference image for inter-layer prediction of a second layer original block. In this case, the second layer decoder 26 may reconstruct a second layer block by synthesizing a sample value of a second layer prediction block determined by using a reconstructed first layer image and a residual component according to inter-layer prediction.

In addition, when the inter-layer video decoding apparatus 20 described above decodes a multiview video, an encoded first layer image may be a first view video and a second layer image may be a second view video. Also, when the inter-layer video decoding apparatus 20 described above decodes texture-depth images, an encoded first layer image may be a texture image and a second layer image may be a depth image.

Since a multiview image is obtained at the same time, similarity between images of views is very high. Accordingly, encoding efficiency may be increased by performing disparity compensation in which an area that is most similar to a block to be currently encoded is found and encoded from a different view image by using a disparity vector.

The inter-layer video decoding apparatus 20 may obtain the disparity vector for inter-layer prediction through a bitstream or may predict the disparity vector from other pieces of encoding information. For example, the disparity vector may be predicted from a disparity vector of neighboring blocks of the block to be currently reconstructed. Also, when the inter-layer video decoding apparatus 20 cannot predict the disparity vector from the disparity vector of the neighboring blocks, the inter-layer video decoding apparatus 20 may determine a default disparity vector to be the disparity vector.

Hereinafter, in more detail, an inter-layer video decoding process in which, when the second layer decoder 26 performs prediction on a current block included in a second layer, a reference block having prediction information is determined will now be described in detail.

The second layer decoder 26 may perform decoding on a current block of a second layer image. For example, the second layer decoder 26 may determine one or more coding units in the second layer image, and may perform decoding on the one or more coding units. In this regard, a coding unit to be currently decoded from among the one or more coding units is referred to as a current coding unit. The current block may be one of one or more prediction units determined from the current coding unit.

When the second layer decoder 26 determines to perform inter-layer prediction on the current block included in the second layer image, the disparity vector obtainer 27 may obtain a disparity vector of the current block.

The second layer decoder 26 may determine a block of a first layer image, which corresponds to the current block, by using the obtained disparity vector.

The second layer decoder 26 may determine the block of the first layer image, which corresponds to the current block, by using the obtained disparity vector. The second layer decoder 26 may determine the block of the first layer which is indicated by the disparity vector from the current block.

The second layer decoder 26 may determine a reference block including a sample that contacts the block of the first layer image. In this regard, the reference block indicates a block used in referring to prediction information during a prediction process. For example, the reference block may be a block used in referring to motion information when the current block is inter-layer predicted. The second layer decoder 26 may determine the reference block including the sample that contacts a corner of the block of the first layer image. The second layer decoder 26 may determine the reference block including the sample that contacts a right-bottom corner of the block of the first layer image.

The second layer decoder 26 may determine one or more reference blocks of the first layer image, based on a block unit for storing motion information. The reference block including the sample may be one of the determined one or more reference blocks. For example, the first layer image may be split into a plurality of blocks each having a predetermined size, and the reference block including the sample may be a block including the sample from among the plurality of blocks.

When it is assumed that a first sample is a sample that contacts a boundary of a block of the second layer image, if the first sample deviates from the boundary of the second layer image, the second layer decoder 26 may determine a second sample adjacent to an inner side of the boundary of the second layer image, and may determine a block to be a reference block, the block including the determined second sample adjacent to the inner side of the boundary of the second layer image.

The second layer decoder 26 may obtain motion information of the reference block. For example, the second layer decoder 26 may obtain a motion vector of the reference block. The second layer encoder 16 may obtain prediction direction information and a reference direction index of the reference block.

The second layer decoder 26 may determine motion information of the current block of the second layer image by using the obtained motion information. For example, the second layer decoder 26 may determine a motion vector of the current block of the second layer image by using the obtained motion vector. In addition, the second layer decoder 26 may determine prediction direction information and a reference direction index of the current block by using the obtained prediction direction information and the obtained reference direction index.

The second layer decoder 26 may determine a block in a reference image by using the motion information of the current block, and may determine a prediction block of the current block by using the determined block in the reference image. For example, the second layer decoder 26 may determine the reference image by using the prediction direction information and the reference direction index of the current block, may determine the block in the reference image by using the motion vector of the current block, and may determine a sample value of the prediction block of the current block by using a sample value of the determined block. In this regard, the reference image may indicate an image that is of a same layer as the second layer image and corresponds to a time different from a time of the second layer image.

The second layer decoder 26 may reconstruct the current block by using a residual block with respect to the current block and the prediction block of the current block, which are obtained from a bitstream It has been described above assuming that the inter-layer video decoding apparatus 20 is determined to perform inter-layer prediction.

Hereinafter, a process in which the inter-layer video decoding apparatus 20 determines a motion vector candidate, generates a merge candidate list including a merge candidate related to the motion vector candidate, and determines to perform inter-layer prediction on a current block by using the merge candidate list will be described in detail.

The inter-layer video decoding apparatus 20 determines various motion vector candidates by predicting various motion vectors so as to perform the inter-layer prediction on the current block.

For example, the inter-layer video decoding apparatus 20 may determine at least one motion vector, which is predicted from at least one spatial candidate block, to be at least one motion vector candidate. In addition, the inter-layer video decoding apparatus 20 may determine at least one motion vector, which is predicted from at least one temporal candidate block, to be at least one motion vector candidate.

The inter-layer video decoding apparatus 20 may determine a motion vector candidate (hereinafter, referred to as an inter-view motion prediction candidate) for inter-view motion prediction.

In addition, the inter-layer video decoding apparatus 20 may determine a motion vector candidate (hereinafter, referred to as a shifted inter-view motion prediction candidate) for shifted inter-view motion prediction.

The inter-layer video decoding apparatus 20 may determine a disparity vector of a current block of a second layer image (e.g., an image indicating a second view), and may determine a block of a first layer image (an image indicating a first view) by using the determined disparity vector. In this regard, the determination with respect to the block of the first layer image may involve determining a sample in the first layer image corresponding to a sample at a specific location in the current block and determining a block including the corresponding sample, and the motion vector candidate for the inter-view motion prediction may indicate a motion vector associated with the block including the corresponding sample. In this regard, the sample in the block may be a sample located at the center of the block.

The shifted inter-view motion prediction candidate may indicate a motion vector associated with a block including a sample determined in a manner that the inter-layer video decoding apparatus 20 determines the disparity vector of the current block of the second layer image (e.g., the image indicating a second view), determines the block of the first layer image (the image indicating a first view) by using the determined disparity vector, and determines the sample contacting the determined block.

The inter-layer video decoding apparatus 20 may determine the block of the first layer image (e.g., the image indicating a first view) by using a reference view index and a disparity vector derived from a neighboring block of the current block so as to determine the inter-view motion prediction candidate. In this regard, the reference view index is an index indicating an image related to a reference view from among a plurality of views, and it is assumed that the reference view index indicates the first layer image (e.g., the image indicating a first view).

The inter-layer video decoding apparatus 20 may determine the sample in the block included in the first layer image, and may obtain a motion vector associated with the block including the determined sample, thereby determining a motion vector candidate of the current block. In addition, the inter-layer video decoding apparatus 20 may determine a prediction direction and a reference image index by using prediction direction information and a reference image index associated with the block including the sample, and may determine a determined prediction direction with the motion vector candidate. The inter-layer video decoding apparatus 20 may obtain information of the prediction direction, may obtain an index (the reference image index) indicating the reference image from at least one prediction list of prediction lists (an L0 prediction list and an L1 prediction list) of the block including the sample, according to the obtained prediction direction, and may determine a prediction direction and a reference image index of the current block by using the obtained prediction direction and the obtained reference image index. The motion vector candidate may be determined together.

The prediction direction information is information indicating at least one prediction direction of the L0 prediction list and the L1 prediction list. For example, the prediction direction information may include L0 prediction direction information indicating availability of the L0 prediction list and L1 prediction direction information indicating availability of the L1 prediction list. That is, determination with respect to a prediction direction involves determining which prediction list of the L0 prediction list and the L1 prediction list is to be used in prediction. The reference image index may include an index indicating an image to be referenced from among images included in the L0 prediction list, and an index indicating an image to be referenced from among images included in the L1 prediction list.

The inter-layer video decoding apparatus 20 determines the motion vector candidate and then generates the merge candidate list. For example, the inter-layer video decoding apparatus 20 generates the merge candidate list including various merge candidates such as a spatial merge candidate, a temporal merge candidate, an inter-view motion prediction merge candidate, an inter-view disparity prediction merge candidate, and a motion parameter inheritance merge candidate.

In this regard, a motion vector candidate, a prediction direction, and a reference image index which are available in inter-layer prediction may have been determined with respect to a merge candidate. The merge candidate may be an indicator indicating a motion vector prediction scheme, and more particularly, may be a block used in the motion vector prediction scheme.

First, the inter-layer video decoding apparatus 20 determines whether each merge candidate is available, according to an order of priority of merge candidates. In this regard, when a merge candidate is available, this means that at least one prediction direction associated with the merge candidate is determined.

The inter-layer video decoding apparatus 20 adds the available merge candidate to the merge candidate list.

For example, the inter-layer video decoding apparatus 20 determines whether a temporal merge candidate is available, and if the temporal merge candidate is available, the inter-layer video decoding apparatus 20 adds the temporal merge candidate to the merge candidate list. The inter-layer video decoding apparatus 20 may determine an inter-view motion prediction merge candidate having next priority is available, according to the order of priority of merge candidates.

When the inter-view motion prediction merge candidate is available, the inter-layer video decoding apparatus 20 adds the inter-view motion prediction merge candidate to the merge candidate list. When the motion parameter inheritance merge candidate is available, the inter-layer video decoding apparatus 20 adds the motion parameter inheritance merge candidate to the merge candidate list.

However, the number of merge candidates that can be added to the merge candidate list may be limited. Thus, the inter-layer video decoding apparatus 20 adds available merge candidates according to the order of priority of merge candidates, and when the number of currently-added merge candidates is greater than the number of determined merge candidates, the inter-layer video decoding apparatus 20 no longer adds a merge candidate to the merge candidate list.

The inter-layer video decoding apparatus 20 obtains a merge index. The merge index may be obtained from a bitstream. The merge index is an index indicating one of the merge candidates added to the merge candidate list.

The inter-layer video decoding apparatus 20 determines a merge candidate from the merge candidate list by using the merge index.

When the merge candidate determined by using the merge index is the inter-view motion prediction merge candidate, the inter-layer video decoding apparatus 20 performs motion compensation by using a motion vector candidate, prediction direction information, and a reference image index which are determined through inter-view motion prediction. When the merge candidate determined by using the merge index is a shifted inter-view motion prediction merge candidate, the inter-layer video decoding apparatus 20 may perform motion compensation by using a shifted inter-view motion vector candidate, prediction direction information, and a reference image index which are associated with the shifted inter-view motion prediction merge candidate.

When the merge candidate determined by using the merge index is one of the inter-view motion prediction merge candidate and the shifted inter-view motion prediction merge candidate, the inter-layer video decoding apparatus 20 generates a prediction sample value of the current block by performing motion compensation on the current block by using a corresponding motion vector candidate.

The inter-layer video decoding apparatus 20 determines a motion vector candidate and a reference image from a prediction list indicated by prediction direction information, the reference image being indicated by a reference image index by using the prediction direction information, and determines a reference block in the reference image, the reference block being associated with the current block. The inter-layer video decoding apparatus 20 generates the prediction sample value of the current block by using a sample value of the determined reference block.

For example, the inter-layer video decoding apparatus 20 may determine at least one of the L0 prediction list and the L1 prediction list by using the prediction direction information, and may determine, by using the reference image index, the reference image from among images included in the determined at least one prediction list. In addition, when the reference image is determined, the inter-layer video decoding apparatus 20 may determine a block in the reference image from the current block by using a motion vector included in the determined motion vector candidate, and may determine a sample value of the prediction block associated with the current block by using a sample value of the block in the reference image.

The inter-layer video decoding apparatus 20 may determine the inter-view motion prediction candidate based on a sub-block. Equally, the inter-layer video decoding apparatus 20 may determine the shifted inter-view motion prediction candidate based on a sub-block.

In this regard, the sub-block based inter-view motion prediction candidate may correspond a motion vector candidate determined with respect to (a sub-block of) the current block in a manner that at least one sub-block is determined from the current block of the second layer image, a candidate sub-block of the first layer image is determined by using the determined sub-block, and motion information of a block including a sample in the candidate sub-block is used, and the sub-block based shifted inter-view motion prediction candidate may correspond to a motion vector candidate determined with respect to (the sub-block of) the current block by using motion information of a block including a sample neighboring the candidate sub-block. The sub-block based inter-view motion prediction candidate and the sub-block based shifted inter-view motion prediction candidate are used in predicting a motion vector by using a sub-block of which size is equal to or less than a size of the current block, so that a prediction error may be minimized.

For example, the inter-layer video decoding apparatus 20 determines not to perform depth-based block partition prediction on a current block included in the first layer image, and when the first layer image is a texture image, the inter-layer video decoding apparatus 20 may determine the sub-block based inter-view motion prediction candidate. Otherwise, the inter-layer video decoding apparatus 20 may determine the inter-view motion prediction candidate. In addition, when the current image is not a depth image, the inter-layer video decoding apparatus 20 may determine the shifted inter-view motion prediction candidate.

In more detail, the inter-layer video decoding apparatus 20 may determine the inter-view motion prediction candidate by determining a motion vector by using a location, a width, and a height of the current block, a reference view index of the current block, and a disparity vector associated with the current block. In addition, a reference image index and a prediction direction which are associated with the inter-view motion prediction candidate may be determined with the motion vector.

The inter-layer video decoding apparatus 20 may determine a block of the second layer image by using the disparity vector associated with the current block. The inter-layer video decoding apparatus 20 may determine a sample in the block of the second layer image, thereby determining the inter-view motion prediction candidate. The inter-layer video decoding apparatus 20 may determine a reference block including the sample in the block. In this regard, when the determined reference block is not encoded in an intra prediction mode, the inter-layer video decoding apparatus 20 may obtain, from the reference block, a prediction direction of the reference block, and a reference picture index and a motion vector associated with the reference block, and when an image indicated by the reference picture index in a reference picture list associated with the reference block is equal to an $i_{th}$ image in a reference picture list associated with the current block, the inter-layer video decoding apparatus 20 may determine that the inter-view motion prediction candidate to be available, may determine the reference picture index to be i, and may determine the motion vector of the reference block to be the inter-view motion prediction candidate.

The inter-layer video decoding apparatus 20 may determine a sample adjacent to a shifted block of the second layer image, thereby determining the inter-view motion prediction candidate. The inter-layer video decoding apparatus 20 may determine a reference block including the sample adjacent to the block. A process of determining the shifted inter-view motion prediction candidate after determining the reference block is equal to a process of determining the inter-view motion prediction candidate, thus, detailed descriptions thereof are omitted.

When the inter-layer video decoding apparatus 20 determines the sub-block based inter-view motion prediction candidate, the inter-layer video decoding apparatus 20 may determine a block of the first layer image by using the disparity vector associated with the current block of the second layer image, and may determine at least one sub-block from the block of the first layer image. Equally, the inter-layer video decoding apparatus 20 may determine at least one sub-block from the current block. In this regard, the number of at least one sub-block determined from the current block and a relative location of at least one sub-block in the current block may be equal to the number of at least one sub-block determined from the block of the second layer image and a relative location of at least one sub-block in the block.

The inter-layer video decoding apparatus 20 may determine an inter-view motion prediction candidate for each sub-block in the current block. In more detail, a process of determining an inter-view motion prediction candidate for each sub-block in the current block is similar to a process of determining an inter-view motion prediction candidate for the current block, and differences therebetween are sizes and locations of blocks, thus, detailed descriptions thereof are omitted here. When a sub-block for which an inter-view motion prediction candidate cannot be determined is present from among sub-blocks in the current block, the inter-view motion prediction candidate of the sub-block may be determined by using an inter-view motion prediction candidate of another sub-block. The inter-layer video decoding apparatus 20 performs motion compensation on each sub-block by using inter-view motion prediction candidates of the sub-blocks.

With reference to FIG. 2A, descriptions have been provided assuming that the first layer image is a base layer image, and the second layer image is an enhancement layer image. A base layer indicates a layer that can be reconstructed by using its own layer, and an enhancement layer indicates a layer that can be reconstructed by using information of a different layer.

The terms "first" and "second" described with reference to FIG. 2A are added to emphasize a difference therebetween, it should not be limitedly construed that "first layer image" is previously encoded and of which motion information is referred to, and "second layer image, third layer image, $K_{th}$ layer image . . . " are images to refer to the motion information of the first layer image.

Hereinafter, in the descriptions described with reference to FIG. 2B, the second layer image may mean a previously-encoded image of which motion information is referred to, and the first layer image may mean an image to be currently encoded and to refer to the motion information.

Figure 2B:
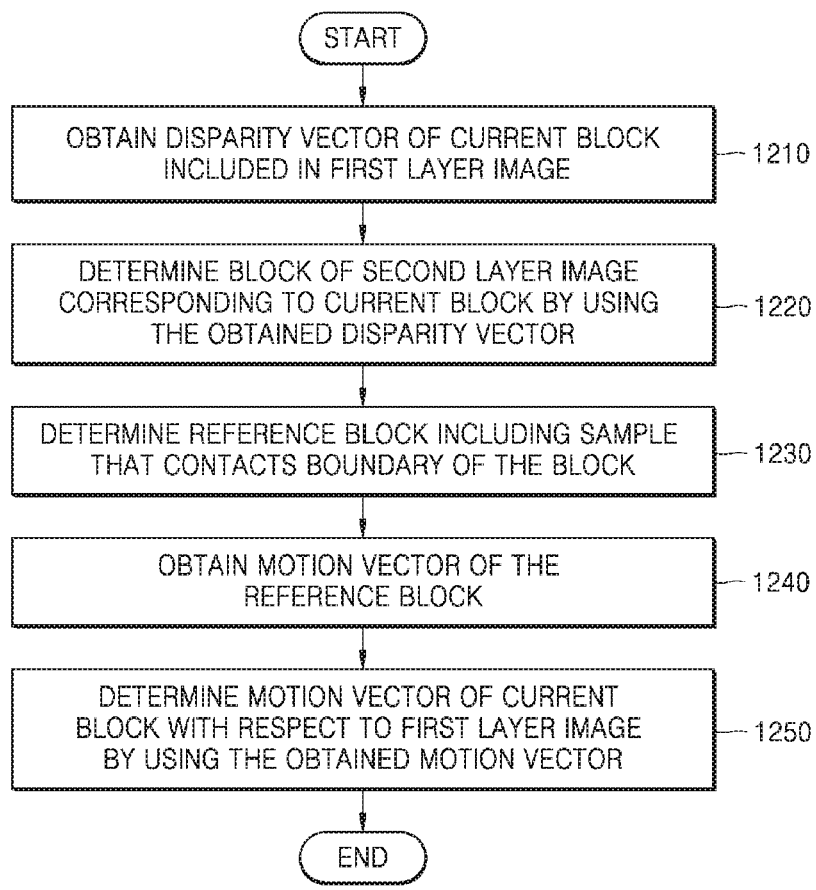
FIG. 2B illustrates a flowchart of an inter-layer video decoding method, according to various embodiments.

FIG. 2B illustrates a flowchart of an inter-layer video decoding method, according to various embodiments.

In operation 1210, the inter-layer video decoding apparatus 20 may obtain a disparity vector of a current block included in a first layer image.

In operation 1220, the inter-layer video decoding apparatus 20 may determine a block of a second layer image corresponding to the current block by using the obtained disparity vector.

In operation 1230, the inter-layer video decoding apparatus 20 may determine a reference block including a sample that contacts a boundary of the block. The inter-layer video decoding apparatus 20 may determine the reference block including the sample that contacts a corner of the block.

In operation 1240, the inter-layer video decoding apparatus 20 may obtain a motion vector of the reference block. The inter-layer video decoding apparatus 20 may obtain a prediction direction and a reference image index of the reference block with the motion vector of the reference block.

In operation 1250, the inter-layer video decoding apparatus 20 may determine a motion vector of a current block with respect to the first layer image by using the obtained motion vector. The inter-layer video decoding apparatus 20 may determine a prediction direction and a reference image index of the current block by using the obtained prediction direction of the reference block and the obtained reference image index.

The inter-layer video decoding apparatus 20 may determine a prediction block of the current block by using the determined motion vector of the current block. In more detail, the inter-layer video decoding apparatus 20 may determine a reference image by using the prediction direction and the reference image index of the current block, may determine a block in the reference image by using the motion vector of the current block, and may determine a sample value of the prediction block of the current block by using a sample value of the determined reference block.

The inter-layer video decoding apparatus 20 may obtain a residual block associated with the current block from a bitstream, and may reconstruct the current block by using the residual block associated with the current block and the prediction block of the current block. In more detail, the inter-layer video decoding apparatus 20 may reconstruct the current block by adding a sample value of the residual block associated with the current block to the sample value of the prediction block of the current block.

Hereinafter, with reference to FIG. 3A, an inter-layer prediction structure that may be performed by the inter-layer video encoding apparatus 10 according to various embodiments will now be described below.

Figure 3A:
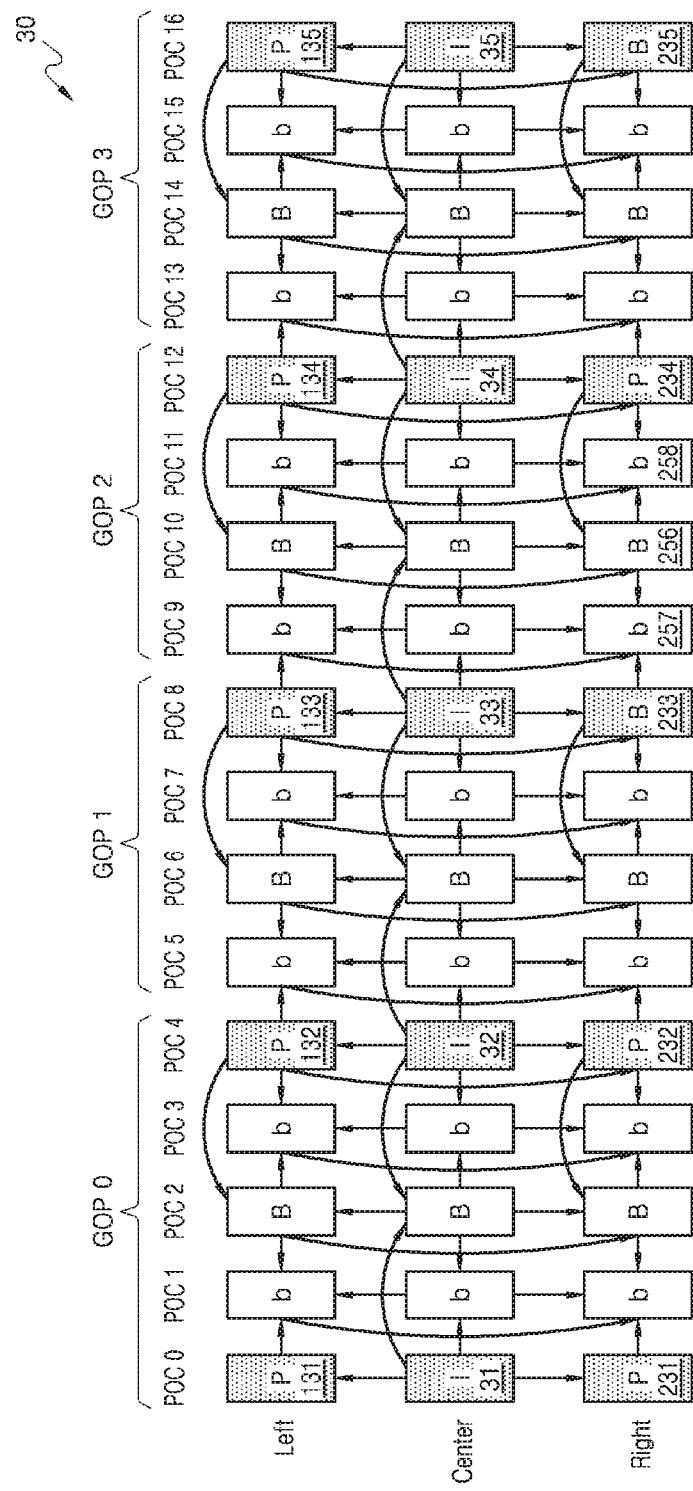
FIG. 3A illustrates an inter-layer prediction structure, according to various embodiments.

FIG. 3A illustrates an inter-layer prediction structure, according to various embodiments.

The inter-layer video encoding apparatus 10 according to an embodiment may prediction-encode base view images, left-view images, and right-view images according to a reproduction order 30 of a multiview video prediction structure of FIG. 3A.

According to the reproduction order 30 of the multiview video prediction structure according to a related technology, images of the same view are arranged in a horizontal direction. Accordingly, the left-view images indicated by 'Left' are arranged in the horizontal direction in a row, the base view images indicated by 'Center' are arranged in the horizontal direction in a row, and the right-view images indicated by 'Right' are arranged in the horizontal direction in a row. Compared to the left/right-view images, the base view images may be central-view images.

Also, images having the same picture order count (POC) order are arranged in a vertical direction. A POC order of images indicates a reproduction order of images forming a video. 'POC X' indicated in the reproduction order 30 of the multiview video prediction structure indicates a relative reproduction order of images in a corresponding column, wherein a reproduction order is in front when a value of X is low, and is behind when the value of X is high.

Thus, according to the reproduction order 30 of the multiview video prediction structure according to the related technology, the left-view images indicated by 'Left' are arranged in the horizontal direction according to the POC order (reproduction order), the base view images indicated by 'Center' are arranged in the horizontal direction according to the POC order (reproduction order), and the right-view images indicated by 'Right' are arranged in the horizontal direction according to the POC order (reproduction order). Also, the left-view image and the right-view image located on the same column as the base view image have different views but the same POC order (reproduction order).

Four consecutive images form one group of pictures (GOP) according to views. Each GOP includes images between consecutive anchor pictures, and one anchor picture (key picture).

An anchor picture is a random access point, and when a reproduction location is arbitrarily selected from images arranged according to a reproduction order, i.e., a POC order, while reproducing a video, an anchor picture closest to the reproduction location according to the POC order is reproduced. The base layer images include base layer anchor pictures 31, 32, 33, 34, and 35, the left-view images include left-view anchor pictures 131, 132, 133, 134, and 135, and the right-view images include right-view anchor pictures 231, 232, 233, 234, and 235.

Multiview images may be reproduced and predicted (reconstructed) according to a GOP order. First, according to the reproduction order 30 of the multiview video prediction structure, images included in GOP 0 may be reproduced, and then images included in GOP 1 may be reproduced, according to views. In other words, images included in each GOP may be reproduced in an order of GOP 0, GOP 1, GOP 2, and GOP 3. Also, according to a coding order of the multiview video prediction structure, the images included in GOP 1 may be predicted (reconstructed), and then the images included in GOP 1 may be predicted (reconstructed), according to views. That is, the images included in each GOP may be predicted (reconstructed) in an order of GOP 0, GOP 1, GOP 2, and GOP 3.

According to the reproduction order 50 of the multiview video prediction structure, inter-view prediction (inter-layer prediction) and inter prediction are performed on images. In the multiview video prediction structure, an image where an arrow starts is a reference image, and an image where an arrow ends is an image predicted by using a reference image.

A prediction result of base view images may be encoded and then output in a form of a base view image stream, and a prediction result of additional view images may be encoded and then output in a form of a layer bitstream. Also, a prediction encoding result of left-view images may be output as a first layer bitstream, and a prediction encoding result of right-view images may be output as a second layer bitstream.

Only inter-prediction is performed on base view images. That is, the base layer anchor pictures 31, 32, 33, 34, and 35 of an I-picture type do not refer to other images, but remaining images of B- and b-picture types are predicted by referring to other base view images. Images of a B-picture type are predicted by referring to an anchor picture of an I-picture type, which precedes the images of a B-picture type according to a POC order, and a following anchor picture of an I-picture type. Images of a b-picture type are predicted by referring to an anchor picture of an I-type, which precedes the image of a b-picture type according a POC order, and a following image of a B-picture type, or by referring to an image of a B-picture type, which precedes the images of a b-picture type according to a POC order, and a following anchor picture of an I-picture type.

Inter-view prediction (inter-layer prediction) that references different view images, and inter prediction that references same view images are performed on each of left-view images and right-view images.

Inter-view prediction (inter-layer prediction) may be performed on the left-view anchor pictures 131, 132, 133, 134, and 135 by respectively referring to the base view anchor pictures 31, 32, 33, 34, and 35 having the same POC order. Inter-view prediction may be performed on the right-view anchor pictures 231, 232, 233, 234, and 235 by respectively referring to the base view anchor pictures 31, 32, 33, 34, and 35 or the left-view anchor pictures 131, 132, 133, 134, and 135 having the same POC order. Also, inter-view prediction (inter-layer prediction) may be performed on remaining images other than the left-view images 131, 132, 133, 134, and 135 and the right-view images 231, 232, 233, 234, and 235 by referring to other view images having the same POC.

Remaining images other than the anchor pictures 131, 132, 133, 134, 135, 231, 232, 233, 234, and 235 from among left-view images and right-view images are predicted by referring to the same view images.

However, each of the left-view images and the right-view images may not be predicted by referring to an anchor picture that has a preceding reproduction order from among additional view images of the same view. That is, in order to perform inter prediction on a current left-view image, left-view images excluding a left-view anchor picture that precedes the current left-view image in a reproduction order may be referenced. Equally, in order to perform inter prediction on a current right-view image, right-view images excluding a right-view anchor picture that precedes the current right-view image in a reproduction order may be referenced.

Also, in order to perform inter prediction on a current left-view image, prediction may be performed by referring to a left-view image that belongs to a current GOP but is to be reconstructed before the current left-view image, instead of referring to a left-view image that belongs to a GOP before the current GOP of the current left-view image. The same is applied to a right-view image.

The inter-layer video decoding apparatus 20 according to various embodiments may reconstruct base view images, left-view images, and right-view images according to the reproduction order 30 of the multiview video prediction structure of FIG. 3A.

Left-view images may be reconstructed via inter-view disparity compensation that refers to base view images and inter motion compensation that refers to left-view images. Right-view images may be reconstructed via inter-view disparity compensation that refers to base view images and left-view images, and inter motion compensation that refers to right-view images. Reference images may be reconstructed first for disparity compensation and motion compensation of left-view images and right-view images.

For inter motion compensation of a left-view image, left-view images may be reconstructed via inter motion compensation that refers to a reconstructed left-view reference image. For inter motion compensation of a right-view image, right-view images may be reconstructed via inter motion compensation that refers to a reconstructed right-view reference image.

Also, for inter motion compensation of a current left-view image, only a left-view image that belongs to a current GOP of the current left-view image but is to be reconstructed before the current left-view image may be referenced, and a left-view image that belongs to a GOP before the current GOP is not referenced. The same is applied to a right-view image.

Figure 3B:
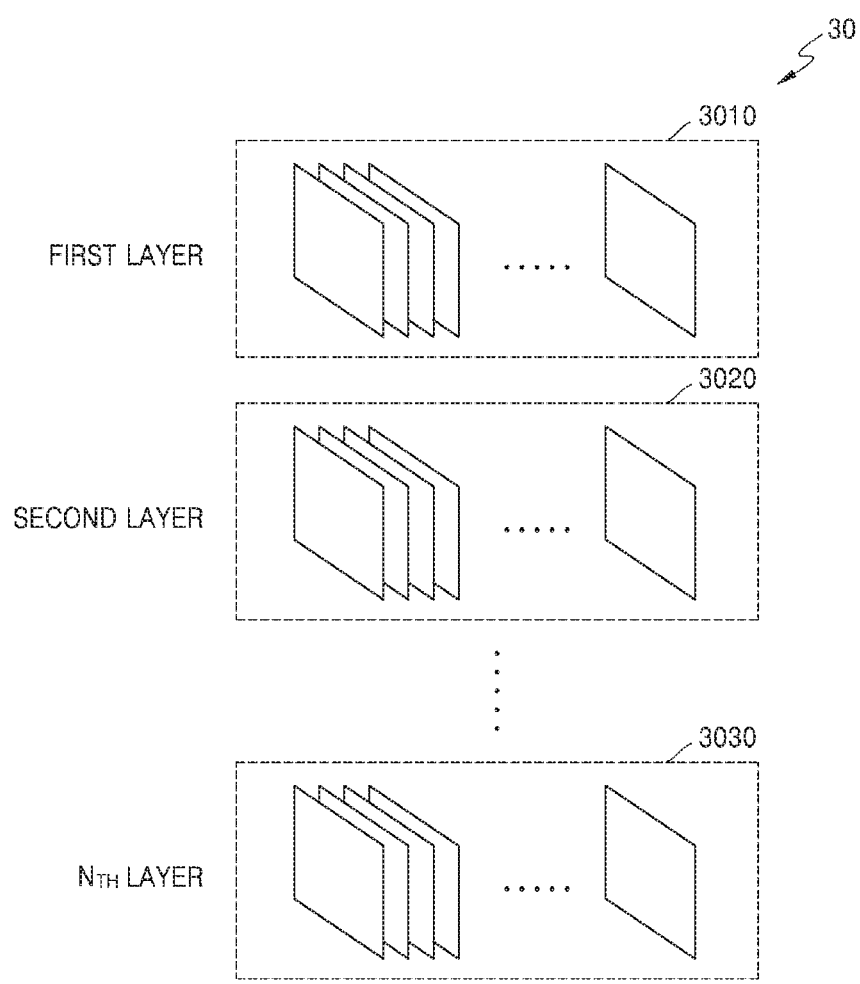
FIG. 3B is a diagram of a multilayer video, according to various embodiments.

FIG. 3B is a diagram of a multilayer video, according to various embodiments.

In order to provide an optimum service in various network environments and various terminals, the inter-layer video encoding apparatus 10 may output a scalable bitstream by encoding multilayer image sequences having various spatial resolutions, various qualities, various frame rates, and different viewpoints. That is, the inter-layer video encoding apparatus 10 may generate and output a scalable video bitstream by encoding an input image according to various scalability types. Scalability includes temporal, spatial, quality, and multiview scalabilities, and a combination thereof. Such scalabilities may be classified according to types. Also, the scalabilities may be distinguished by using dimension identifiers in the types, respectively.

For example, the scalability has the same scalability type as the temporal, spatial, quality, and multiview scalability. Also, the scalability may be distinguished by using a scalability dimension identifier according to types. For example, when the scalabilities are different, the scalabilities may have different dimension identifiers. For example, a high scalability dimension may be assigned to a high-dimensional scalability with respect to the scalability type.

When a bitstream is dividable into valid sub-streams, the bitstream is scalable. A spatial scalable bitstream includes sub-streams of various resolutions. In order to distinguish different scalabilities in the same scalability type, a scalability dimension is used. The scalability dimension may be expressed by a scalability dimension identifier.

For example, the spatial scalable bitstream may be divided into sub-streams having different resolutions, such as a quarter video graphics array (QVGA), a video graphics array (VGA), a wide video graphics array (WVGA). For example, layers having different resolutions may be distinguished by using a dimension identifier. For example, the QVGA sub-stream may have 0 as a spatial scalability dimension identifier value, the VGA sub-stream may have 1 as a spatial scalability dimension identifier value, and the WVGA sub-stream may have 2 as a spatial scalability dimension identifier value.

A temporal scalable bitstream includes sub-streams having various frame rates. For example, the temporal scalable bitstream may be divided into sub-streams having a frame rate of 7.5 Hz, a frame rate of 15 Hz, a frame rate of 30 Hz, and a frame rate of 60 Hz. A quality scalable bitstream may be divided into sub-streams having different qualities according to a coarse-grained scalability (CGS) method, a medium-grained scalability (MGS) method, and a fine-grained scalability (FGS) method. The temporal scalability may also be distinguished by using different dimensions according to different frame rates, and the quality scalability may also be distinguished by using different dimensions according to different methods.

A multiview scalable bitstream includes sub-streams of different viewpoints in one bitstream. For example, in a stereoscopic image, a bitstream includes a left image and a right image. Also, a scalable bitstream may include sub-streams related to a multiview image and encoded data of a depth map. The viewpoint scalability may also be distinguished by using different dimensions according to different viewpoints.

Different scalable expansion types may be combined with each other. That is, a scalable video bitstream may include sub-streams in which image sequences of a multilayer including images, wherein at least one of temporal, spatial, quality, and multiview scalabilities are different from each other, are encoded.

FIG. 3B illustrates image sequences 3010, 3020, and 3030 having different scalable expansion types. The image sequence 3010 of a first layer, the image sequence 3020 of a second layer, and an image sequence 3030 of an $n_{th}$ layer (where, n is an integer) may be image sequences in which at least one of resolutions, qualities, and viewpoints are different from each other. Also, one of the image sequence 3010 of the first layer, the image sequence 3020 of the second layer, and the image sequence 3030 of the $n_{th}$ layer may be an image sequence of a base layer and the other image sequences may be image sequences of an enhancement layer.

For example, the image sequence 3010 of the first layer may include images of a first viewpoint, the image sequence 3020 of the second layer may include images of a second viewpoint, and the image sequence 3030 of the $n_{th}$ layer may include images of an $n_{th}$ viewpoint. As another example, the image sequence 3010 of the first layer may be a left-view image of a base layer, the image sequence 3020 of the second layer may be a right-view image of the base layer, and the image sequence 3030 of the $n_{th}$ layer may be a right-view image of an enhancement layer. However, an embodiment is not limited thereto, and the image sequences 3010, 3020, and 3030 having different scalable expansion types may be image sequences having different image attributes.

Figure 3C:
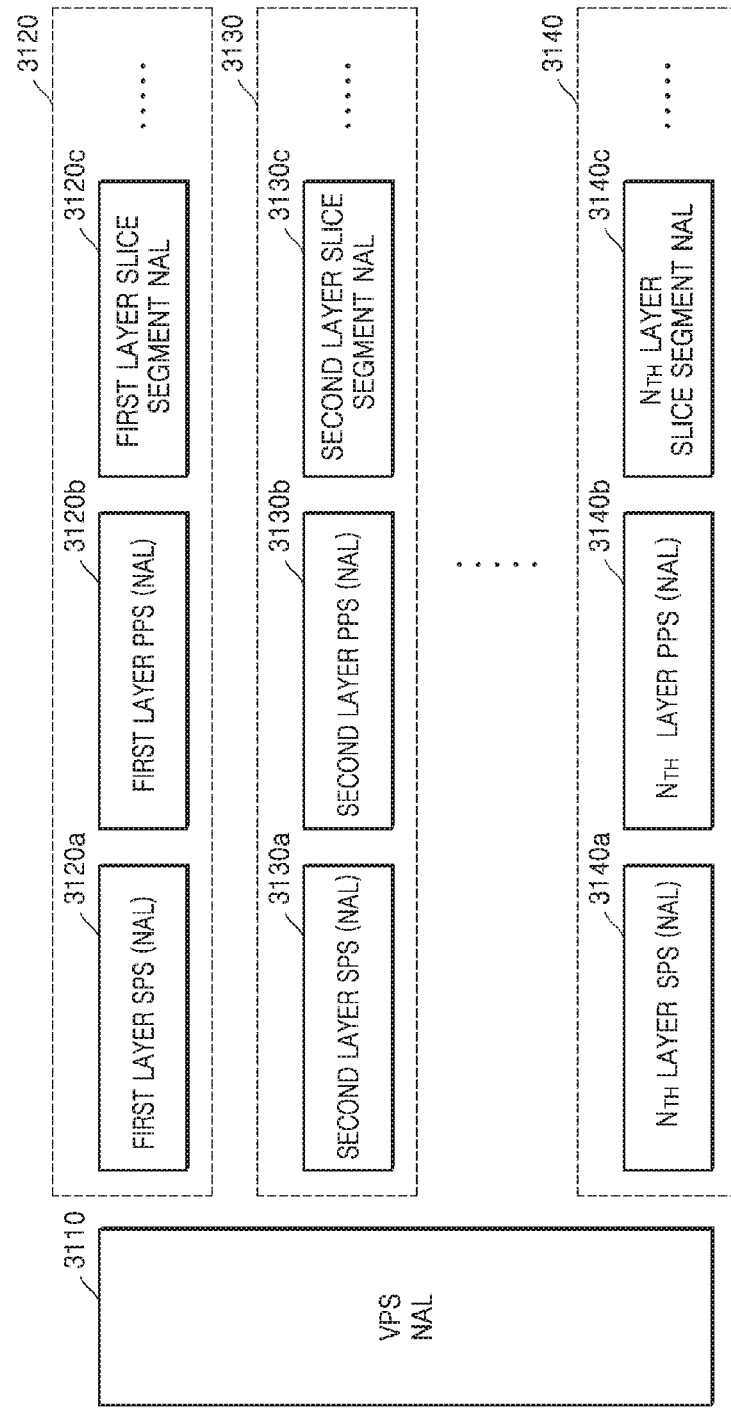
FIG. 3C illustrates network abstraction layer (NAL) units including encoded data of a multilayer video, according to various embodiments.

FIG. 3C illustrates network abstraction layer (NAL) units including encoded data of a multilayer video, according to various embodiments.

As described above, the bitstream generator 18 outputs NAL units including encoded multilayer video data and additional information. A video parameter set (VPS) includes information applied to multilayer image sequences 3120, 3130, and 3140 included in the multilayer video. The NAL unit including information about the VPS is referred to as a VPS NAL unit 3110.

The VPS NAL unit 3110 includes a common syntax element shared by the multilayer image sequences 3120, 3130, and 3140, information about an operation point to stop transmission of unnecessary information, and essential information about an operation point required during session negotiation, such as a profile or a level. In particular, the VPS NAL unit 3110 according to an embodiment includes scalability information related to a scalability identifier for realizing scalability in a multilayer video. The scalability information is information for determining scalability applied to the multilayer image sequences 3120, 3130, and 3140 included in the multilayer video.

The scalability information includes information about a scalability type and a scalability dimension applied to the multilayer image sequences 3120, 3120, and 3140 included in the multilayer video. In encoding and decoding methods according to a first embodiment, the scalability information may be directly obtained from a value of a hierarchical identifier included in a NAL unit header. The hierarchical identifier is an identifier for distinguishing a plurality of layers included in a VPS. The VPS may signal the hierarchical identifier of each layer through VPS extension. The layer identifier of each layer of the VPS may be signaled by being included in the VPS NAL unit. For example, the hierarchical identifier of the NAL units belong to a certain layer of the VPS may be included in the VPS NAL unit. For example, the hierarchical identifier of the NAL unit belonging to the VPS may be signaled through the VPS extension. Accordingly, in encoding and decoding methods according to various embodiments, the scalability information about a layer of the NAL units belonging to the VPS may be obtained by using the hierarchical identifier value of the NAL units.

Figure 4A:
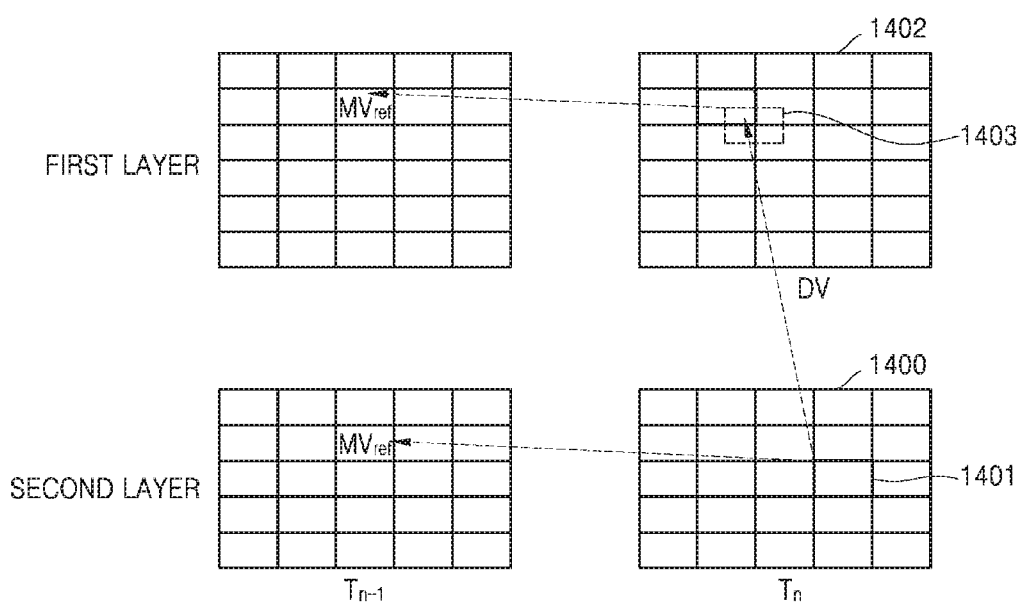
FIG. 4A is a diagram for describing a disparity vector for inter-layer prediction, according to various embodiments.

FIG. 4A is a diagram for describing a disparity vector for inter-layer prediction, according to various embodiments.

Referring to FIG. 4A, the inter-layer video decoding apparatus 20 according to various embodiments may perform inter-layer prediction to find a first layer reference block 1403 included in a first layer reference image 1402, which corresponds to a current block 1401 included in a second layer current picture 1400, by using a disparity vector DV, and may perform disparity compensation by using the first layer reference block 1403.

Also, the inter-layer video decoding apparatus 20 according to various embodiments may, for inter motion compensation, obtain a reference motion vector $MV_{ref}$ of the first layer reference block 1403 indicated by the disparity vector DV from the second layer current block 1401 and may predict a motion vector $MV_{cur}$ of the current block 1401 by using the obtained reference motion vector $MV_{ref}$. In this case, the inter-layer video decoding apparatus 20 may perform motion compensation between second layer images $T_{n-1}$ and $T_n$ by using the predicted motion vector $MV_{cur}$.

As described above, in order to perform inter-layer prediction by referring to different view images, a disparity vector is required. The disparity vector may be transmitted from an encoding apparatus to a decoding apparatus through a bitstream as separate information, or may be predicted based on a depth image or a neighboring block of a current block. That is, the predicted disparity vector may be a neighboring blocks disparity vector (NBDV) and a depth oriented NBDV (DoNBDV).

First, when a disparity vector (a motion vector in an inter-layer direction) is obtained from neighboring block candidates, the NBDV denotes a disparity vector of a current block predicted by using the obtained disparity vector.

In addition, when a depth image corresponding to a different layer image is encoded and decoded, a depth block corresponding to a current block may be determined by using the NBDV. In this regard, a representative depth value is determined from among depth values included in the determined depth block, and the determined depth value is converted to a disparity vector by using a camera parameter. The DoNBDV denotes a disparity vector predicted by using the disparity vector converted from the depth value.

Figure 4B:
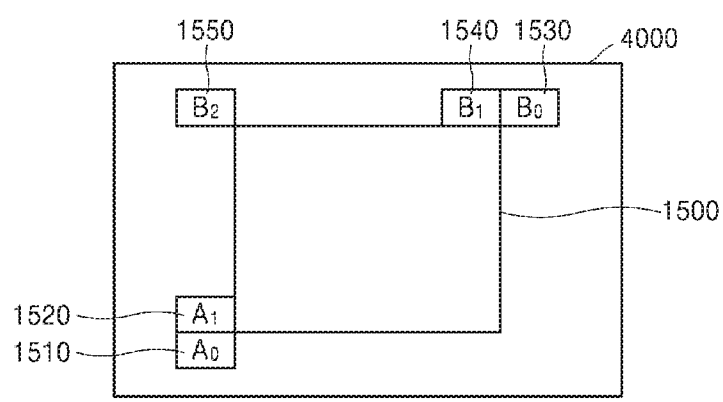
FIG. 4B is a diagram for describing spatially-neighboring block candidates for predicting a disparity vector, according to various embodiments.

FIG. 4B is a diagram for describing spatially-neighboring block candidates for predicting a disparity vector, according to various embodiments.

Referring to FIG. 4B, the inter-layer video decoding apparatus 20 according to an embodiment may search for spatially-neighboring block candidates in a predetermined searching order (for example, z-scan or raster scan) in order to predict a disparity vector of a current block 1500 in a current picture 4000. In this regard, found neighboring block candidates may be blocks that are spatially adjacent to the current block 1500. The spatially-adjacent blocks may be coding units or prediction units.

Alternatively, for example, the inter-layer video decoding apparatus 20 according to another embodiment may search for spatially-neighboring block candidates such as a neighboring block A0 1510 located in the left bottom of the current block 1500, a neighboring block A1 1520 located in the left of the current block 1500, a neighboring block B0 1530 located in the right top of the current block 1500, a neighboring block B1 1540 located in the top of the current block 1500, and a neighboring block B2 1550 located in the left top of the current block 1500 so as to obtain a disparity vector. In order to obtain the disparity vector, neighboring blocks at predetermined locations may be searched in an order of the neighboring block candidates A1 1520, B1 1540, B0 1530, A0 1510, and B2 1550.

Figure 4C:
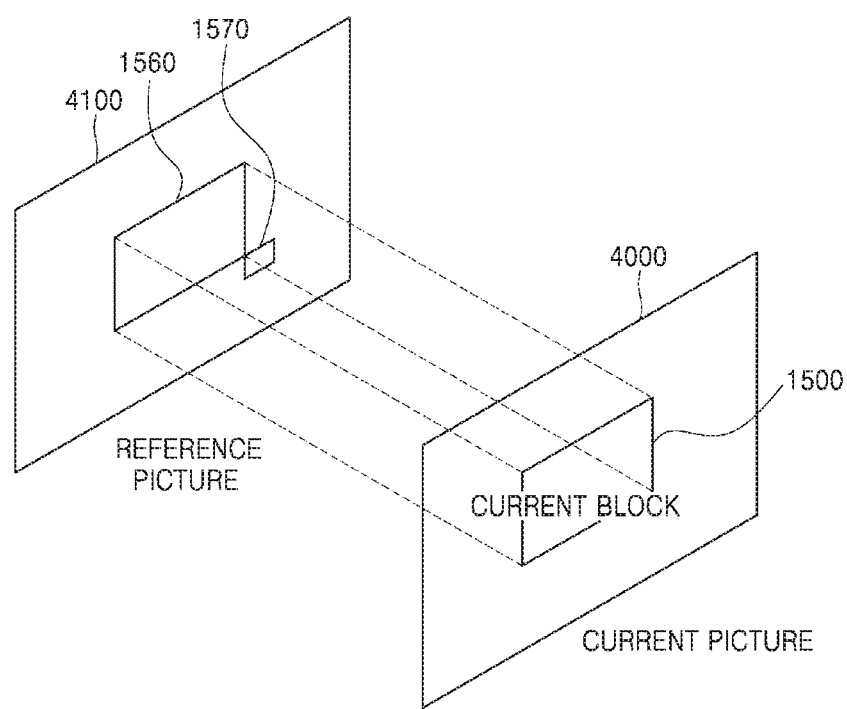
FIG. 4C is a diagram for describing a temporally-neighboring block candidate for predicting a disparity vector, according to various embodiments.

FIG. 4C is a diagram for describing a temporally-neighboring block candidate for predicting a disparity vector, according to various embodiments.

Referring to FIG. 4C, in order for the inter-layer video decoding apparatus 20 to perform inter prediction on the current block 1500 included in the current image 4000, at least one of a block Col 1560 that is included in a reference picture 4100 and is co-located with the current block 1500 and an adjacent block of the co-located block 1560 may be included in a temporally-neighboring block candidate. For example, a right bottom block BR 1570 of the co-located block Col 1560 may be included in a temporal prediction candidate. In addition, a block used in determining the temporal prediction candidate may be a coding unit or a prediction unit.

Figure 5:
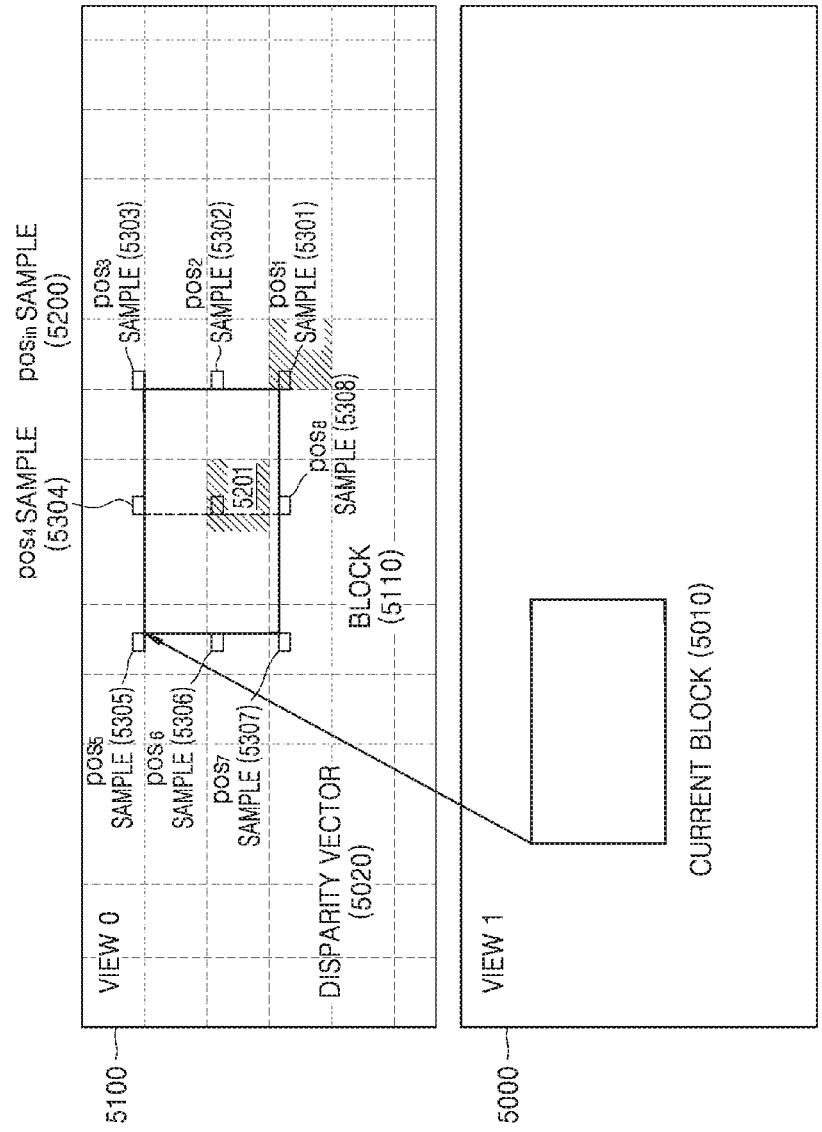
FIG. 5 is a diagram for describing a process in which an inter-layer video decoding apparatus determines a sample included in a reference block by using a disparity vector so as to determine the reference block of which motion information is to be referred to, according to various embodiments.

FIG. 5 is a diagram for describing a process in which an inter-layer video decoding apparatus determines a sample included in a reference block by using a disparity vector so as to determine the reference block of which motion information is to be referred to, according to various embodiments.

Referring to FIG. 5, when the inter-layer video decoding apparatus 20 determines to perform inter-layer prediction on a current block 5010 of a view-1 image 5000, the inter-layer video decoding apparatus 20 may determine a disparity vector 5020 of the current block 5010. For example, the inter-layer video decoding apparatus 20 may derive the disparity vector 5020 of the current block 5010 from a neighboring block or may obtain the disparity vector 5020 of the current block 5010 from a bitstream.

The inter-layer video decoding apparatus 20 may determine a block 5110 of a view-0 image 5100 by using the disparity vector 5020, the block 5110 corresponding to the current block 5010. In this regard, the view-0 image 5100 may indicate an image corresponding to a different view of a same time as the view-1 image 5000.

The inter-layer video decoding apparatus 20 may determine a $pos_{in}$ sample 5300 located in the block 5110 of the view-0 image 5100 so as to determine the reference block, and may determine a block including the determined sample 5200 to be the reference block. In this regard, the reference block including the determined sample 5200 may equal to the block 5110.

Alternatively, the inter-layer video decoding apparatus 20 may not determine the block 5110 to be the reference block but may determine a block 5201 including motion information to be the reference block.

For example, the inter-layer video decoding apparatus 20 may determine units having a predetermined size and storing motion information (hereinafter, referred to as motion information units) from the view-0 image 5100. The inter-layer video decoding apparatus 20 may determine a motion information unit including a sample from among the determined motion information units to be the reference block. In addition, for example, the inter-layer video decoding apparatus 20 may determine one or more prediction units. The inter-layer video decoding apparatus 20 may determine a prediction unit including the sample from among the determined prediction units to be the reference block.

The inter-layer video decoding apparatus 20 may obtain a motion vector of the reference block, may determine a motion vector of the current block 5010 by using the motion vector of the reference block, and may perform motion compensation on the current block 5010 by using the motion vector.

The inter-layer video decoding apparatus may determine the motion vector of the reference block to be an inter-view motion prediction candidate. The inter-layer video decoding apparatus 20 may determine the motion vector, a prediction direction and a reference image index of the current block 5010. The inter-layer video decoding apparatus 20 may determine a merge candidate from among a plurality of merge candidates including a merge candidate (an inter-view motion prediction merge candidate) associated with the inter-view motion prediction candidate, and may perform prediction on the current block 5010 by using motion information associated with the merge candidate. In this regard, when the inter-layer video decoding apparatus 20 determines the inter-view motion prediction merge candidate from among the plurality of merge candidates, the inter-layer video decoding apparatus 20 may perform prediction on the current block 5010 by using motion information (the inter-view motion prediction candidate, and a related prediction direction and a related reference image index) associated with the inter-view motion prediction merge candidate.

The inter-layer video decoding apparatus 20 may determine motion information of the current block 5010 by using motion information of the inter-view motion prediction candidate, and may perform motion compensation on the current block 5010 by using the motion information of the current block 5010.

In order to determine the reference block, the inter-layer video decoding apparatus 20 may determine a sample from among samples 5301, 5302, 5303, 5304, 5305, 5306, 5307, and 5308 that contact the block 5110 of the view-0 image 5100, and may determine a block including the determined sample (hereinafter, referred to as the reference sample) to be the reference block. The inter-layer video decoding apparatus 20 may determine a motion information unit including the reference sample from among motion information units of the view-0 image 5100 to be the reference block, or may determine a prediction unit including the reference sample from among prediction units of the view-0 image 5100 to be the reference block.

The inter-layer video decoding apparatus 20 may obtain a motion vector of the reference block, may determine a motion vector of the current block 5010 by using the motion vector of the reference block, and may perform motion compensation by using the motion vector.

In more detail, the inter-layer video decoding apparatus 20 may determine the motion vector of the reference block to be a shifted inter-view motion prediction candidate. The inter-layer video decoding apparatus 20 may determine the motion vector with a prediction direction and a reference image index of the current block 5010. The inter-layer video decoding apparatus 20 may determine a merge candidate from among a plurality of merge candidates including a merge candidate (an inter-view motion prediction merge candidate) associated with the inter-view motion prediction candidate, and may perform prediction on the current block 5010 by using motion information associated with the merge candidate. When the inter-layer video decoding apparatus 20 determines the shifted inter-view motion prediction merge candidate from among the plurality of merge candidates, the inter-layer video decoding apparatus 20 may perform prediction on the current block 5010 by using motion information of the shifted inter-view motion prediction candidate. The inter-layer video decoding apparatus 20 may determine motion information of the current block 5010 by using the motion information of the shifted inter-view motion prediction candidate, and may perform motion compensation on the current block 5010 by using the motion information of the current block 5010.

The sample from among the samples 5301, 5302, 5303, 5304, 5305, 5306, 5307, and 5308 that contact the block 5110 of the view-0 image 5100 may be previously determined. For example, the inter-layer video decoding apparatus 20 may previously determine the $pos_1$ sample 5301 from among the samples 5301, 5302, 5303, 5304, 5305, 5306, 5307, and 5308 that contact the block 5110 of the view-0 image 5100, may determine a block 5202 including the sample 5301 to be the reference block, and may determine the motion vector of the reference block to be the shifted inter-view motion prediction candidate. The inter-layer video decoding apparatus 20 may determine the prediction direction and the reference image index of the current block 5010 by using the motion vector with a prediction direction and a reference image index of the reference block.

As illustrated in FIG. 5, a location of a sample 5200 in the block 5110 of the view-0 image 5100 or locations of the samples 5301, 5302, 5303, 5304, 5305, 5306, 5307, and 5308 that contact the block 5110 may be previously determined based on the block 5110.

The inter-layer video decoding apparatus 20 may determine the $pos_1$ sample 5301 contacting a right-bottom corner of the block 5110 so as to derive a block in the right bottom of the block 5110 as the reference block, and may determine the block including the $pos_1$ sample 5301 to be the reference block. Alternatively, the inter-layer video decoding apparatus 20 may determine the $pos_e$ sample 5302 contacting a right end of the block 5110 so as to derive a block in the right of the block 5110 as the reference block, and may determine a block including the $pos_e$ sample 5302 to be the reference block. The inter-layer video decoding apparatus 20 may determine the $pos_3$ sample 5303 contacting a right-top corner of the block 5110 so as to derive a block in the right top of the block 5110 as the reference block, and may determine a block including the $pos_3$ sample 5303 to be the reference block. The inter-layer video decoding apparatus 20 may determine the $pos_4$ sample 5304 contacting a top end of the block 5110 so as to derive a block in the top of the block 5110, and may determine a block including the $pos_4$ sample 5304 to be the reference block. The inter-layer video decoding apparatus 20 may determine the $pos_5$ sample 5305 contacting a left-top corner of the block 5110 so as to derive a block in the left top of the block 5110 as the reference block, and may determine a block including the $pos_y$ sample 5305 to be the reference block. The inter-layer video decoding apparatus 20 may determine the $pos_h$ sample 5306 contacting a left end of the block 5110 so as to derive a block in the left of the block 5110 as the reference block, and may determine a block including the $pos_h$ sample 5306 to be the reference block. The inter-layer video decoding apparatus 20 may determine the $pos_7$ sample 5307 contacting a left-bottom corner of the block 5110 so as to derive a block in the left bottom of the block 5110 as the reference block, and may determine a block including the $pos_7$ sample 5307 to be the reference block. The inter-layer video decoding apparatus 20 may determine the $pos_8$ sample 5308 contacting a bottom end of the block 5110 so as to derive a block in the bottom of the block 5110 as the reference block, and may determine a block including the $pos_8$ sample 5308 to be the reference block.

Locations of the $pos_2$ sample 5302, the $pos_4$ sample 5304, the $pos_h$ sample 5306, and the $pos_8$ sample 5308 may be previously determined to each be in a straight line with respect to the $pos_{in}$ sample 5300 located in the block 5110. A location of the $pos_{in}$ sample 5300 located in the block 5110 may be in the center of the block 5110, but it is not limited thereto and the $pos_{in}$ sample 5300 may be located at a different point in the block 5110. In this case, the locations of the $pos_2$ sample 5302, the $pos_4$ sample 5304, the $pos_6$ sample 5306, and the $pos_8$ sample 5308 may be changed according to the location of the $pos_{in}$ sample 5300.

When the inter-layer video decoding apparatus 20 determines the reference block, the inter-layer video decoding apparatus 20 may obtain motion information of the reference block, and may determine motion information of the current block 5010 by using the obtained motion information.

The inter-layer video decoding apparatus 20 may determine a block of a reference image (not shown) of a time different from that of the view-1 image 5000, and may determine a prediction block of the current block 5010 by using a block of the reference image. The inter-layer video decoding apparatus 20 may obtain a residual block of the current block 5010 from a bitstream, and may reconstruct the current block 5010 by using the prediction block of the current block 5010 and the residual block of the current block 5010.

The inter-layer video decoding apparatus 20 may determine a sample from among the samples 5301, 5302, 5303, 5304, 5305, 5306, 5307, and 5308 that contact the block 5110 of the view-0 image 5100 so as to determine the reference block. For example, the inter-layer video decoding apparatus 20 may determine availability of a motion vector of each of blocks respectively including the samples 5301, 5302, 5303, 5304, 5305, 5306, 5307, and 5308, according to a predetermine scan order, and may determine the sample from among the samples 5301, 5302, 5303, 5304, 5305, 5306, 5307, and 5308 based on the determined availability of the motion vector. Alternatively, the inter-layer video decoding apparatus may obtain, from the bitstream, information indicating a sample from among samples, and may determine the sample from among the samples 5301, 5302, 5303, 5304, 5305, 5306, 5307, and 5308 by using the obtained information.

The inter-layer video decoding apparatus 20 may compare a plurality of pieces of motion information of the blocks respectively including the samples 5301, 5302, 5303, 5304, 5305, 5306, 5307, and 5308, according to a predetermine scan order, thereby determining a sample included in a block having optimal motion information. In addition, the inter-layer video decoding apparatus 20 may determine the sample from among the samples 5301, 5302, 5303, 5304, 5305, 5306, 5307, and 5308, based on a location relationship between the current block 5010 and the block 5110. For example, if a location of the block 5110 in the view-0 image 5100 is in the right bottom of a location of the current block 5010 in the view-1 image 5000, the inter-layer video decoding apparatus 20 may determine the sample 5301 located in the right bottom of the block 5110.

With reference to FIG. 5, a process of determining a reference block of an image indicating a different view is described, but the present disclosure is not limited thereto, thus, when a reference block of an image of a different time and a same view is determined, an inner sample of a block co-located with the current block 5010 or a sample contacting the block co-located with the current block 5010 may be determined, and a block including the determined sample may be determined to be the reference block.

In the above, a process of determining, by the inter-layer video decoding apparatus 20, the sample from among the samples 5301, 5302, 5303, 5304, 5305, 5306, 5307, and 5308 is described in detail, but the present disclosure is not limited to the samples 5301, 5302, 5303, 5304, 5305, 5306, 5307, and 5308, thus, it is obvious to one of ordinary skill in the art that the inter-layer video decoding apparatus 20 may use different samples contacting the block 5110, or may use only some samples of the samples 5301, 5302, 5303, 5304, 5305, 5306, 5307, and 5308.

Figure 6:
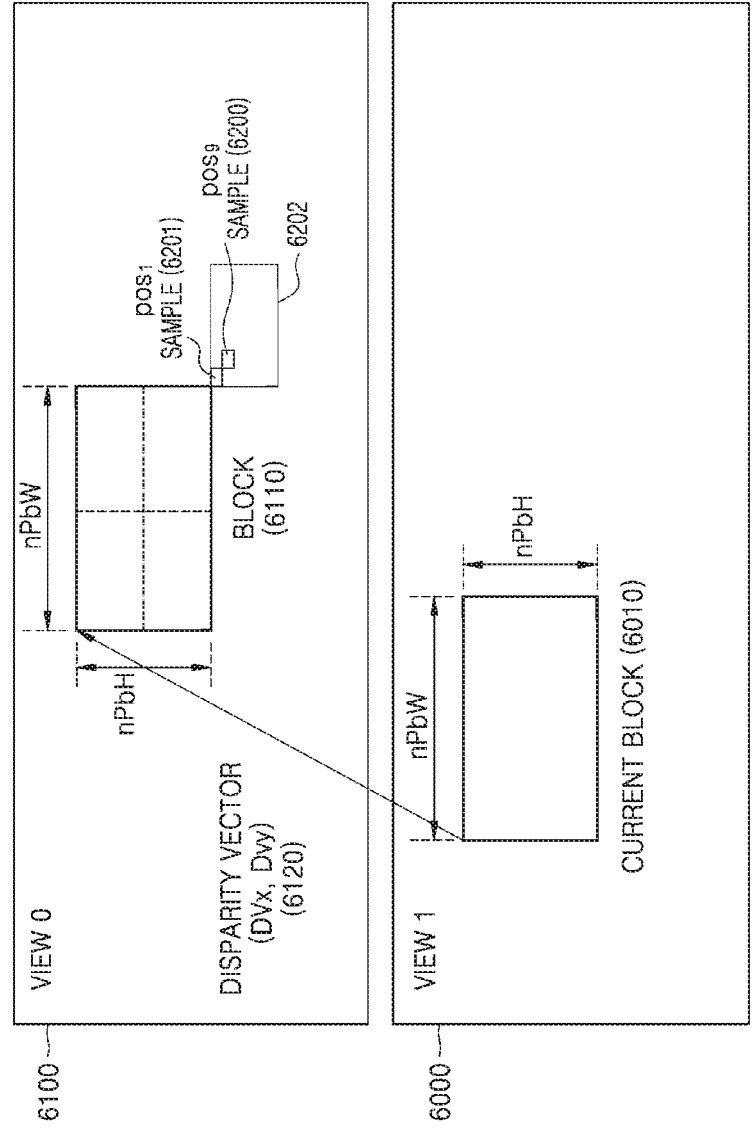
FIG. 6 is a diagram for describing a process in which an inter-layer video decoding apparatus determines a sample included in a reference block by using a disparity vector so as to determine a reference block of which motion information is to be referred to, according to various embodiments.

FIG. 6 is a diagram for describing a process in which an inter-layer video decoding apparatus determines a sample included in a reference block by using a disparity vector so as to determine a reference block of which motion information is to be referred to, according to various embodiments.

It is assumed that the inter-layer video decoding apparatus 20 determines a shifted inter-view motion prediction candidate.

Referring to FIG. 6, the inter-layer video decoding apparatus 20 may determine a disparity vector 6020 of a current block 6010 in a view-1 image 6000 by using a disparity vector of a neighboring block. The inter-layer video decoding apparatus 20 may determine, by using the disparity vector 6020 of the current block 6010, a block 6110 in a view-0 image 6100 indicated by the disparity vector 6020.

In order to determine a reference block, the inter-layer video decoding apparatus 20 may not determine a $pos_9$ sample 6200 separate from the block 6110 but may determine a $pos_1$ sample 6201 that directly contacts the block 6110.

In more detail, the inter-layer video decoding apparatus 20 may determine a location of the $pos_1$ sample 6201 by using Equation 1 and Equation 2.

$$xRefFull=xPb+(nPbW>>1)+((DVx+nPbW*2+2)>>2) \quad \text{[Equation 1]}$$

$$yRefFull=yPb+(nPbH>>1)+((DVy+nPbH*2+2)>>2) \quad \text{[Equation 2]}$$

In this regard, xRefFull may indicate an x-coordinate location of the $pos_1$ sample 6201, and yRefFull may indicate a y-coordinate location of the $pos_1$ sample 6201. xPb may indicate an x-coordinate location of (a left-top pixel in) a current block, and yPb may indicate a y-coordinate location of (the left-top pixel in) the current block. nPbW may indicate a width of the current block, and nPbH may indicate a height of the current block. DVx may mean an x-component about a disparity vector with a ¼ pixel accuracy (i.e., a fractional pixel accuracy), and DVy may mean a y-component about the disparity vector with a ¼ pixel accuracy. DVx and DVy are the disparity vectors each having a ¼ pixel accuracy and thus may include decimal points, but here, it is assumed that DVx and DVy are each expressed as an integer by multiplying 4 thereto. In this regard, xRefFull and yRefFull may indicate locations of an integer pixel.

The inter-layer video decoding apparatus 20 may additionally determine a location of a sample so as to determine the reference block. The inter-layer video decoding apparatus 20 may additionally determine the location of the sample by using a location of the $pos_e$ sample 6201. The inter-layer video decoding apparatus 20 may determine the location (xRef, yRef) of the sample by using Equation 3 and Equation 4 below.

$$xRef=Clip3(0,PicWidthInSampleL-1,(xRefFull>>N)<<N) \quad \text{[Equation 3]}$$

$$yRef=Chp3(0,PrcHeightInSampleL-1,(yRefFull>>N)<<N) \quad \text{[Equation 4]}$$

In this regard, PicWidthInSamplesL may indicate a width of an entire image with respect to a luma sample, PicHeightInSamplesL may indicate a height of the entire image with respect to the luma sample, and N may indicate a value obtained by applying log 2 to a predetermined-size block unit storing motion information. For example, if the block unit storing motion information is 8×8, N may be 3. Clip3 (x,y,z) function may be a function in which x is output for z<x, y is output for z>y, and z is output for an otherwise case.

The inter-layer video decoding apparatus 20 may obtain motion information of a block 6202 including the sample at the location of (xRef, yRef), and may determine motion information of the current block by using the obtained motion information. In this regard, the block 6202 including the sample located at (xRef, yRef) may be a prediction unit including a sample from among prediction units determined from the view-0 image 6100.

Figure 7:
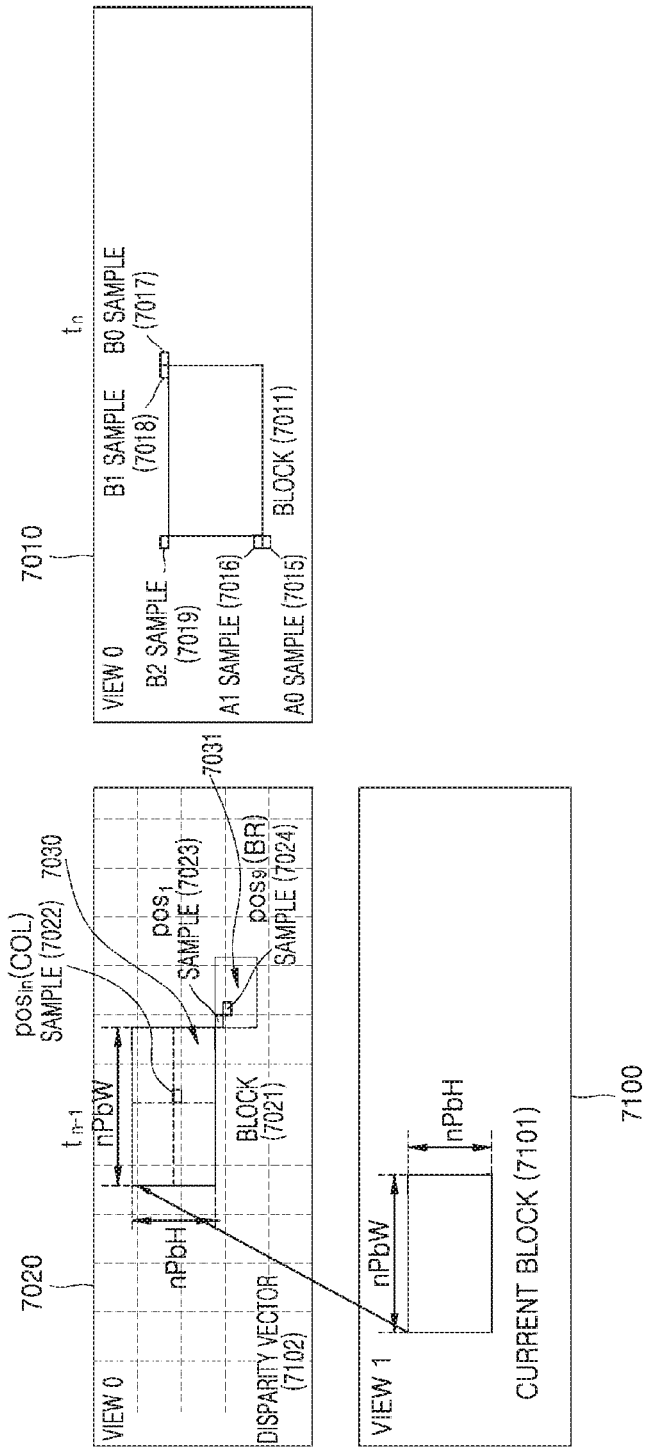
FIG. 7 is a diagram for describing a process in which the inter-layer video decoding apparatus determines a reference block and then performs prediction according to various prediction methods, according to various embodiments.

FIG. 7 is a diagram for describing a process in which the inter-layer video decoding apparatus 20 determines a reference block according to various prediction methods, according to various embodiments.

Referring to FIG. 7, the inter-layer video decoding apparatus 20 may determine a sample from among samples 7015, 7016, 7017, 7018, and 7019 included in neighboring blocks of a block 7011, may determine blocks respectively including at least one sample to be reference blocks, respectively, may obtain a plurality of pieces of motion information of the reference blocks, and may determine motion information of the block 7011 to be currently decoded, by using the plurality of pieces of motion information of the reference blocks In addition, the inter-layer video decoding apparatus 20 may derive motion information of the block 7011 to be currently decoded, by using motion information of a neighboring block, may determine a block 7021 by using the derived motion information of the block 7011 to be currently decoded, the block 7021 being included in an image 7020 indicating a same view and different time with respect to a first image 7010 to be currently decoded, and may determine a sample from among an inner $pos_{in}$(COL) sample 7022 in the block 7021 and a $pos_1$(BR) sample 7023 contacting the block 7021.

The inter-layer video decoding apparatus 20 may determine a block including a sample, and may determine motion information of the block 7011 by using motion information of the block including the sample. When the inter-layer video decoding apparatus 20 obtains the motion information of the block including the sample, the inter-layer video decoding apparatus 20 may fetch, from a memory, motion information stored in the memory.

Hereinafter, it is assumed that the inter-layer video decoding apparatus 20 attempts to decode a second image 7100. The second image 7100 may be an image indicating a different view and different time with respect to the first image 7010, and indicating a same time with respect to the image 7020.

The inter-layer video decoding apparatus 20 may determine a disparity vector 7102 of a current block 7101 in the second image 7100, and may determine a block 7021 included in the image 7020 by using the disparity vector 7102 of the current block 7101.

The inter-layer video decoding apparatus 20 may determine a sample 7024 spaced apart from the block 7021, and may determine a block 7031 including the sample 7024 to be a reference block. The inter-layer video decoding apparatus 20 may obtain motion information of the block 7031, and may determine motion information of the current block 7101 in the second image 7100 by using the motion information of the block 7031. In this regard, the sample 7024 is different from the sample 7023 used in decoding the first image and thus, the block 7031 of which motion information is obtained may be different from a block 7030 used in decoding the first image. Thus, motion information of the block 7030 which was previously fetched from the memory cannot be used, and the motion information of the block 7031 has to be additionally fetched. Thus, since the inter-layer video decoding apparatus 20 fetches motion information twice, complexity of the memory may be increased. However, if it is determined that the sample 7023 is equally used in decoding the first image 7010 and decoding the second image 7100, the block 7030 including the sample 7023 is equally determined, thus, the motion information of the block 7031 is equally used. Thus, the inter-layer video decoding apparatus 20 may determine the motion information of the current block 7101 of the second image 7100 by using the motion information that was fetched when the inter-layer video decoding apparatus 20 decoded the first image 7010. That is, the inter-layer video decoding apparatus 20 does not additionally fetch motion information so that complexity of the memory may be decreased.

In addition, when the inter-layer video decoding apparatus 20 decodes the current block 7101 in the second image 7100, the inter-layer video decoding apparatus 20 does not determine the sample 7024 but determines the sample 7023, and determines the block 7030 to be a reference block, the block 7030 being closer than the block 7031 of the sample 7024, so that motion information of the current block is determined by using motion information of the reference block which is more similar to the motion information of the current block than the motion information of the block 7031 distant from the block 7021, and thus efficiency in encoding and decoding may be increased.

As described above, the inter-layer video encoding apparatus 10 according to various embodiments and the inter-layer video decoding apparatus 20 according to various embodiments split blocks, which are split from video data, into coding units of a tree structure, and use coding units, prediction units, transformation units, or the like so as to perform inter-layer prediction or inter prediction on a coding unit. Hereinafter, with reference to FIGS. 8 through 20, a video encoding method, a video encoding apparatus, a video decoding method, and a video decoding apparatus based on coding units having a tree structure and transformation units, according to various embodiments, will be described.

In principle, during encoding and decoding processes for a multilayer video, encoding and decoding processes for first layer images and encoding and decoding processes for second layer images are separately performed. That is, when inter-layer prediction is performed on a multilayer video, encoding and decoding results of single-layer videos may be mutually referred to, but separate encoding and decoding processes are performed according to single-layer videos.

Accordingly, since video encoding and decoding processes based on coding units having a tree structure as described below with reference to FIGS. 8 through 20 for convenience of description are video encoding and decoding processes for processing a single-layer video, only inter prediction and motion compensation are performed. However, as described above with reference to FIGS. 1A through 7, in order to encode and decode a video stream, inter-layer prediction and compensation are performed on base layer images and second layer images.

Figure 8:
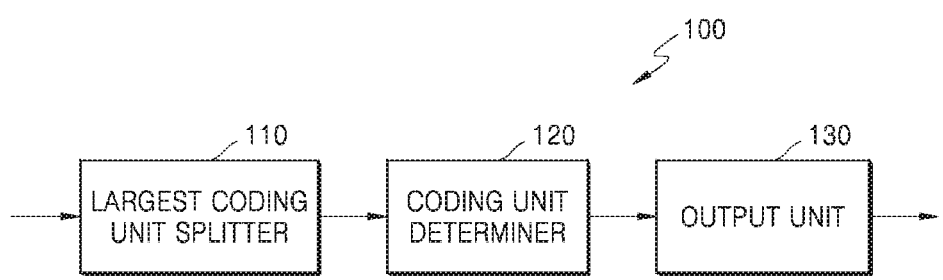
FIG. 8 is a block diagram of a video encoding apparatus based on coding units of a tree structure, according to an embodiment.

Accordingly, in order for the encoder 12 of the inter-layer video encoding apparatus 10 according to various embodiments to encode a multilayer video based on coding units having a tree structure, the inter-layer video encoding apparatus 10 may include as many video encoding apparatuses 100 of FIG. 8 as the number of layers of the multilayer video so as to perform video encoding according to each single-layer video, thereby controlling each video encoding apparatus 100 to encode an assigned single-layer video. Also, the inter-layer video encoding apparatus 10 may perform inter-view prediction by using encoding results of individual single viewpoints of each video encoding apparatus 100. Accordingly, the encoder 12 of the inter-layer video encoding apparatus 10 may generate a base view video stream and a second layer video stream, which include encoding results according to layers.

Figure 9:
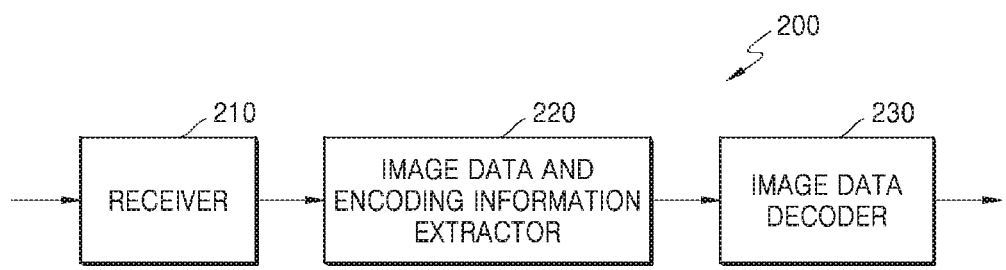
FIG. 9 is a block diagram of a video decoding apparatus based on coding units of a tree structure, according to an embodiment.

Similarly, in order for the decoder 24 of the inter-layer video decoding apparatus 20 according to various embodiments to decode a multilayer video based on coding units having a tree structure, the inter-layer video decoding apparatus 20 may include as many video decoding apparatuses 200 of FIG. 9 as the number of layers of the multilayer video so as to perform video decoding according to layers with respect to a received first layer video stream and a received second layer video stream, thereby controlling each video decoding apparatus 200 to decode an assigned single-layer video. Also, the inter-layer video decoding apparatus 20 may perform inter-layer compensation by using a decoding result of an individual single layer of each video decoding apparatus 200. Accordingly, the decoder 24 of the inter-layer video decoding apparatus 20 may generate first layer images and second layer images, which are reconstructed according to layers.

FIG. 8 illustrates a block diagram of a video encoding apparatus based on coding units of a tree structure 100, according to an embodiment.

The video encoding apparatus involving video prediction based on coding units of the tree structure 100 includes a coding unit determiner 120 and an output unit 130. Hereinafter, for convenience of description, the video encoding apparatus involving video prediction based on coding units of the tree structure 100 is referred to as the 'video encoding apparatus 100'.

The coding unit determiner 120 may split a current picture based on a largest coding unit that is a coding unit having a maximum size for a current picture of an image. If the current picture is larger than the largest coding unit, image data of the current picture may be split into the at least one largest coding unit. The largest coding unit according to various embodiments may be a data unit having a size of 32×32, 64×64, 128×128, 256×256, etc., wherein a shape of the data unit is a square having a width and length in squares of 2.

A coding unit according to various embodiments may be characterized by a maximum size and a depth. The depth denotes the number of times the coding unit is spatially split from the largest coding unit, and as the depth deepens, deeper coding units according to depths may be split from the largest coding unit to a smallest coding unit. A depth of the largest coding unit may be defined as an uppermost depth and a depth of the smallest coding unit may be defined as a lowermost depth. Since a size of a coding unit corresponding to each depth decreases as the depth of the largest coding unit deepens, a coding unit corresponding to an upper depth may include a plurality of coding units corresponding to lower depths.

As described above, the image data of the current picture is split into the largest coding units according to a maximum size of the coding unit, and each of the largest coding units may include deeper coding units that are split according to depths. Since the largest coding unit according to various embodiments is split according to depths, the image data of a spatial domain included in the largest coding unit may be hierarchically classified according to depths.

A maximum depth and a maximum size of a coding unit, which limit the total number of times a height and a width of the largest coding unit are hierarchically split, may be predetermined.

The coding unit determiner 120 encodes at least one split region obtained by splitting a region of the largest coding unit according to depths, and determines a depth to output a finally encoded image data according to the at least one split region. In other words, the coding unit determiner 120 determines a final depth by encoding the image data in the deeper coding units according to depths, according to the largest coding unit of the current picture, and selecting a depth having the minimum encoding error. The determined final depth and image data according to largest coding units are output to the output unit 130.

The image data in the largest coding unit is encoded based on the deeper coding units corresponding to at least one depth equal to or below the maximum depth, and results of encoding the image data based on each of the deeper coding units are compared. A depth having the minimum encoding error may be selected after comparing encoding errors of the deeper coding units. At least one final depth may be selected for each largest coding unit.

The size of the largest coding unit is split as a coding unit is hierarchically split according to depths, and as the number of coding units increases. Also, even if coding units correspond to the same depth in one largest coding unit, it is determined whether to split each of the coding units corresponding to the same depth to a lower depth by measuring an encoding error of the image data of the each coding unit, separately. Accordingly, even when image data is included in one largest coding unit, the encoding errors may differ according to regions in the one largest coding unit, and thus the final depths may differ according to regions in the image data. Thus, one or more final depths may be determined in one largest coding unit, and the image data of the largest coding unit may be divided according to coding units of at least one final depth.

Accordingly, the coding unit determiner 120 according to various embodiments may determine coding units having a tree structure included in the current largest coding unit. The 'coding units having a tree structure' according to various embodiments include coding units corresponding to a depth determined to be the final depth, from among all deeper coding units included in the current largest coding unit. A coding unit of a final depth may be hierarchically determined according to depths in the same region of the largest coding unit, and may be independently determined in different regions. Equally, a final depth in a current region may be independently determined from a final depth in another region.

A maximum depth according to various embodiments is an index related to the number of splitting times from a largest coding unit to a smallest coding unit A first maximum depth according to various embodiments may denote the total number of splitting times from the largest coding unit to the smallest coding unit. A second maximum depth according to various embodiments may denote the total number of depth levels from the largest coding unit to the smallest coding unit. For example, when a depth of the largest coding unit is 0, a depth of a coding unit, in which the largest coding unit is split once, may be set to 1, and a depth of a coding unit, in which the largest coding unit is split twice, may be set to 2. In this regard, if the smallest coding unit is a coding unit in which the largest coding unit is split four times, depth levels of depths 0, 1, 2, 3, and 4 exist, and thus the first maximum depth may be set to 4, and the second maximum depth may be set to 5.

Prediction encoding and transformation may be performed according to the largest coding unit. The prediction encoding and the transformation are also performed based on the deeper coding units according to a depth equal to or depths less than the maximum depth, according to the largest coding unit.

Since the number of deeper coding units increases whenever the largest coding unit is split according to depths, encoding, including the prediction encoding and the transformation, is performed on all of the deeper coding units generated as the depth deepens. Hereinafter, for convenience of description, the prediction encoding and the transformation will be described based on a coding unit of a current depth in at least one largest coding unit.

The video encoding apparatus 100 according to various embodiments may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the largest coding unit, the prediction encoding may be performed based on a coding unit corresponding to a final depth according to various embodiments, i.e., based on a coding unit that is no longer split to coding units corresponding to a lower depth. A prediction unit in a partition for prediction is determined from the coding unit. The prediction unit may include the coding unit and a partition obtained by splitting at least one of a height and a width of the coding unit. The partition may include a data unit where a coding unit is split, and may have the same size as the coding unit.

For example, when a coding unit of 2N×2N (where N is a positive integer) is no longer split, it becomes a prediction unit of 2N×2N, and a size of a partition may be 2N×2N, 2N×N, N×2N, or N×N. Examples of a partition mode according to various embodiments may selectively include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, or partitions having arbitrary shapes.

A prediction mode of the prediction unit may be at least one of an intra mode, an inter mode, and a skip mode. For example, the intra mode and the inter mode may be performed on the partition of 2N×2N, 2N×N, N×2N, or N×N. Also, the skip mode may be performed only on the partition of 2N×2N. The encoding may be independently performed on one prediction unit in a coding unit, so that a prediction mode having a minimum encoding error may be selected.

The video encoding apparatus 100 according to various embodiments may perform not only the transformation on the image data in a coding unit based not only on the coding unit for encoding the image data, but also may perform the transformation on the image data based on a data unit that is different from the coding unit. In order to perform the transformation in the coding unit, the transformation may be performed based on a transformation unit having a size smaller than or equal to the coding unit. For example, the transformation unit may include a data unit for an intra mode and a transformation unit for an inter mode.

The transformation unit in the coding unit may be recursively split into smaller sized regions in a manner similar to that in which the coding unit is split according to the tree structure, according to various embodiments. Thus, residual data in the coding unit may be split according to the transformation unit having the tree structure according to transformation depths.

A transformation depth indicating the number of splitting times to reach the transformation unit by splitting the height and width of the coding unit may also be set in the transformation unit according to various embodiments. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. That is, with respect to the transformation unit, the transformation unit having the tree structure may be set according to the transformation depths.

Split information according to depths requires not only information about a depth but also requires information related to prediction and transformation. Accordingly, the coding unit determiner 120 may determine not only a depth generating a minimum encoding error but may also determine a partition mode in which a prediction unit is split to partitions, a prediction mode according to prediction units, and a size of a transformation unit for transformation.

Coding units according to a tree structure in a largest coding unit and methods of determining a prediction unit/partition, and a transformation unit, according to various embodiments, will be described in detail later with reference to FIGS. 9 through 19.

The coding unit determiner 120 may measure an encoding error of deeper coding units according to depths by using Rate-Distortion Optimization based on Lagrangian multipliers.

The output unit 130 outputs, in bitstreams, the image data of the largest coding unit, which is encoded based on the at least one depth determined by the coding unit determiner 120, and split information according to depths.

The encoded image data may correspond to a result obtained by encoding residual data of an image.

The split information according to depths may include depth information, partition mode information of the prediction unit, prediction mode information, and the split information of the transformation unit.

Final-depth information may be defined by using split information according to depths, which specifies whether encoding is performed on coding units of a lower depth instead of a current depth. If the current depth of the current coding unit is a depth, the current coding unit is encoded by using the coding unit of the current depth, and thus split information of the current depth may be defined not to split the current coding unit to a lower depth. On the contrary, if the current depth of the current coding unit is not the depth, the encoding has to be performed on the coding unit of the lower depth, and thus the split information of the current depth may be defined to split the current coding unit to the coding units of the lower depth.

If the current depth is not the depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed on the coding units having the same depth.

Since the coding units having a tree structure are determined for one largest coding unit, and at least one piece of split information has to be determined for a coding unit of a depth, at least one piece of split information may be determined for one largest coding unit. Also, data of the largest coding unit may vary according to locations since the data is hierarchically split according to depths, and thus a depth and split information may be set for the data.

Accordingly, the output unit 130 according to various embodiments may assign encoding information about a corresponding depth and an encoding mode to at least one of the coding unit, the prediction unit, and a minimum unit included in the largest coding unit.

The minimum unit according to various embodiments is a square data unit obtained by splitting the smallest coding unit constituting the lowermost depth by 4. Alternatively, the minimum unit according to various embodiments may be a maximum square data unit that may be included in all of the coding units, prediction units, partition units, and transformation units included in the largest coding unit.

For example, the encoding information output by the output unit 130 may be classified into encoding information according to deeper coding units, and encoding information according to prediction units. The encoding information according to the deeper coding units may include the prediction mode information and the partition size information. The encoding information according to the prediction units may include information about an estimated direction of an inter mode, about a reference image index of the inter mode, about a motion vector, about a chroma component of an intra mode, and about an interpolation method of the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit permitted with respect to a current video, and information about a minimum size of the transformation unit may also be output through a header of a bitstream, a sequence parameter set, or a picture parameter set. The output unit 130 may encode and output reference information, prediction information, and slice type information, which are related to prediction.

According to the simplest embodiment of the video encoding apparatus 100, the deeper coding unit may be a coding unit obtained by dividing a height and width of a coding unit of an upper depth, which is one layer above, by two. That is, when the size of the coding unit of the current depth is 2N×2N, the size of the coding unit of the lower depth is N×N. Also, a current coding unit having a size of 2N×2N may maximally include four lower-depth coding units having a size of N×N.

Accordingly, the video encoding apparatus 100 may form the coding units having the tree structure by determining coding units having an optimum shape and an optimum size for each largest coding unit, based on the size of the largest coding unit and the maximum depth determined considering characteristics of the current picture. Also, since encoding may be performed on each largest coding unit by using any one of various prediction modes and transformations, an optimum encoding mode may be determined by taking into account characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus 100 according to various embodiments, image compression efficiency may be increased since a coding unit is adjusted while considering characteristics of an image while increasing a maximum size of a coding unit while considering a size of the image.

The inter-layer video encoding apparatus 10 described above with reference to FIG. 1A may include as many video encoding apparatuses 100 as the number of layers, in order to encode single-layer images according to layers of a multi-layer video. For example, the first layer encoder 14 may include one video encoding apparatus 100 and the second layer encoder 16 may include as many video encoding apparatuses 100 as the number of second layers.

When the video encoding apparatus 100 encodes first layer images, the coding unit determiner 120 may determine, for each largest coding unit, a prediction unit for inter-prediction according to coding units having a tree structure, and may perform inter-prediction according to prediction units.

Even when the video encoding apparatus 100 encodes second layer images, the coding unit determiner 120 may determine, for each largest coding unit, coding units and prediction units having a tree structure, and may perform inter-prediction according to prediction units.

The video encoding apparatus 100 may encode a luminance difference to compensate for a luminance difference between a first layer image and a second layer image. However, whether to perform luminance compensation may be determined according to an encoding mode of a coding unit. For example, the luminance compensation may be performed only on a prediction unit having a size of 2N×2N.

FIG. 9 is a block diagram of a video decoding apparatus based on coding units according to tree structure 200, according to various embodiments.

The video decoding apparatus involving video prediction based on coding units of the tree structure 200 according to the embodiment includes a receiver 210, an image data and encoding information extractor 220, and an image data decoder 230. Hereinafter, for convenience of description, the video decoding apparatus involving video prediction based on coding units of the tree structure 200 according to the embodiment is referred to as the 'video decoding apparatus 200'.

Definitions of various terms, such as a coding unit, a depth, a prediction unit, a transformation unit, and various split information, for decoding operations of the video decoding apparatus 200 according to various embodiments are identical to those described with reference to FIG. 8 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each largest coding unit, and outputs the extracted image data to the image data decoder 230. The image data and encoding information extractor 220 may extract information about a maximum size of a coding unit of a current picture, from a header about the current picture, a sequence parameter set, or a picture parameter set.

Also, the image data and encoding information extractor 220 extracts, from the parsed bitstream, a final depth and split information about the coding units having a tree structure according to each largest coding unit. The extracted final depth and the extracted split information are output to the image data decoder 230. That is, the image data in a bitstream is split into the largest coding unit so that the image data decoder 230 may decode the image data for each largest coding unit.

A depth and split information according to each of the largest coding units may be set for one or more pieces of depth information, and split information according to depths may include partition mode information of a corresponding coding unit, prediction mode information, and split information of a transformation unit. Also, as the depth information, the split information according to depths may be extracted.

The depth and the split information according to each of the largest coding units extracted by the image data and encoding information extractor 220 are a depth and split information determined to generate a minimum encoding error when an encoder, such as the video encoding apparatus 100, repeatedly performs encoding on each deeper coding unit according to depths according to each largest coding unit. Accordingly, the video decoding apparatus 200 may reconstruct an image by decoding data according to an encoding method that generates the minimum encoding error.

Since encoding information according to various embodiments about a depth and an encoding mode may be assigned to a predetermined data unit from among a corresponding coding unit, a prediction unit, and a minimum unit, the image data and encoding information extractor 220 may extract the depth and the split information according to the predetermined data units. If a depth and split information of a corresponding largest coding unit are recorded according to each of the predetermined data units, predetermined data units having the same depth and the split information may be inferred to be the data units included in the same largest coding unit.

The image data decoder 230 may reconstruct the current picture by decoding the image data in each largest coding unit based on the depth and the split information according to the largest coding units. That is, the image data decoder 230 may decode the encoded image data, based on a read partition mode, a prediction mode, and a transformation unit for each coding unit from among the coding units having the tree structure included in each largest coding unit. A decoding process may include a prediction process including intra prediction and motion compensation, and an inverse transformation process.

The image data decoder 230 may perform intra prediction or motion compensation according to a partition and a prediction mode of each coding unit, based on the information about the partition mode and the prediction mode of the prediction unit of the coding unit according to depths.

In addition, for inverse transformation for each largest coding unit, the image data decoder 230 may read information about a transformation unit according to a tree structure for each coding unit so as to perform inverse transformation based on transformation units for each coding unit. Due to the inverse transformation, a pixel value of a spatial domain of the coding unit may be reconstructed.

The image data decoder 230 may determine a depth of a current largest coding unit by using split information according to depths. If the split information indicates that image data is no longer split in the current depth, the current depth is a depth. Accordingly, the image data decoder 230 may decode the image data of the current largest coding unit by using the information about the partition mode of the prediction unit, the prediction mode, and the size of the transformation unit for each coding unit corresponding to the current depth.

That is, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. As such, the current coding unit may be decoded by obtaining the information about the encoding mode for each coding unit.

The inter-layer video decoding apparatus 20 described above with reference to FIG. 2A may include video decoding apparatuses 200 as much as the number of viewpoints, so as to reconstruct first layer images and second layer images by decoding a received first layer image stream and a received second layer image stream.

When the first layer image stream is received, the image data decoder 230 of the video decoding apparatus 200 may split samples of the first layer images, which are extracted from the first layer image stream by an extractor 220, into coding units according to a tree structure of a largest coding unit. The image data decoder 230 may perform motion compensation, based on prediction units for the inter-image prediction, on each of the coding units according to the tree structure of the samples of the first layer images, and may reconstruct the first layer images.

When the second layer image stream is received, the image data decoder 230 of the video decoding apparatus 200 may split samples of the second layer images, which are extracted from the second layer image stream by the extractor 220, into coding units according to a tree structure of a largest coding unit. The image data decoder 230 may perform motion compensation, based on prediction units for the inter-image prediction, on each of the coding units of the samples of the second layer images, and may reconstruct the second layer images.

The extractor 220 may obtain, from a bitstream, information related to a luminance error so as to compensate for a luminance difference between the first layer image and the second layer image. However, whether to perform luminance compensation may be determined according to an encoding mode of a coding unit. For example, the luminance compensation may be performed only on a prediction unit having a size of 2N×2N.

Thus, the video decoding apparatus 200 may obtain information about at least one coding unit that generates the minimum encoding error when encoding is recursively performed for each largest coding unit, and may use the information to decode the current picture. That is, the coding units having the tree structure determined to be the optimum coding units in each largest coding unit may be decoded.

Accordingly, even if an image has high resolution or has an excessively large data amount, the image may be efficiently decoded and reconstructed by using a size of a coding unit and an encoding mode, which are adaptively determined according to characteristics of the image, by using optimal split information received from an encoding terminal.

Figure 10:
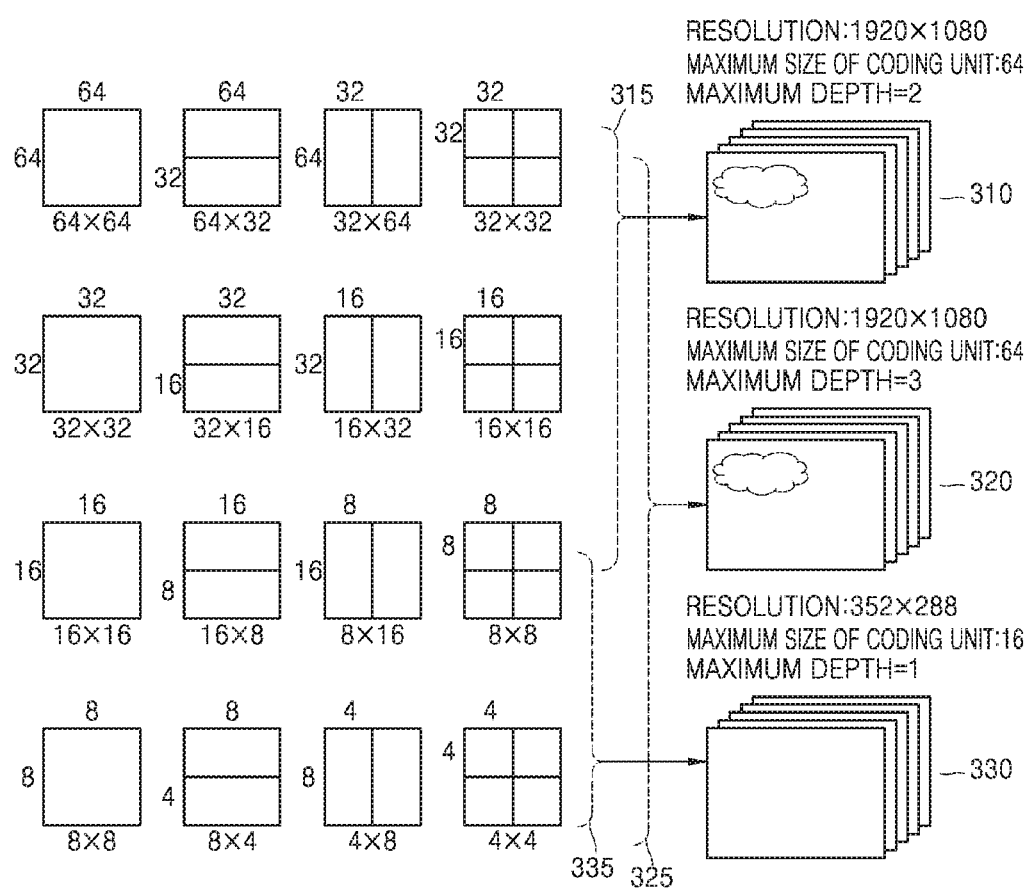
FIG. 10 illustrates a concept of coding units, according to various embodiments.

FIG. 10 is a diagram for describing a concept of coding units according to various embodiments.

A size of a coding unit may be expressed by width × height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 10 denotes a total number of splits from a largest coding unit to a smallest coding unit.

If a resolution is high or a data amount is large, it is preferable that a maximum size of a coding unit is large so as to not only increase encoding efficiency but also to accurately reflect characteristics of an image. Accordingly, the maximum size of the coding unit of the video data 310 and 320 having a higher resolution than the video data 330 may be selected to 64.

Since the maximum depth of the video data 310 is 2, coding units 315 of the video data 310 may include a largest coding unit having a long axis size of 64, and coding units having long axis sizes of 32 and 16 since depths are deepened to two layers by splitting the largest coding unit twice. On the other hand, since the maximum depth of the video data 330 is 1, coding units 335 of the video data 330 may include a largest coding unit having a long axis size of 16, and coding units having a long axis size of 8 since depths are deepened to one layer by splitting the largest coding unit once.

Since the maximum depth of the video data 320 is 3, coding units 325 of the video data 320 may include a largest coding unit having a long axis size of 64, and coding units having long axis sizes of 32, 16, and 8 since the depths are deepened to 3 layers by splitting the largest coding unit three times. As a depth deepens, detailed information may be precisely expressed.

Figure 11:
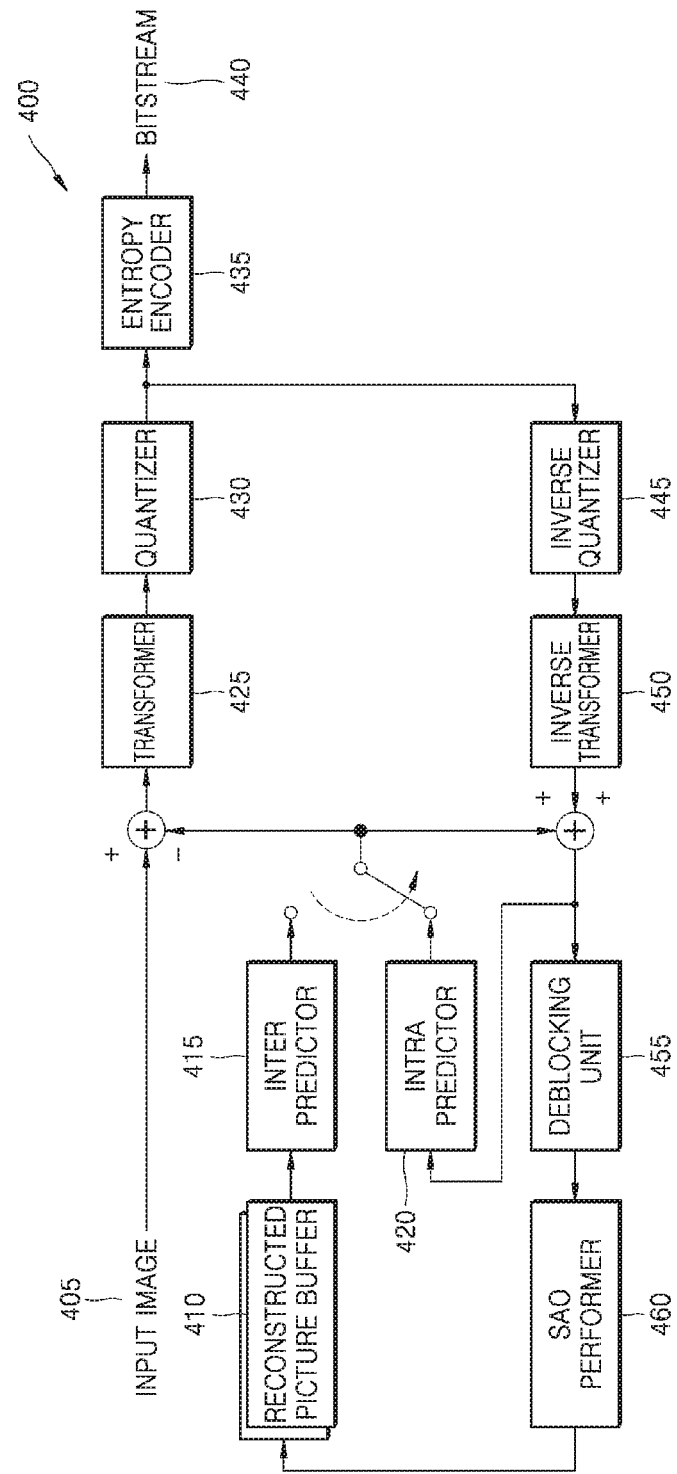
FIG. 11 is a block diagram of an image encoder based on coding units, according to various embodiments.

FIG. 11 is a block diagram of an image encoder 400 based on coding units, according to various embodiments.

The image encoder 400 according to various embodiments performs operations of a picture encoder 120 of the video encoding apparatus 100 so as to encode image data. That is, an intra predictor 420 performs intra prediction on coding units in an intra mode, from among a current image 405, per prediction unit, and an inter predictor 415 performs inter prediction on coding units in an inter mode by using the current image 405 and a reference image obtained from a reconstructed picture buffer 410 according to prediction units. The current picture 405 may be split into largest coding units, and then the largest coding units may be sequentially encoded. In this regard, the largest coding unit that is to be split into coding units having a tree structure may be encoded.

Residual data is generated by subtracting prediction data of a coding unit of each mode output from the intra predictor 420 or the inter predictor 415 from data of the current image 405 to be encoded, and the residual data is output as a quantized transformation coefficient through a transformer 425 and a quantizer 430 per transformation unit. The quantized transformation coefficient is reconstructed as the residue data in a spatial domain through an inverse-quantizer 445 and an inverse-transformer 450. The reconstructed residue data in the spatial domain is added to the prediction data of the coding unit of each mode output from the intra predictor 420 or the inter predictor 415 to be reconstructed as data in a spatial domain of the coding unit of the current image 405. The reconstructed data in the spatial domain is generated as a reconstructed image through a deblocking unit 455 and an SAO performer 460. The reconstructed image is stored in the reconstructed picture buffer 410. Reconstructed images stored in the reconstructed picture buffer 410 may be used as a reference image for inter prediction of another image. The transformation coefficient quantized by the transformer 425 and the quantizer 430 may be output as a bitstream 440 through an entropy encoder 435.

In order for the image encoder 400 according to various embodiments to be applied in the video encoding apparatus 100, components of the image encoder 400, i.e., the inter predictor 415, the intra predictor 420, the transformer 425, the quantizer 430, the entropy encoder 435, the inverse quantizer 445, the inverse transformer 450, the deblocking unit 455, and the SAO performer 460 perform operations based on each coding unit among coding units having a tree structure per largest coding unit.

In particular, the intra predictor 420 and the inter predictor 415 may determine a partition mode and a prediction mode of each coding unit from among the coding units having a tree structure, by taking into account the maximum size and the maximum depth of a current largest coding unit, and the transformer 425 may determine whether to split a transformation unit according to a quad tree in each coding unit from among the coding units having a tree structure.

Figure 12:
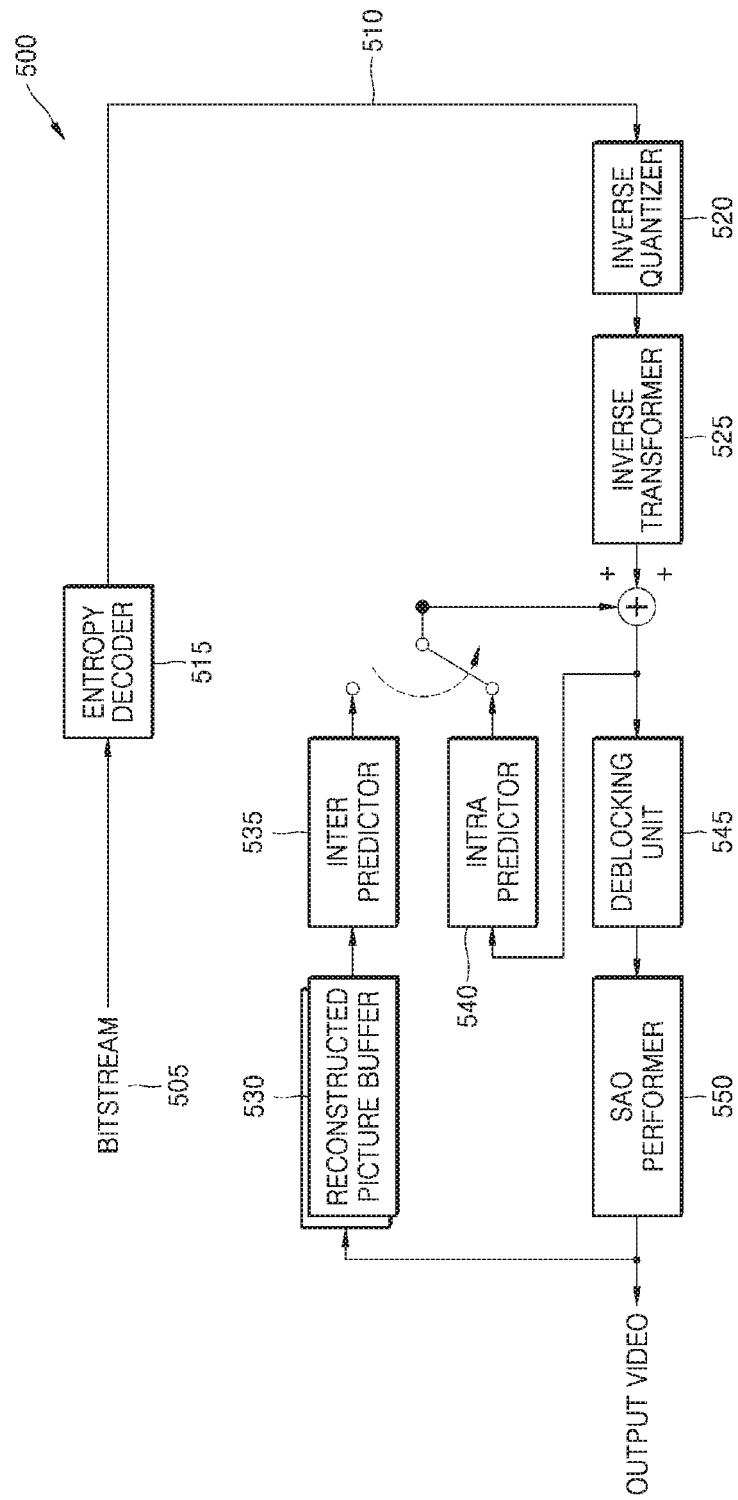
FIG. 12 is a block diagram of an image decoder based on coding units, according to various embodiments.

FIG. 12 is a block diagram of an image decoder 500 based on coding units according to various embodiments.

An entropy decoder 515 parses, from a bitstream 505, encoded image data to be decoded and encoding information required for decoding. The encoded image data corresponds to a quantized transformation coefficient, and an inverse-quantizer 520 and an inverse-transformer 525 reconstruct residue data from the quantized transformation coefficient.

An intra predictor 540 performs intra prediction on a coding unit in an intra mode according to prediction units. An inter predictor 535 performs inter prediction by using a reference image with respect to a coding unit in an inter mode from among a current image, wherein the reference image is obtained by a reconstructed picture buffer 530 according to prediction units.

Prediction data and residue data regarding coding units of each mode, which passed through the intra predictor 540 and the inter predictor 535, are summed, so that data in a spatial domain regarding coding units of the current image 405 may be reconstructed, and the reconstructed data in the spatial domain may be output as a reconstructed image 560 through a deblocking unit 545 and an SAO performer 550. Also, reconstructed images that are stored in the reconstructed picture buffer 530 may be output as reference images.

In order for a picture decoder 230 of the video decoding apparatus 200 to decode the image data, operations after the entropy decoder 515 of the image decoder 500 according to various embodiments may be performed.

In order for the image decoder 500 to be applied in the video decoding apparatus 200 according to various embodiments, components of the image decoder 500, i.e., the entropy decoder 515, the inverse quantizer 520, the inverse transformer 525, the intra predictor 540, the inter predictor 535, the deblocking unit 545, and the SAO performer 550 may perform operations based on coding units having a tree structure for each largest coding unit.

In particular, the intra predictor 540 and the inter predictor 535 may determine a partition mode and a prediction mode of each coding unit from among the coding units according to a tree structure, and the inverse-transformer 525 may determine whether or not to split a transformation unit according to a quad-tree structure in each coding unit.

The encoding operation of FIG. 10 and the decoding operation of FIG. 11 describe in detail a videostream encoding operation and a videostream decoding operation, respectively, in a single layer. Accordingly, when the encoder 12 of FIG. 1A encodes a video stream of at least two layers, the video encoding apparatus 10 of FIG. 1A may include as many image encoder 400 as the number of layers. Similarly, when the decoder 24 of FIG. 2A decodes a video stream of at least two layers, the video decoding apparatus 20 of FIG. 2A may include as many image decoders 500 as the number of layers.

Figure 13:
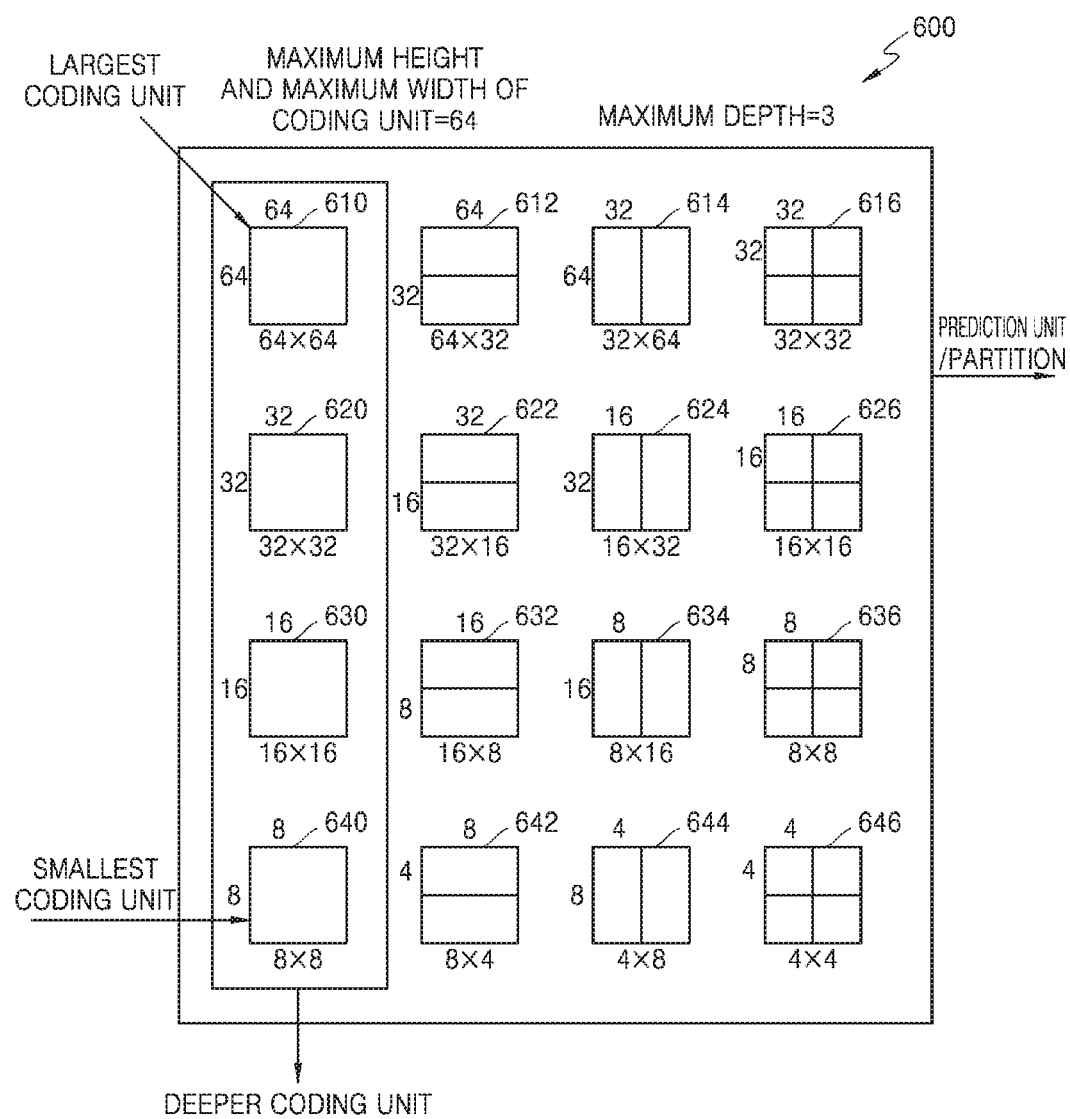
FIG. 13 illustrates coding units and partitions, according to various embodiments.

FIG. 13 illustrates coding units according to depths and partitions, according to various embodiments.

The video encoding apparatus 100 according to various embodiments and the video decoding apparatus 200 according to various embodiments use hierarchical coding units so as to consider characteristics of an image. A maximum height, a maximum width, and a maximum depth of coding units may be adaptively determined according to the characteristics of the image, or may be variously set according to user requirements. Sizes of deeper coding units according to depths may be determined according to the predetermined maximum size of the coding unit.

In a hierarchical structure 600 of coding units according to various embodiments, the maximum height and the maximum width of the coding units are each 64, and the maximum depth is 3. In this case, the maximum depth refers to a total number of times the coding unit is split from the largest coding unit to the smallest coding unit. Since a depth deepens along a vertical axis of the hierarchical structure of coding units 600, a height and a width of the deeper coding unit are each split. Also, a prediction unit and partitions, which are bases for prediction encoding of each deeper coding unit, are shown along a horizontal axis of the hierarchical structure of coding units 600.

That is, a coding unit 610 is a largest coding unit in the hierarchical structure of coding units 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3 are present. The coding unit 640 having a size of 8×8 and a depth of 3 is a smallest coding unit.

The prediction unit and the partitions of a coding unit are arranged along the horizontal axis according to each depth. That is, if the coding unit 610 having a size of 64×64 and a depth of 0 is a prediction unit, the prediction unit may be split into partitions included in the coding unit 610 having the size of 64×64, i.e. a partition 610 having a size of 64×64, partitions 612 having the size of 64×32, partitions 614 having the size of 32×64, or partitions 616 having the size of 32×32.

Equally, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Equally, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Equally, a prediction unit of the coding unit 640 having the size of 8×8 and the depth of 3 may be split into partitions included in the coding unit 640, i.e. a partition 640 having a size of 8×8 included in the coding unit 640, partitions 642 having a size of 8×4, partitions 644 having a size of 4×8, and partitions 646 having a size of 4×4.

In order to determine a depth of the largest coding unit 610, the coding unit determiner 120 of the video encoding apparatus 100 has to perform encoding on coding units respectively corresponding to depths included in the largest coding unit 610.

The number of deeper coding units according to depths including data in the same range and the same size increases as the depth deepens. For example, four coding units corresponding to a depth of 2 are required to cover data that is included in one coding unit corresponding to a depth of 1. Accordingly, in order to compare results of encoding the same data according to depths, the data has to be encoded by using each of the coding unit corresponding to the depth of 1 and four coding units corresponding to the depth of 2.

In order to perform encoding according to each of the depths, a minimum encoding error that is a representative encoding error of a corresponding depth may be selected by performing encoding on each of prediction units of the coding units according to depths, along the horizontal axis of the hierarchical structure of coding units 600. Also, the minimum encoding error may be searched for by comparing representative encoding errors according to depths, by performing encoding for each depth as the depth deepens along the vertical axis of the hierarchical structure of coding units 600. A depth and a partition generating the minimum encoding error in the largest coding unit 610 may be selected as a depth and a partition mode of the largest coding unit 610.

Figure 14:
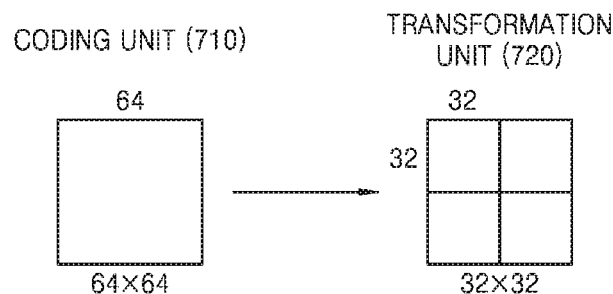
FIG. 14 illustrates a relationship between a coding unit and transformation units, according to various embodiments.

FIG. 14 illustrates a relationship between a coding unit and transformation units, according to various embodiments.

The video encoding apparatus 100 according to various embodiments or the video decoding apparatus 200 according to various embodiments encodes or decodes an image according to coding units having sizes less than or equal to a largest coding unit for each largest coding unit. Sizes of transformation units for transformation during an encoding process may be selected based on data units that are not larger than a corresponding coding unit.

For example, in the video encoding apparatus 100 according to various embodiments or the video decoding apparatus 200 according to various embodiments, if a size of a coding unit 710 is 64×64, transformation may be performed by using a transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the minimum coding error with respect to an original image may be selected.

Figure 15:
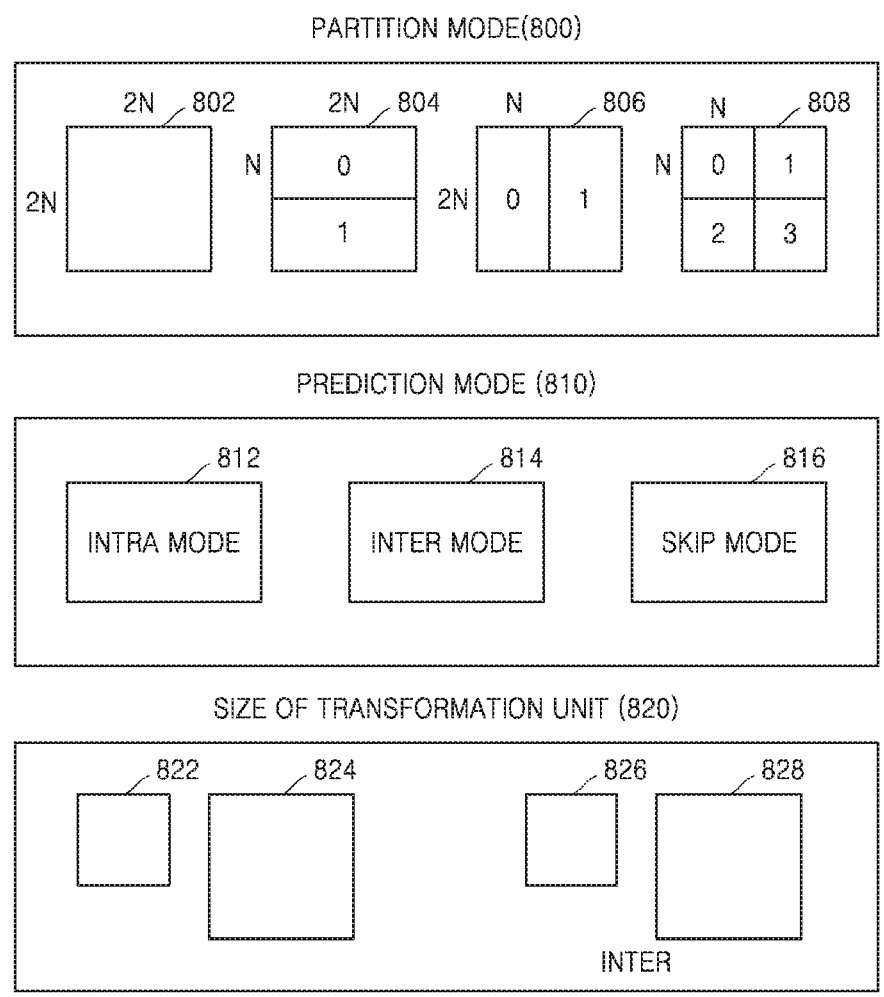
FIG. 15 illustrates a plurality of pieces of encoding information, according to an embodiment.

FIG. 15 illustrates a plurality of pieces of encoding information according to various embodiments.

The output unit 130 of the video encoding apparatus 100 according to various embodiments may encode and transmit, as split information, partition mode information 800, prediction mode information 810, and transformation unit size information 820 for each coding unit corresponding to a depth.

The partition mode information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. In this case, the partition mode information 800 about a current coding unit is set to indicate one of the partition 802 having a size of 2N×2N, the partition 804 having a size of 2N×N, the partition 806 having a size of N×2N, and the partition 808 having a size of N×N.

The prediction mode information 810 indicates a prediction mode of each partition. For example, the prediction mode information 810 may indicate a mode of prediction encoding performed on a partition indicated by the partition mode information 800, i.e., an intra mode 812, an inter mode 814, or a skip mode 816.

The transformation unit size information 820 represents a transformation unit to be based on when transformation is performed on a current coding unit. For example, the transformation unit may be one of a first intra transformation unit 822, a second intra transformation unit 824, a first inter transformation unit 826, and a second inter transformation unit 828.

The image data and encoding information extractor 220 of the video decoding apparatus 200 may extract and use the partition mode information 800, the prediction mode information 810, and the transformation unit size information 820 for each deeper coding unit.

Figure 16:
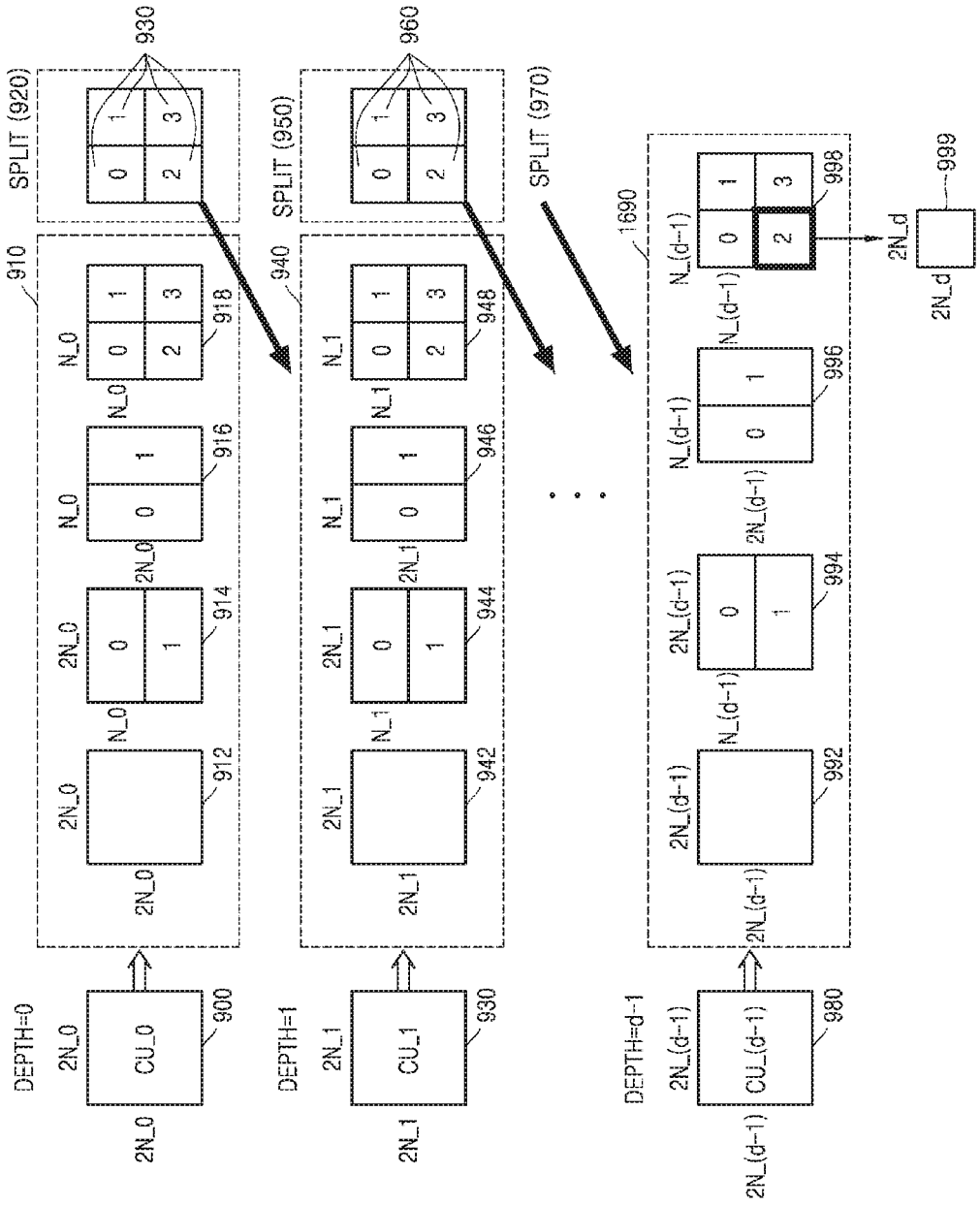
FIG. 16 illustrates coding units, according to various embodiments.

FIG. 16 illustrates deeper coding units according to depths, according to various embodiments.

Split information may be used to represent a change in a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition mode 912 having a size of 2N_0×2N_0, a partition mode 914 having a size of 2N_0×N_0, a partition mode 916 having a size of N_0×2N_0, and a partition mode 918 having a size of N_0×N_0. Only the partition modes 912, 914, 916, and 918 which are obtained by symmetrically splitting the prediction unit are illustrated, but as described above, a partition mode is not limited thereto and may include asymmetrical partitions, partitions having a predetermined shape, and partitions having a geometrical shape.

According to each partition mode, prediction encoding has to be repeatedly performed on one partition having a size of 2N_0×2N_0, two partitions having a size of 2N_0×N_0, two partitions having a size of N_0×2N_0, and four partitions having a size of N_0×N_0. The prediction encoding in an intra mode and an inter mode may be performed on the partitions having the sizes of 2N_0×2N_0, N_0×2N_0, 2N_0×N_0, and N_0×N_0. The prediction encoding in a skip mode may be performed only on the partition having the size of 2N_0×2N_0.

If an encoding error is smallest in one of the partition modes 912, 914, and 916 having the sizes of 2N_0×2N_0, 2N_0×N_0 and N_0×2N_0, the prediction unit 910 may not be split into a lower depth.

If the encoding error is the smallest in the partition mode 918 having the size of N_0×N_0, a depth is changed from 0 to 1 and split is performed (operation 920), and encoding may be repeatedly performed on coding units 930 of a partition mode having a depth of 2 and a size of N_0×N_0 so as to search for a minimum encoding error.

A prediction unit 940 for prediction encoding the coding unit 930 having a depth of 1 and a size of 2N_1×2N_1 (=N_0×N_0) may include a partition mode 942 having a size of 2N_1×2N_1, a partition mode 944 having a size of 2N_1×N_1, a partition mode 946 having a size of N_1×2N_1, and a partition mode 948 having a size of N_1×N_1.

If an encoding error is the smallest in the partition mode 948 having the size of N_1×N_1, a depth is changed from 1 to 2 and split is performed (in operation 950), and encoding is repeatedly performed on coding units 960 having a depth of 2 and a size of N_2×N_2 so as to search for a minimum encoding error.

When a maximum depth is d, deeper coding units according to depths may be set until when a depth corresponds to d−1, and split information may be set until when a depth corresponds to d−2. That is, when encoding is performed up to when the depth is d−1 after a coding unit corresponding to a depth of d−2 is split (in operation 970), a prediction unit 990 for prediction encoding a coding unit 980 having a depth of d−1 and a size of 2N_(d−1)×2N_(d−1) may include partitions of a partition mode 992 having a size of 2N_(d−1)×2N_(d−1), a partition mode 994 having a size of 2N_(d−1)×N_(d−1), a partition mode 996 having a size of N_(d−1)×2N_(d−1), and a partition mode 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition modes so as to search for a partition mode generating a minimum encoding error.

Even when the partition mode 998 having the size of N_(d−1)×N_(d−1) has the minimum encoding error, since a maximum depth is d, a coding unit CU_(d−1) having a depth of d−1 is no longer split into a lower depth, and a depth for the coding units constituting a current largest coding unit 900 is determined to be d−1 and a partition mode of the current largest coding unit 900 may be determined to be N_(d−1)×N_(d−1). Also, since the maximum depth is d, split information for a coding unit 952 having a depth of d−1 is not set.

A data unit 999 may be a 'minimum unit' for the current largest coding unit. A minimum unit according to various embodiments may be a square data unit obtained by splitting a smallest coding unit having a lowermost depth by 4. By performing the encoding repeatedly, the video encoding apparatus 100 according to various embodiments may select a depth generating the minimum encoding error by comparing encoding errors according to depths of the coding unit 900 to determine a depth, and may set a corresponding partition mode and a prediction mode as an encoding mode of the depth.

As such, the minimum encoding errors according to depths are compared in all of the depths of 0, 1, . . . , d−1, d, and a depth having a minimum encoding error may be determined as a depth. The depth, the partition mode of the prediction unit, and the prediction mode may be encoded and transmitted as split information. Also, since a coding unit has to be split from a depth of 0 to a depth, only split information of the depth is set to '0', and split information of depths excluding the depth is set to '1'.

The image data and encoding information extractor 220 of the video decoding apparatus 200 according to various embodiments may extract and use a depth and prediction unit information about the coding unit 900 so as to decode the coding unit 912. The video decoding apparatus 200 according to various embodiments may determine a depth, in which split information is '0', as a depth by using split information according to depths, and may use, for decoding, split information about the corresponding depth.

Figure 17:
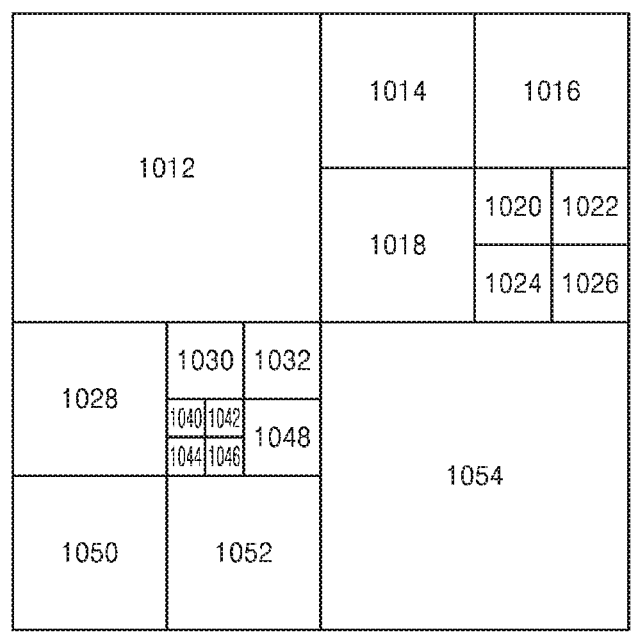
FIGS. 17, 18, and 19 illustrate a relationship between coding units, prediction units, and transformation units, according to various embodiments.
Figure 18:
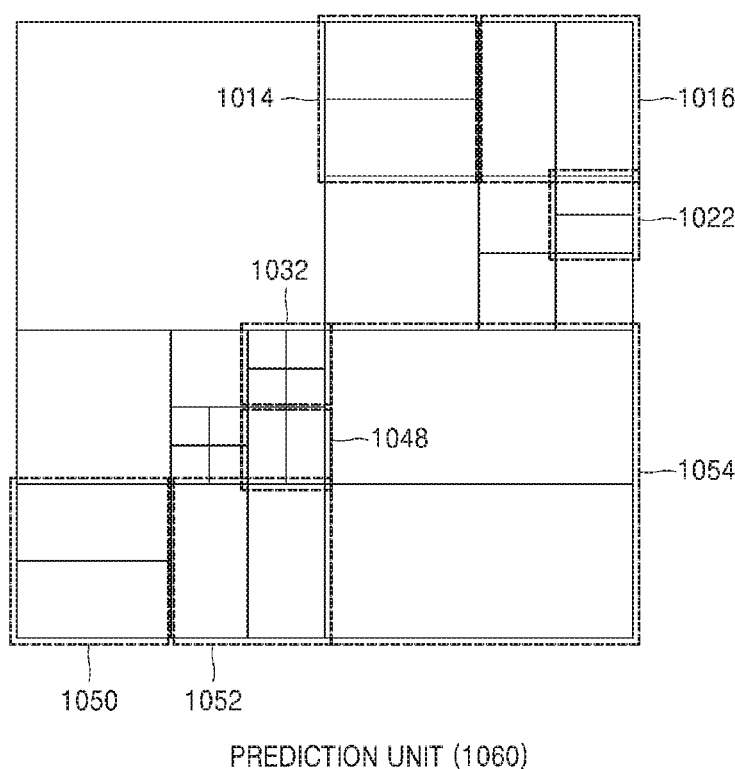
Figure 19:
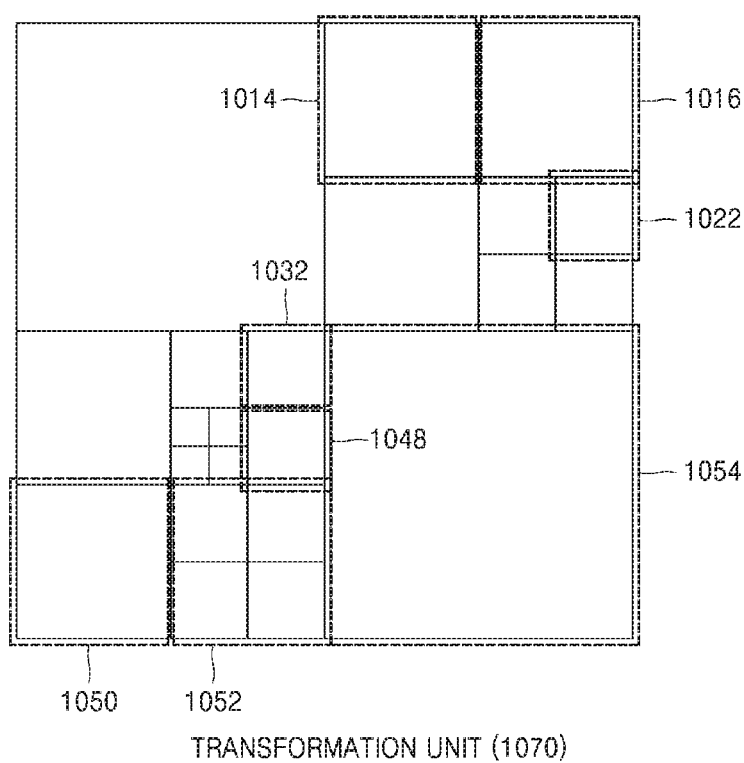

FIGS. 17, 18, and 19 illustrate a relationship between coding units, prediction units, and transformation units, according to various embodiments.

Coding units 1010 are deeper coding units according to depths determined by the video encoding apparatus 100, in a largest coding unit. Prediction units 1060 are partitions of prediction units of each of the Coding units 1010 according to depths, and transformation units 1070 are transformation units of each of the coding units according to depths.

When a depth of a largest coding unit is 0 in the deeper Coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

Some partitions 1014, 1016, 1022, 1032, 1048, 1050, 1052, and 1054 from among the prediction units 1060 are obtained by splitting the coding unit. That is, partitions 1014, 1022, 1050, and 1054 are a partition mode having a size of 2N×N, partitions 1016, 1048, and 1052 are a partition mode having a size of N×2N, and a partition 1032 is a partition mode having a size of N×N. Prediction units and partitions of the deeper coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, 1052, and 1054 in the transformation units 1760 are data units different from those in the Prediction units 1060 in terms of sizes and shapes. That is, the video encoding apparatus 100 and the video decoding apparatus 200 according to various embodiments may perform intra prediction/motion estimation/motion compensation/and transformation/inverse transformation on an individual data unit in the same coding unit.

Accordingly, encoding is recursively performed on each of coding units having a hierarchical structure in each region of a largest coding unit so as to determine an optimum coding unit, and thus coding units according to a recursive tree structure may be obtained. Encoding information may include split information about a coding unit, partition mode information, prediction mode information, and transformation unit size information. Table 1 below shows the encoding information that may be set by the video encoding apparatus 100 and the video decoding apparatus 200 according to various embodiments.

TABLE 1

Split Information 0
(Encoding on Coding Unit having Size of 2N × 2N and Current Depth of d)

| | Partition Type | | Size of Transformation Unit | | |
|---|---|---|---|---|---|
| Prediction Mode | Symmetrical Partition Type | Asymmetrical Partition Type | Split Information 0 of Transformation Unit | Split Information 1 of Transformation Unit | Split Information 1 |
| Intra Inter | 2N × 2N 2N × N | 2N × nU 2N × nD | 2N × 2N | N × N (Symmetrical | Repeatedly Encode |

TABLE 1-continued

Split Information 0
(Encoding on Coding Unit having Size of 2N × 2N and Current Depth of d)

| | Partition Type | | Size of Transformation Unit | | |
|---|---|---|---|---|---|
| Prediction Mode | Symmetrical Partition Type | Asymmetrical Partition Type | Split Information 0 of Transformation Unit | Split Information 1 of Transformation Unit | Split Information 1 |
| Skip (Only 2N × 2N) | N × 2N<br>N × N | nL × 2N<br>nR × 2N | | Partition Type) N/2 × N/2 (Asymmetrical Partition Type) | Coding Units having Lower Depth of d + 1 |

The output unit 130 of the video encoding apparatus 100 according to various embodiments may output the encoding information about the coding units having a tree structure, and the image data and encoding information extractor 220 of the video decoding apparatus 200 according to various embodiments may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a depth, and thus partition mode information, prediction mode information, and transformation unit size information may be defined for the depth. If the current coding unit has to be further split according to the split information, encoding has to be independently performed on each of four split coding units of a lower depth.

A prediction mode may be one of an intra mode, an inter mode, and a skip mode. The intra mode and the inter mode may be defined in all partition modes, and the skip mode may be defined only in a partition mode having a size of 2N×2N.

The partition mode information may indicate symmetrical partition modes having sizes of 2N×2N, 2N×N, N×2N, and N×N, which are obtained by symmetrically splitting a height or a width of a prediction unit, and asymmetrical partition modes having sizes of 2N×nU, 2N×nD, nL×2N, and nR×2N, which are obtained by asymmetrically splitting the height or width of the prediction unit. The asymmetrical partition modes having the sizes of 2N×nU and 2N×nD may be respectively obtained by splitting the height of the prediction unit in 1:3 and 3:1, and the asymmetrical partition modes having the sizes of nL×2N and nR×2N may be respectively obtained by splitting the width of the prediction unit in 1:3 and 3:1.

The size of the transformation unit may be set to be two types in the intra mode and two types in the inter mode. That is, if split information of the transformation unit is 0, the size of the transformation unit may be 2N×2N, which is the size of the current coding unit. If split information of the transformation unit is 1, the transformation units may be obtained by splitting the current coding unit. Also, if a partition mode of the current coding unit having the size of 2N×2N is a symmetrical partition mode, a size of a transformation unit may be N×N, and if the partition mode of the current coding unit is an asymmetrical partition mode, the size of the transformation unit may be N/2×N/2.

The encoding information about coding units having a tree structure, according to various embodiments, may include at least one of a coding unit corresponding to a depth, a prediction unit, and a minimum unit. The coding unit corresponding to the depth may include at least one of a prediction unit and a minimum unit containing the same encoding information.

Accordingly, it is determined whether adjacent data units are included in the coding unit corresponding to the same depth by comparing a plurality of pieces of encoding information of the adjacent data units. Also, a corresponding coding unit corresponding to a depth is determined by using encoding information of a data unit, and thus a distribution of depths in a largest coding unit may be inferred.

Accordingly, if a current coding unit is predicted based on adjacent data units, encoding information of data units in deeper coding units adjacent to the current coding unit may be directly referred to and used.

In another embodiment, if a current coding unit is prediction-encoded based on adjacent data units, the adjacent data units may be referred to in a manner that data adjacent to the current coding unit is searched for in deeper coding units by using encoding information of the deeper coding units adjacent to the current coding unit.

Figure 20:
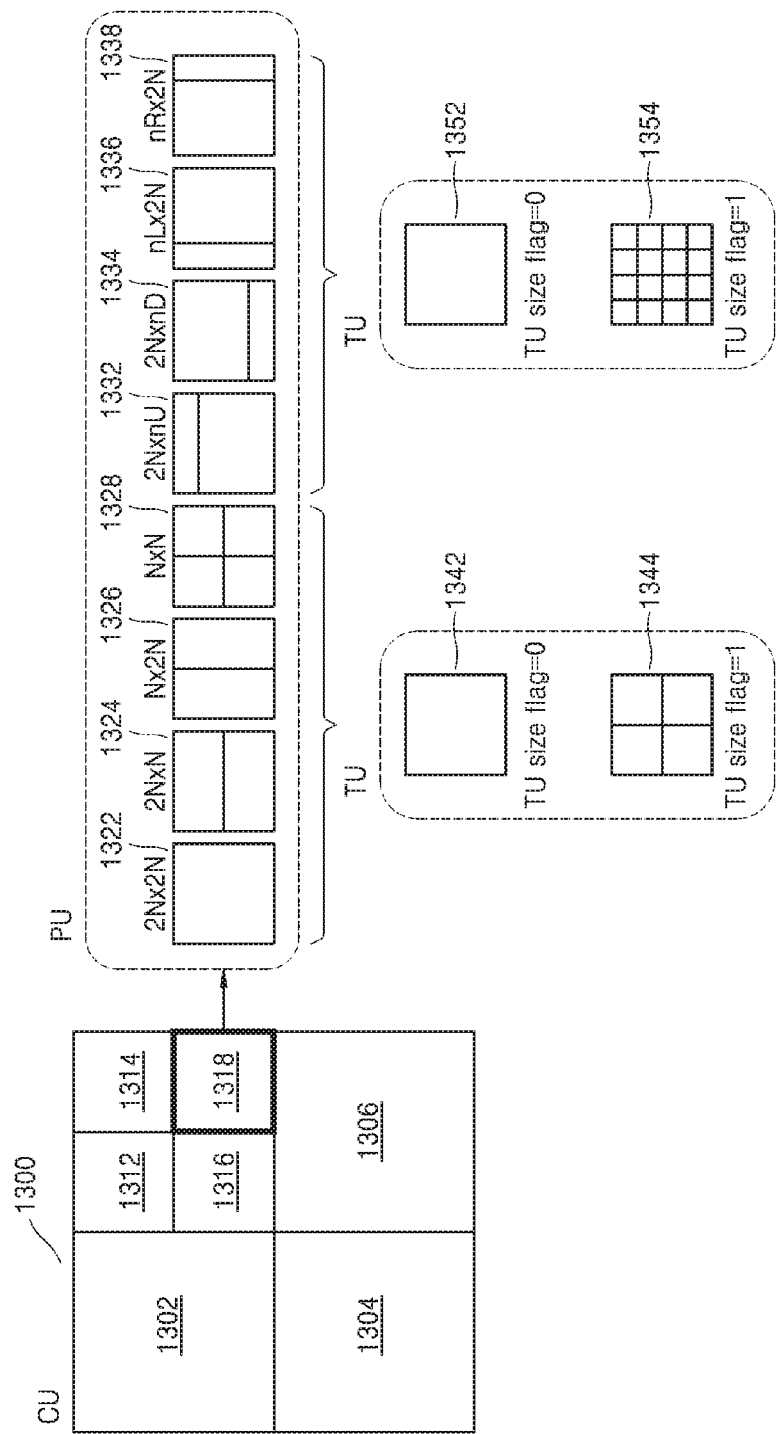
FIG. 20 illustrates a relationship between a coding unit, a prediction unit, and a transformation unit, according to encoding mode information of Table 1.

FIG. 20 illustrates a relationship between a coding unit, a prediction unit, and a transformation unit, according to encoding mode information of Table 1.

A largest coding unit 1300 includes coding units 1302, 1304, 1306, 1312, 1314, 1316, and 1318 of depths. Here, since the coding unit 1318 is a coding unit of a depth, split information may be set to 0. Partition mode information of the coding unit 1318 having a size of 2N×2N may be set to be one of partition modes including 2N×2N 1322, 2N×N 1324, N×2N 1326, N×N 1328, 2N×nU 1332, 2N×nD 1334, nL×2N 1336, and nR×2N 1338.

Transformation unit split information (TU size flag) is a type of a transformation index, and a size of a transformation unit corresponding to the transformation index may be changed according to a prediction unit type or partition mode of the coding unit.

For example, when the partition mode information is set to be one of symmetrical partition modes 2N×2N 1322, 2N×N 1324, N×2N 1326, and N×N 1328, if the transformation unit split information is 0, a transformation unit 1342 having a size of 2N×2N is set, and if the transformation unit split information is 1, a transformation unit 1344 having a size of N×N may be set.

When the partition mode information is set to be one of asymmetrical partition modes 2N×nU 1332, 2N×nD 1334, nL×2N 1336, and nR×2N 1338, if the transformation unit split information (TU size flag) is 0, a transformation unit 1352 having a size of 2N×2N may be set, and if the transformation unit split information is 1, a transformation unit 1354 having a size of N/2×N/2 may be set.

Referring to FIG. 19, the TU size flag is a flag having a value or 0 or 1, but the TU size flag according to some exemplar embodiments is not limited to 1 bit, and a transformation unit may be hierarchically split having a tree structure while the TU size flag increases from 0. The transformation unit split information may be an example of the transformation index.

In this case, the size of a transformation unit that has been actually used may be expressed by using the transformation unit split information according to various embodiments, together with a maximum size of the transformation unit and a minimum size of the transformation unit. The video encoding apparatus 100 according to various embodiments may encode maximum transformation unit size information, minimum transformation unit size information, and maximum transformation unit split information. The result of encoding the maximum transformation unit size information, the minimum transformation unit size information, and the maximum transformation unit split information may be inserted into an SPS. The video decoding apparatus 200 according to various embodiments may decode video by using the maximum transformation unit size information, the minimum transformation unit size information, and the maximum TU size flag.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit may be defined by Equation (1):

$$CurrMinTuSize=\max(MinTransformSize, RootTuSize/(2^{\wedge}MaxTransformSizeIndex)) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. That is, in Equation (1), 'RootTuSize/(2^MaxTransformSizeIndex)' denotes a transformation unit size when the transformation unit size 'RootTuSize', when the TU size flag is 0, is split by the number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to various embodiments, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$RootTuSize=\min(MaxTransformSize, PUSize) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. 'PartitionSize' denotes the size of the current partition unit.

$$RootTuSize=\min(MaxTransformSize, PartitionSize) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and the present disclosure is not limited thereto.

According to the video encoding method based on coding units of a tree structure described above with reference to FIGS. 8 through 20, image data of a spatial domain is encoded in each of the coding units of the tree structure, and the image data of the spatial domain is reconstructed in a manner that decoding is performed on each largest coding unit according to the video decoding method based on the coding units of the tree structure, so that a video that is formed of pictures and picture sequences may be reconstructed. The reconstructed video may be reproduced by a reproducing apparatus, may be stored in a storage medium, or may be transmitted via a network.

The one or more embodiments may be written as computer programs and may be implemented in general-use digital computers that execute the programs by using a non-transitory computer-readable recording medium. Examples of the non-transitory computer-readable recording medium include magnetic storage media (e.g., ROM, floppy disks, hard disks, etc.), optical recording media (e.g., CD-ROMs, or DVDs), etc.

For convenience of description, the inter-layer video encoding method and/or the video encoding method described above with reference to FIGS. 1A through 20 will be collectively referred to as a 'video encoding method'. In addition, the inter-layer video decoding method and/or the video decoding method described above with reference to FIGS. 1A through 20 will be referred to as a 'video decoding method'.

Also, a video encoding apparatus including the inter-layer video encoding apparatus 10, the video encoding apparatus 100, or the image encoder 400, which has been described with reference to FIGS. 1A through 20, will be referred to as a 'video encoding apparatus'. In addition, a video decoding apparatus including the inter-layer video decoding apparatus 20, the video decoding apparatus 200, or the image decoder 500, which has been descried with reference to FIGS. 1A through 20, will be collectively referred to as a 'video decoding apparatus'.

A non-transitory computer-readable recording medium such as a disc 26000 that stores the programs according to various embodiments will now be described in detail.

Figure 21:
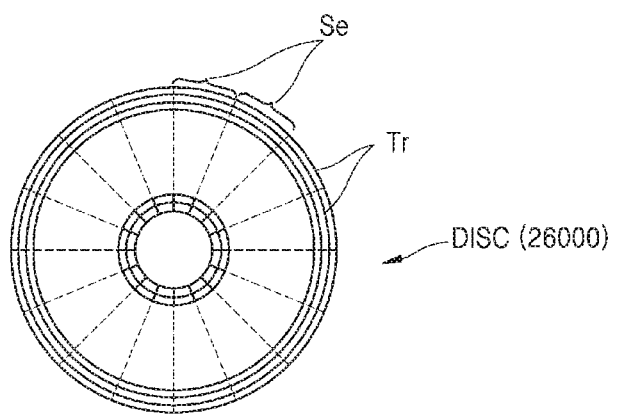
FIG. 21 illustrates a physical structure of a disc in which a program is stored, according to various embodiments.

FIG. 21 illustrates a physical structure of the disc 26000 in which a program is stored, according to various embodiments. The disc 26000, which is a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000, a program that executes the quantized parameter determining method, the video encoding method, and the video decoding method described above may be assigned and stored.

A computer system embodied using a storage medium that stores a program for executing the video encoding method and the video decoding method as described above will now be described with reference to FIG. 22.

Figure 22:
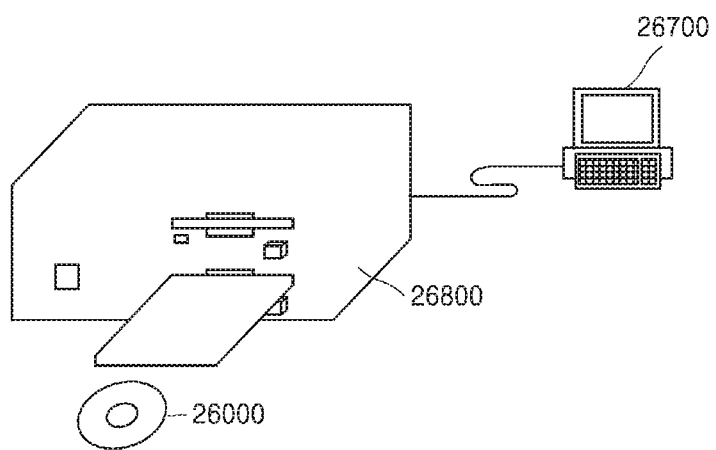
FIG. 22 illustrates a disc drive for recording and reading a program by using the disc.

FIG. 22 illustrates a disc drive 26800 for recording and reading a program by using the disc 26000. A computer system 27000 may store a program that executes at least one of a video encoding method and a video decoding method, in the disc 26000 via the disc drive 26800. In order to run the program stored in the disc 26000 in the computer system 26700, the program may be read from the disc 26000 and may be transmitted to the computer system 26700 by using the disc drive 26800.

The program that executes at least one of the video encoding method and the video decoding method may be stored not only in the disc 26000 illustrated in FIGS. 21 and 22 but may also be stored in a memory card, a ROM cassette, or a solid state drive (SSD).

A system to which the video encoding method and the video decoding method according to the embodiments described above are applied will be described below.

Figure 23:
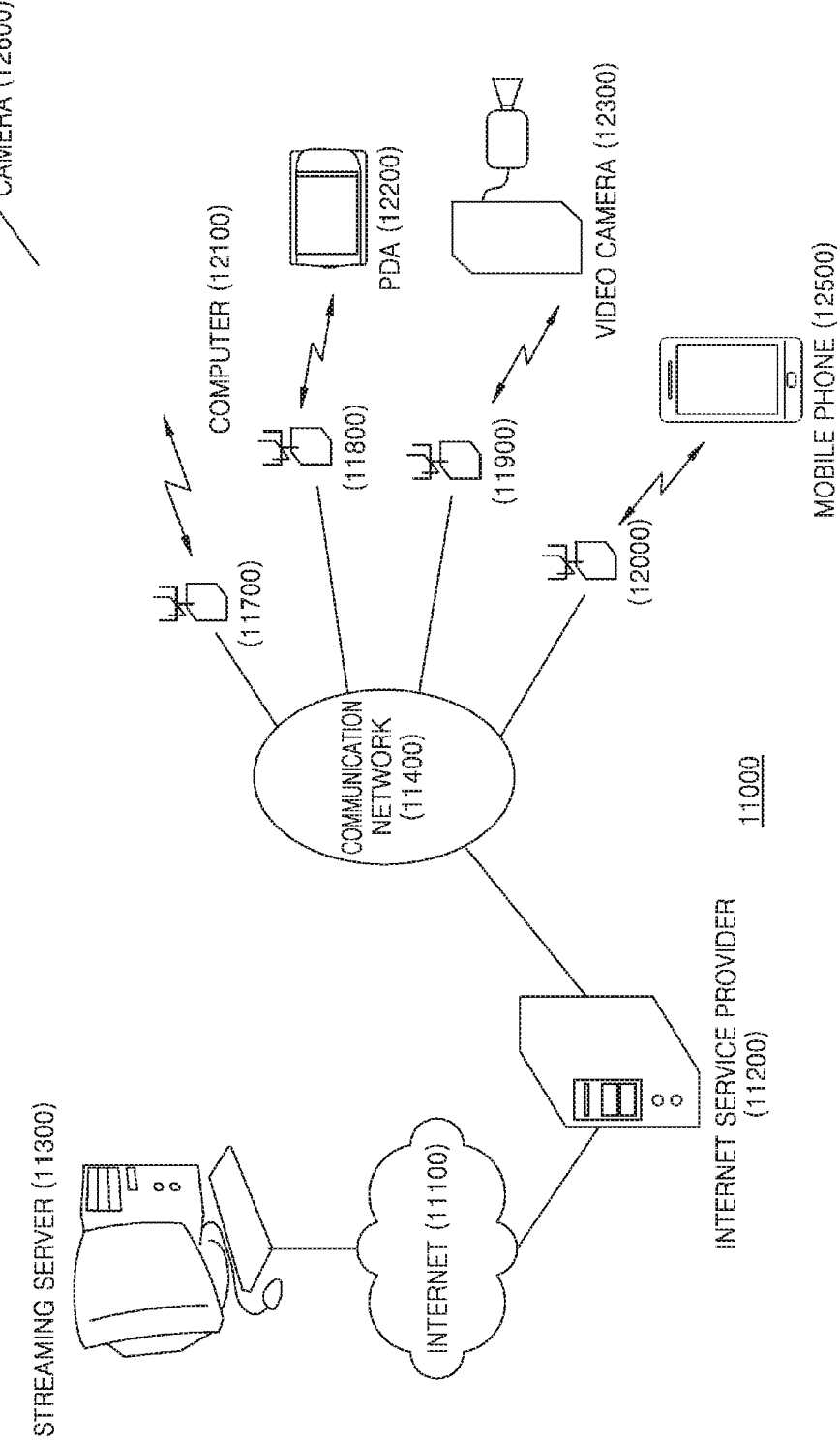
FIG. 23 illustrates an overall structure of a content supply system for providing a content distribution service.

FIG. 23 illustrates an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

Figure 24:
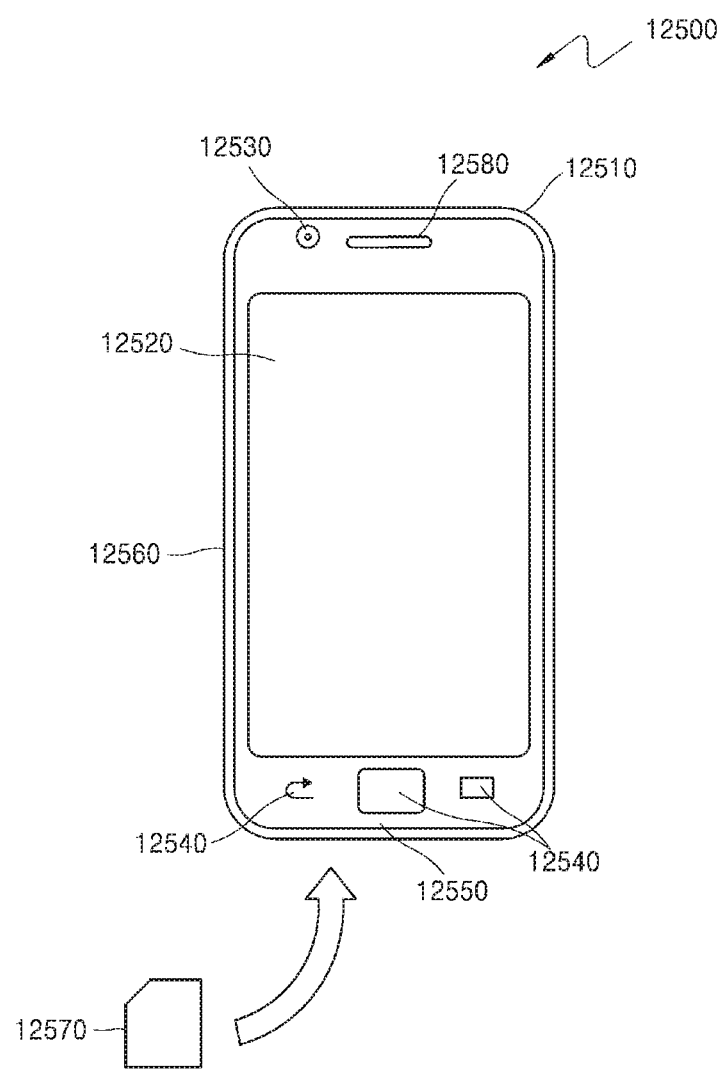
FIGS. 24 and 25 illustrate external and internal structures of a mobile phone to which a video encoding method and a video decoding method are applied, according to various embodiments.

However, the content supply system 11000 is not limited to the structure as illustrated in FIG. 24, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded by the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 such as a digital camera is an imaging device capable of capturing both still images and video images. The video data captured by the camera 12600 may be encoded by using the camera 12600 or the computer 12100. Software that performs encoding and decoding video may be stored in a non-transitory computer-readable recording medium, e.g., a CD-ROM disc, a floppy disc, a hard disc drive, an SSD, or a memory card, which may be accessed by the computer 12100.

If video data is captured by a camera built in the mobile phone 12500, the video data may be received from the mobile phone 12500.

The video data may be encoded by a large scale integrated circuit (LSI) system installed in the video camera 12300, the mobile phone 12500, or the camera 12600.

In the content supply system 11000 according to various embodiments, content data, e.g., content recorded during a concert, which has been recorded by a user using the video camera 12300, the camera 12600, the mobile phone 12500, or another imaging device is encoded and is transmitted to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and to decode and reproduce the encoded content data in real-time, thereby enabling personal broadcasting.

The video encoding apparatus and the video decoding apparatus may be applied to encoding and decoding operations of the plurality of independent devices included in the content supply system 11000.

Figure 25:
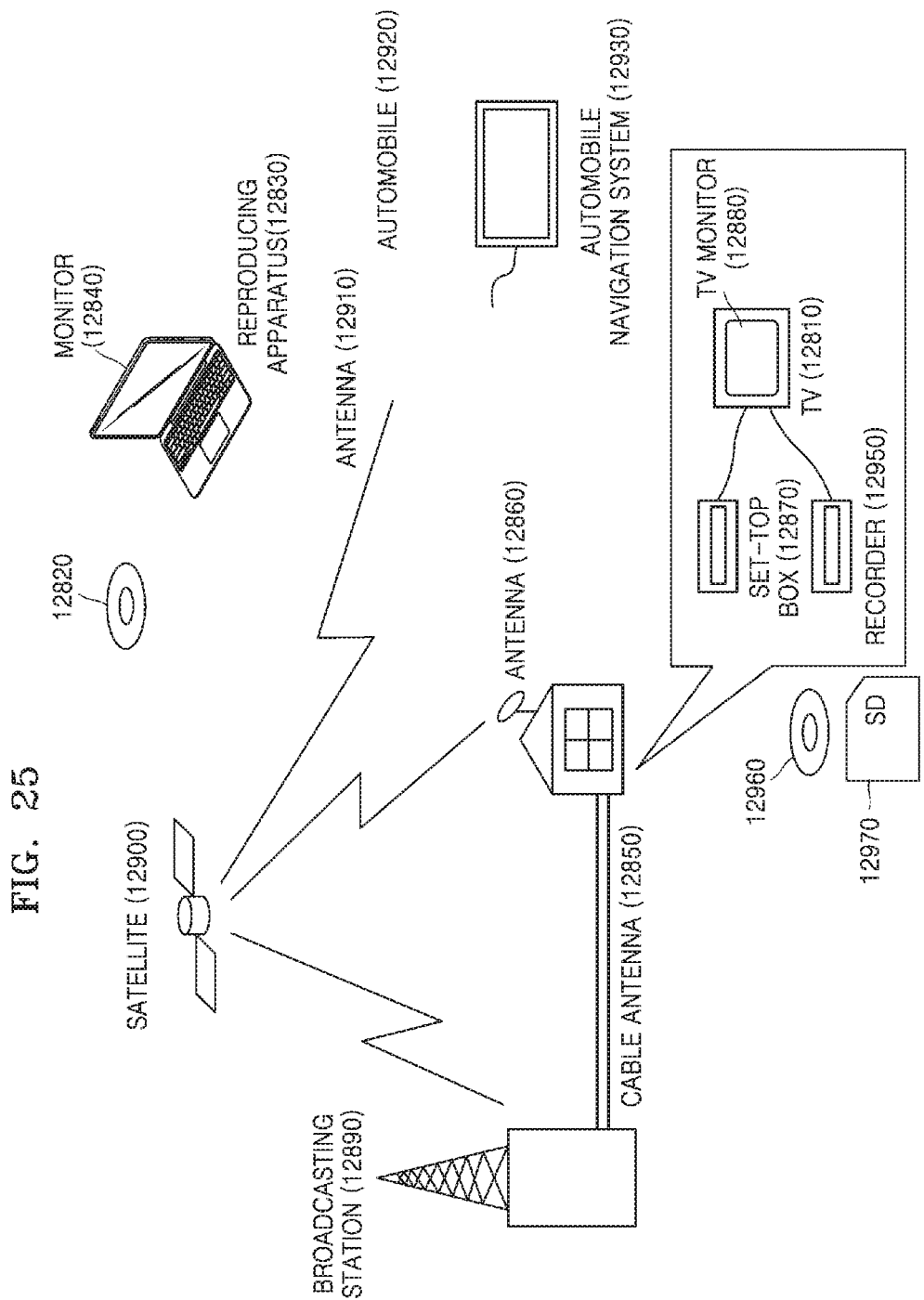

With reference to FIGS. 24 and 25, the mobile phone 12500 included in the content supply system 11000 according to an embodiment will now be described in detail.

FIG. 24 illustrates an external structure of the mobile phone 12500 to which the video encoding method and the video decoding method are applied, according to various embodiments. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen

12520. The mobile phone 12500 includes a speaker 12580 for outputting voice and sound or another type of a sound output unit, and a microphone 12550 for inputting voice and sound or another type of a sound input unit. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

FIG. 25 illustrates an internal structure of the mobile phone 12500. In order to systemically control parts of the mobile phone 12500 including the display screen 12520 and the operation panel 12540, a power supply circuit 12700, an operation input controller 12640, an image encoder 12720, a camera interface 12630, an LCD controller 12620, an image decoder 12690, a multiplexer/demultiplexer 12680, a recording/reading unit 12670, a modulation/demodulation unit 12660, and a sound processor 12650 are connected to a central controller 12710 via a synchronization bus 12730.

If a user operates a power button and sets from a 'power off' state to a 'power on' state, the power supply circuit 12700 supplies power to all the parts of the mobile phone 12500 from a battery pack, thereby setting the mobile phone 12500 to an operation mode.

The central controller 12710 includes a central processing unit (CPU), a read-only memory (ROM), and a random access memory (RAM).

While the mobile phone 12500 transmits communication data to the outside, a digital signal is generated by the mobile phone 12500 by the control of the central controller 12710. For example, the sound processor 12650 may generate a digital sound signal, the image encoder 12720 may generate a digital image signal, and text data of a message may be generated via the operation panel 12540 and the operation input controller 12640. When a digital signal is transmitted to the modulation/demodulation unit 12660 by the control of the central controller 12710, the modulation/demodulation unit 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is converted to a digital sound signal by the sound processor 12650 by the control of the central controller 12710. The generated digital sound signal may be converted to a transmission signal through the modulation/demodulation unit 12660 and the communication circuit 12610, and may be transmitted via the antenna 12510.

When a text message, e.g., email, is transmitted in a data communication mode, text data of the text message is input via the operation panel 12540 and is transmitted to the central controller 12610 via the operation input controller 12640. By the control of the central controller 12610, the text data is transformed into a transmission signal via the modulation/demodulation unit 12660 and the communication circuit 12610 and is transmitted to the wireless base station 12000 via the antenna 12510.

In order to transmit image data in the data communication mode, image data captured by the camera 12530 is provided to the image encoder 12720 via the camera interface 12630. The image data captured by the camera 12530 may be directly displayed on the display screen 12520 via the camera interface 12630 and the LCD controller 12620.

A structure of the image encoder 12720 may correspond to that of the video encoding apparatus 100 described above. The image encoder 12720 may transform the image data received from the camera 12530 into compressed and encoded image data according to the aforementioned video encoding method, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoder 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from the outside, frequency recovery and analog-to-digital conversion (ADC) are performed on a signal received via the antenna 12510 so as to convert the received signal into a digital signal. The modulation/demodulation unit 12660 modulates a frequency band of the digital signal. The frequency-band modulated digital signal is transmitted to the video decoder 12690, the sound processor 12650, or the LCD controller 12620, according to the type of the digital signal.

In the conversation mode, the mobile phone 12500 amplifies a signal received via the antenna 12510, and obtains a digital sound signal by performing frequency conversion and ADC on the amplified signal. A received digital sound signal is converted to an analog sound signal via the modulation/demodulation unit 12660 and the sound processor 12650, and the analog sound signal is output via the speaker 12580 by the control of the central controller 12710.

When, in the data communication mode, data of a video file accessed at an Internet website is received, a signal received from the wireless base station 12000 via the antenna 12510 is output as multiplexed data via the modulation/demodulation unit 12660, and the multiplexed data is transmitted to the multiplexer/demultiplexer 12680.

In order to decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoder 12690 and the sound processor 12650, respectively.

A structure of the image decoder 12690 may correspond to that of the video decoding apparatus described above. The image decoder 12690 may decode the encoded video data so as to obtain reconstructed video data and provide the reconstructed video data to the display screen 12520 via the LCD controller 12620, by using the aforementioned video decoding method.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both the video encoding apparatus and the video decoding apparatus, may be a transmitting terminal including only the video encoding apparatus, or may be a receiving terminal including only the video decoding apparatus.

Figure 26:
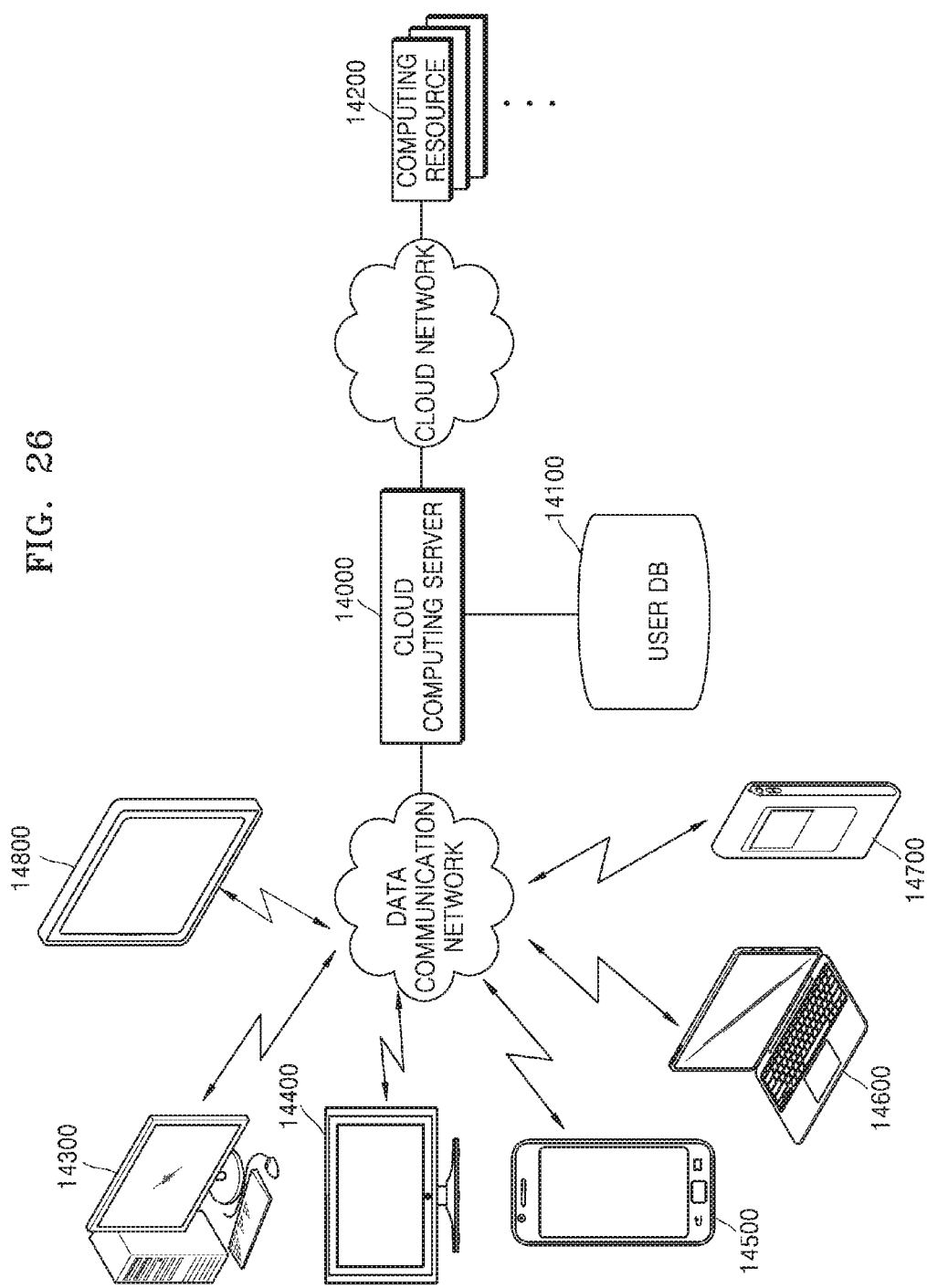
FIG. 26 illustrates a digital broadcasting system employing a communication system.

A communication system is not limited to the communication system described above with reference to FIG. 24. For example, FIG. 26 illustrates a digital broadcasting system employing a communication system, according to various embodiments. The digital broadcasting system of FIG. 26 according to various embodiments may receive a digital broadcast transmitted via a satellite or a terrestrial network by using the video encoding apparatus and the video decoding apparatus.

In more detail, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When the video decoding apparatus is implemented in a reproducing apparatus 12830, the reproducing apparatus 12830 may parse and decode an encoded video stream recorded on a storage medium 12820, such as a disc or a memory card to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, the video decoding apparatus may be installed. Data output from the set-top box 12870 may also be reproduced on a TV monitor 12880.

As another example, the video decoding apparatus may be installed in the TV receiver 12810 instead of the set-top box 12870.

An automobile 12920 that has an appropriate antenna 12910 may receive a signal transmitted from the satellite 12900 or the wireless base station 11700. A decoded video may be reproduced on a display screen of an automobile navigation system 12930 installed in the automobile 12920.

A video signal may be encoded by the video encoding apparatus and may then be recorded to and stored in a storage medium. In more detail, an image signal may be stored in a DVD disc 12960 by a DVD recorder or may be stored in a hard disc by a hard disc recorder 12950. As another example, the video signal may be stored in an SD card 12970. If the hard disc recorder 12950 includes the video decoding apparatus, a video signal recorded on the DVD disc 12960, the SD card 12970, or another storage medium may be reproduced on the TV monitor 12880.

The automobile navigation system 12930 may not include the camera 12530, the camera interface 12630, and the image encoder 12720 of FIG. 26. For example, the computer 12100 and the TV receiver 12810 may not include the camera 12530, the camera interface 12630, and the image encoder 12720 of FIG. 26.

Figure 27:
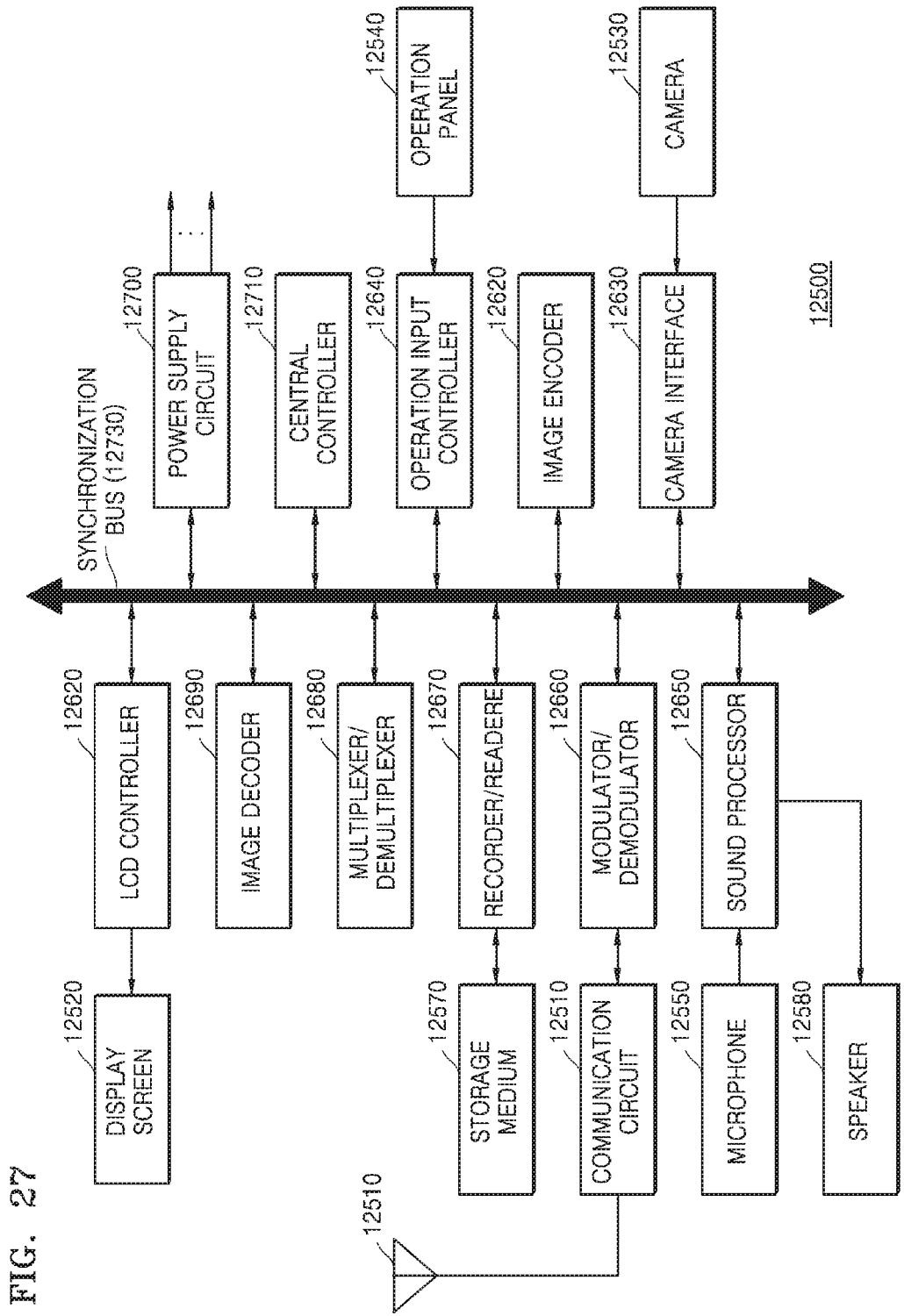
FIG. 27 illustrates a network structure of a cloud computing system using the video encoding apparatus and the video decoding apparatus, according to various embodiments.

FIG. 27 illustrates a network structure of a cloud computing system using the video encoding apparatus and the video decoding apparatus, according to various embodiments.

The cloud computing system may include a cloud computing server 14100, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security software, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14100, and the like.

The cloud computing server 14100 may combine the plurality of computing resources 14200 distributed in a cloud network and provide user terminals with a result of combining. The plurality of computing resources 14200 may include various data services, and may include data uploaded from user terminals. As described above, the cloud computing server 14100 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce the video service is received from the smart phone 14500, the cloud computing server 14000 searches for and reproduces the video service, based on the user DB 14100. When the smart phone 14500 receives a video data stream from the cloud computing server 14000, a process of reproducing video by decoding the video data stream is similar to an operation of the mobile phone 12500 described above with reference to FIG. 24.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. If the user terminal requests to reproduce the video, starting from the pausing point thereof, the cloud computing server 14000 transmits streaming data of the video starting from a frame corresponding to the pausing point, to the user terminal.

In this case, the user terminal may include the video decoding apparatus as described above with reference to FIGS. 1A through 20. As another example, the user terminal may include the video encoding apparatus as described above with reference to FIGS. 1A through 20. Alternatively, the user terminal may include both the video decoding apparatus and the video encoding apparatus as described above with reference to FIGS. 1A through 20.

Various applications of a video encoding method, a video decoding method, a video encoding apparatus, and a video decoding apparatus according to various embodiments described above with reference to FIGS. 1A through 20 have been described above with reference to FIGS. 21 through 27. However, methods of storing the video encoding method and the video decoding method in a storage medium or methods of implementing the video encoding apparatus and the video decoding apparatus in a device described above with reference to FIGS. 1A through 20 are not limited to the embodiments described above with reference to FIGS. 21 through 27.

While the present disclosure has been particularly shown and described with reference to embodiments thereof, it will be understood by one of ordinary skill in the art that various changes in form and details may be made therein without departing from the spirit and scope of the following claims. The embodiments should be considered in a descriptive sense only and not for purposes of limitation. Therefore, the scope of the disclosure is defined not by the detailed description of the disclosure but by the appended claims, and all differences within the scope will be construed as being included in the present disclosure.

The invention claimed is:

1. An inter-layer video decoding method comprising:
   obtaining a disparity vector of a current block comprised in a first layer image;
   determining a block of a second layer image corresponding to the current block by using the obtained disparity vector;
   determining a reference block comprising a first sample of a modified position, wherein the first sample directly contacts, in a diagonal direction, a right-bottom corner sample of the block of the second layer image corresponding to the current block, wherein the modified position of the first sample is determined to be values of x coordinate and y coordinate having multiple of 8 indicating a block unit storing motion information by using right and left bit-shift operations;
   obtaining a motion vector of the reference block; and
   determining a motion vector of the current block comprised in the first layer image by using the obtained motion vector.

2. The inter-layer video decoding method of claim 1, wherein a current coding unit is one of one or more coding units determined from the first layer image by using split information regarding the current coding unit obtained from a bitstream, and the current block is one of one or more prediction units determined from the current coding unit.

3. The inter-layer video decoding method of claim 1, wherein, when the second layer image is split into a plurality of blocks each having a predetermined size, the reference block comprising the first sample is a block comprising the first sample from among the plurality of blocks.

4. The inter-layer video decoding method of claim 1, wherein if the first sample of the modified position deviates from a boundary of the second layer image, a second sample adjacent to an inner side of the boundary of the second layer image is determined, and
   a reference block comprising the determined second sample adjacent to the inner side of the boundary of the second layer image is determined.

5. The inter-layer video decoding method of claim 1, wherein the disparity vector is a vector having a ¼ sample accuracy, and
   the determining of the reference block comprising the first sample that directly contacts, in the diagonal direction, the right-bottom corner sample of the block of the second layer image comprises:
   performing rounding-off operation on the disparity vector to generate a disparity vector having an integer sample accuracy; and
   determining the reference block comprising the first sample directly contacting, in the diagonal direction, the right-bottom corner sample of the block of the second layer image corresponding to the current block by using the disparity vector having the integer sample accuracy, a location of the block of the second layer image corresponding to the current block, and at least one of a width and a height of the block of the second layer image corresponding to the current block.

6. The inter-layer video decoding method of claim 1, wherein the first layer image is an image indicating a first view, and the second layer image is an image indicating a second view,
   the inter-layer video decoding method further comprises determining a prediction block of the current block by using a block that is in a reference image indicating the first view and is indicated by the obtained motion vector, and
   the reference image is an image of which a time is different from a time of the first layer image.

7. An inter-layer video encoding method comprising:
   obtaining a disparity vector of a current block comprised in a first layer image;
   determining a block of a second layer image corresponding to the current block by using the obtained disparity vector;
   determining a reference block comprising a first sample of a modified position, wherein the first sample directly contacts, in a diagonal direction, a right-bottom corner sample of the block of the second layer image corresponding to the current block, wherein the modified position of the first sample is determined to be values of x coordinates and y coordinate having multiple of 8 indicating a block unit storing motion information by using right and left bit-shift operations;
   obtaining a motion vector of the reference block;
   determining a motion vector of the current block comprised in the first layer image by using the obtained motion vector;
   determining a prediction block of the current block by using the determined motion vector; and
   encoding a residual block with respect to the current block by using the prediction block of the current block.

8. The inter-layer video encoding method of claim 7, wherein, when the second layer image is split into a plurality of blocks each having a predetermined size, the reference block comprising the first sample is a block comprising the first sample from among the plurality of blocks.

9. The inter-layer video encoding method of claim 7, wherein if the first sample of a modified position deviates from a boundary of the second layer image, a second sample adjacent to an inner side of the boundary of the second layer image is determined; and
- a reference block comprising the determined second sample adjacent to the inner side of the boundary of the second layer image is determined.

10. The inter-layer video encoding method of claim 7, wherein the disparity vector is a vector having a ¼ sample accuracy, and
- the determining of the reference block comprising the first sample that directly contacts, in the diagonal direction, the right-bottom corner sample of the block comprises:
- performing rounding-off operation on the disparity vector to generate a disparity vector having an integer sample accuracy; and
- determining the reference block comprising the first sample directly contacting, in the diagonal direction, the right-bottom corner sample of the block of the second layer image corresponding to the current block by using the disparity vector having the integer sample accuracy, a location of the block of the second layer image corresponding to the current block, and at least one of a width and a height of the block.

11. An inter-layer video decoding apparatus comprising:
- at least one processor configured to obtain a disparity vector indicating a corresponding block of a second layer image decoded from a current block of a first layer image, and to determine a reference block comprising a first sample of a modified position, wherein the first sample directly contacts, in a diagonal direction, a right-bottom corner sample of the corresponding block of the second layer image by using the obtained disparity vector, wherein the modified position of the first sample is determined to be values of x coordinate and y coordinate having multiple of 8 indicating a block unit storing motion information by using right and left bit-shift operations, to obtain a motion vector of the reference block, and to obtain a prediction block of the current block of the first layer image by using the obtained motion vector.

12. A non-transitory computer-readable recording medium having recorded thereon a program for implementing the method of claim 1.

* * * * *